US012118763B2

(12) United States Patent
Huttunen et al.

(10) Patent No.: US 12,118,763 B2
(45) Date of Patent: Oct. 15, 2024

(54) COGNITIVE LOAD SCORING OF A VISUAL STIMULUS

(71) Applicant: Dell Products L.P., Round Rock, TX (US)

(72) Inventors: Annamarie Huttunen, Evergreen, CO (US); Jordan E. Lord, Austin, TX (US); Shannon Rogers, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 444 days.

(21) Appl. No.: 17/723,733

(22) Filed: Apr. 19, 2022

(65) Prior Publication Data
US 2023/0334815 A1    Oct. 19, 2023

(51) Int. Cl.
*G06V 10/40* (2022.01)
*G06V 10/74* (2022.01)
*G06V 10/762* (2022.01)

(52) U.S. Cl.
CPC ............ *G06V 10/40* (2022.01); *G06V 10/761* (2022.01); *G06V 10/762* (2022.01)

(58) Field of Classification Search
CPC ..... G06V 10/40; G06V 10/761; G06V 10/762
See application file for complete search history.

(56) References Cited

U.S. PATENT DOCUMENTS

| 2007/0166675 A1* | 7/2007 | Atkins | G09B 7/04 |
| | | | 434/236 |
| 2013/0024113 A1* | 1/2013 | Weng | G01C 21/3638 |
| | | | 701/450 |

(Continued)

FOREIGN PATENT DOCUMENTS

JP   2020201806 A   * 12/2020

OTHER PUBLICATIONS

Nagle F, Lavie N. Predicting human complexity perception of real-world scenes. R Soc Open Sci. May 13, 2020;7(5): 191487. doi: 10.1098/rsos.191487. PMID: 32537189; PMCID: PMC7277246. (Year: 2020).*

(Continued)

*Primary Examiner* — Michael Robert Cammarata
(74) *Attorney, Agent, or Firm* — Ryan, Mason & Lewis, LLP

(57) ABSTRACT

An apparatus comprises at least one processing device comprising a processor coupled to a memory. The at least one processing device is configured to obtain an information density matrix for an input visual stimulus, the information density matrix characterizing information density of feature points in the input visual stimulus, and to identify one or more clusters of feature points in the input visual stimulus by performing spatial clustering of the feature points utilizing the information density matrix. The at least one processing device is also configured to determine a cognitive load score for the input visual stimulus based at least in part on the identified one or more clusters of feature points, the cognitive load score characterizing cognitive energy required to mentally process the input visual stimulus. The at least one processing device is further configured to modify a design of the input visual stimulus to adjust the cognitive load score of the input visual stimulus.

20 Claims, 38 Drawing Sheets

(56) References Cited

U.S. PATENT DOCUMENTS

| | | | |
|---|---|---|---|
| 2015/0279227 A1* | 10/2015 | Huber | G09B 7/06 |
| | | | 434/353 |
| 2020/0147418 A1* | 5/2020 | Haciomeroglu | G06T 5/73 |
| 2021/0309252 A1* | 10/2021 | Boulanger | A61B 5/1128 |
| 2021/0381839 A1* | 12/2021 | Verbeke | G01C 21/3407 |
| 2022/0121867 A1* | 4/2022 | Arar | G06V 20/597 |
| 2023/0255698 A1* | 8/2023 | Harrah | A61B 18/26 |
| | | | 345/633 |
| 2023/0334817 A1* | 10/2023 | Huttunen | G06V 40/18 |

OTHER PUBLICATIONS

Rosenholtz, Ruth, et al. "Feature congestion: a measure of display clutter." Proceedings of the SIGCHI conference on Human factors in computing systems. 2005. (Year: 2005).*

Yu CP, Samaras D, Zelinsky GJ. Modeling visual clutter perception using proto-object segmentation. J Vis. Jun. 5, 2014;14(7):4. doi: 10.1167/14.7.4. PMID: 24904121; PMCID: PMC4528410. (Year: 2014).*

Corchs, Silvia Elena, et al. "Predicting complexity perception of real world images." PloS one 11.6 (2016): e0157986. (Year: 2016).*

Reinecke K, Yeh T, Miratrix L, Mardiko R, Zhao Y, Liu J, et al. Predicting users' first impressions of website aesthetics with a quantification of perceived visual complexity and colorfulness. In: Proceedings of the SIGCHI Conference on Human Factors in Computing Systems. ACM; 2013. p. 2049-2058 (Year: 2013).*

Forsythe A, Sheehy N, Sawey M. Measuring icon complexity: An automated analysis. Behavior Research Methods, Instruments, & Computers. 2003; 35(2):334-342. doi: 10.3758/BF03202562 (Year: 2003).*

R. J. Donovan et al., "Store Atmosphere: An Environmental Psychology Approach," Journal of Retail, vol. 58, No. 1, Spring 1982, pp. 34-57.

W. Schroyens et al., "Eye Movement Control During Reading: Foveal Load and Parafoveal Processing," The Quarterly Journal of Experimental Psychology, vol. 52, No. 4, Nov. 1999, pp. 1021-1046.

K. Semmelmann et al., "Online Webcam-Based Eye Tracking in Cognitive Science: A First Look," Behavior Research Methods, vol. 50, No. 2, Apr. 2018, pp. 451-465.

M. E. Król et al., "The Right Look for The Job: Decoding Cognitive Processes Involved in the Task from Spatial Eye-Movement Patterns," Psychological Research, vol. 84, No. 1, Feb. 2020, 14 pages.

G. Xinyao et al., "Measuring the Situation Awareness of Tower Controllers by Using Eye Movement Analysis," Journal of Engineering Science & Technology Review, vol. 13, No. 1, Jan. 2020, pp. 133-140.

T. Van Gog et al., "Uncovering Expertise-Related Differences in Troubleshooting Performance: Combining Eye Movement and Concurrent Verbal Protocol Data," Applied Cognitive Psychology, vol. 19, No. 2, Mar. 2005, 33 pages.

K.-C. Chen et al., "Visual Attention and Eye Movements," Donald Bren School of Information and Computer Science, University of California, Irvine, 2008, 14 pages.

K. Gillespie-Smith et al., "Multiple Measures of Fixation on Social Content in Infancy: Evidence for a Single Social Cognitive Construct?" Infancy, vol. 21, No. 2, Mar.-Apr. 2016, pp. 241-257.

G. Lindgaard et al., "Attention Web Designers: You Have 50 Milliseconds to Make a Good First Impression!" Behaviour & Information Technology, vol. 25, No. 2, Mar.-Apr. 2006, pp. 115-126.

C.-C. Huang et al., "The Relationship Among Brand Equity, Customer Satisfaction, and Brand Resonance to Repurchase Intention of Cultural and Creative Industries in Taiwan," International Journal of Organizational Innovation, vol. 6, No. 3, p. 106-143.

A. K. Anderson et al., "Lesions of the Human Amygdala Impair Enhanced Perception of Emotionally Salient Events," Nature, vol. 411, May 17, 2001, 7 pages.

L. S. Aiken et al., "Invalidity of True Experiments: Self-Report Pretest Biases," Evaluation Review, vol. 14, No. 4, Aug. 1990, pp. 374-390.

J. Beatty, "Task-Evoked Pupillary Responses, Processing Load, and the Structure of Processing Resources," Psychological Bulletin, vol. 91, No. 2, Mar. 1982, pp. 276-292.

J. Duncan et al., "Direct Measurement of Attentional Dwell Time in Human Vision." Nature, vol. 369, May 26, 1994, pp. 313-315.

D. E. J. Linden et al., "Cortical Capacity Constraints for Visual Working Memory: Dissociation of fMRI Load Effects in a Fronto-Parietal Network," NeuroImage, vol. 20, No. 3, Nov. 2003, pp. 1518-1530.

A. Mack, "Inattentional Blindness: Looking Without Seeing," Psychological Science, vol. 12, No. 5, Oct. 2003, pp. 180-184.

D. M. Isaacowitz, "Motivated Gaze: The View from the Gazer," Current Directions in Psychological Science, vol. 15, No. 2, Apr. 2006, pp. 68-72.

G. R. Vandenbos, "APA Dictionary of Psychology," American Psychological Association, 2nd Edition, 2015, 1221 pages.

J. M. Henderson et al., "Scene Perception for Psycholinguists," Chapter 1 in The Interface of Language, Vision, and Action: Eye Movements and the Visual World, 1st Edition, Jun. 18, 2004, pp. 1-58.

D. P. Crowne et al., "The Approval Motive: Studies in Evaluative Dependence," Praeger, Apr. 3, 1980, 233 pages. (Abstract Only).

K. M. Lempert et al. "Neuroeconomics of Emotion and Decision Making," Chapter 12 in Neuroeconomics: Decision Making and the Brain, Second Edition, Aug. 13, 2013, pp. 219-236. (Abstract Only).

J. M. Findlay et al., "Active Vision: The Psychology of Looking and Seeing," Oxford University Press, Oct. 9, 2003, 240 pages. (Table of Contents).

Y. M. Hwang et al., "An Eye-Tracking Paradigm to Explore the Effect of Online Consumers' Emotion on Their Visual Behaviour Between Desktop Screen and Mobile Screen," Behaviour & Information Technology, Sep. 4, 2020, 12 pages. (Abstract Only).

G. S. Howard et al., "Internal Invalidity in Studies Employing Self-Report Instruments: A Suggested Remedy," Journal of Educational Measurement, vol. 16, No. 2, pp. 129-135. (Abstract Only).

G. S. Howard et al., "Response-Shift Bias: A Problem in Evaluating Interventions with Pre/Post Self-Reports," Evaluation Review, vol. 4, No. 1, pp. 93-106. (Abstract Only).

W. Dong et al., "Assessing the Effectiveness and Efficiency of Map Colour for Colour Impairments Using an Eye- tracking Approach," Cartographic Journal, vol. 53, No. 2, Apr. 2, 2016, pp. 166-176. (Abstract Only).

G. Mulder, "The Concept and Measurement of Mental Effort," in Energetics and Human Information Processing, vol. 31, 1986, pp. 175-198. (Abstract Only).

G. A. Alvarez et al., "The Capacity of Visual Short-Term Memory Is Set Both by Visual Information Load and by Number of Objects," Psychological Science, vol. 15, No. 2, Feb. 1, 2004, pp. 106-111. (Abstract Only).

J. M. Henderson et al., "Eye Movements during Scene Viewing: An Overview," Chapter 12 in Eye Guidance in Reading and Scene Perception, Jul. 16, 1998, pp. 269-293. (Abstract Only).

M. Deng et al., "Information Acquisition, Emotion Experience and Behaviour Intention During Online Shopping: An Eye-Tracking Study," Behaviour & Information Technology, vol. 40, No. 7, Jan. 13, 2020, pp. 635-645. (Abstract Only).

G. G. Scott et al., "Motivation Determines Facebook Viewing Strategy," Computers in Human Behavior, vol. 56, No. C, Mar. 1, 2016, pp. 267-280. (Abstract Only).

B. Hwang et al., "Probing of Human Implicit Intent Based on Eye Movement and Pupillary Analysis for Augmented Cognition," International Journal of Imaging Systems and Technology, vol. 23, No. 2, May 21, 2013, pp. 114-126. (Abstract Only).

J.-Y. Kuo et al., "Investigating the Relationship Between Users' Eye Movements and Perceived Product Attributes in Design Concept Evaluation," Applied Ergonomics, vol. 94, Mar. 1, 2021. (Abstract Only).

R. L. Heath et al., "Asymmetric Bias in Perception of Facial Affect Among Roman and Arabic Script Readers," Laterality, vol. 10, No. 1, Jan. 2005, pp. 51-64. (Abstract Only).

(56) References Cited

OTHER PUBLICATIONS

T. J. Jeerakathil et al., "A Representational Vertical Bias," Neurology, vol. 44, No. 4, Apr. 1, 1994. (Abstract Only).
K. Heuer et al., "Avoidance of Emotional Facial Expressions in Social Anxiety: The Approach-Avoidance Task," Behaviour Research and Therapy, vol. 45, No. 12, Dec. 2007, pp. 2990-3001. (Abstract Only).
C. Gilbert et al., "Visual Asymmetry in Perception of Faces," Neuropsychologia, vol. 11, No. 3, Jul. 1973, pp. 355-362. (Abstract Only).
Y. M. Hwang et al., "Using Eye Tracking to Explore Consumers' Visual Behavior According to Their Shopping Motivation in Mobile Environments," Cyberpsychology, Behavior, and Social Networking, vol. 20, No. 7, Jul. 1, 2017, pp. 442-447. (Abstract Only).
G. Richter-Levin et al., "Amygdala-Hippocampus Dynamic Interaction in Relation to Memory," Molecular Neurobiology, vol. 22, Aug. 2000, pp. 11-20.
P. Vuilleumier et al., "Distant Influences of Amygdala Lesion on Visual Cortical Activation During Emotional Face Processing," Nature Neuroscience, vol. 7, No. 11, Nov. 2004, pp. 1271-1278.
P. Winkielman et al., "Unconscious Affective Reactions to Masked Happy Versus Angry Faces Influence Consumption Behavior and Judgments of Value," Personality and Social Psychology Bulletin, vol. 31, No. 1, Jan. 1, 2005, pp. 121-135.
K. R. Scherer, "What are Emotions? And How Can They Be Measured?" Social Science Information, vol. 44, No. 4, Dec. 1, 2005, pp. 693-727.
K. R. Scherer et al., "The GRID Meets the Wheel: Assessing Emotional Feeling via Self-report," Draft of Chapter 18, J. R. J. Fontaine, K. R. Scherer, & C. Soriano (Eds.), Components of Emotional Meaning: A Sourcebook, Oxford University Press, 2013, 34 pages.
V. Sacharin et al., "Geneva Emotion Wheel Rating Study," University of Geneva, Swiss Center for Affective Sciences, GEW Report, Aug. 13, 2012, 13 pages.
C. J. Hutto et al., "VADER: A Parsimonious Rule-based Model for Sentiment Analysis of Social Media Text," Proceedings of the Eighth International AAAI Conference on Weblogs and Social Media, Jun. 1-4, 2014, pp. 216-225.
J. C. Jackson et al. "Emotion Semantics Show both Cultural Variation and Universal Structure," Science, vol. 366, No. 6472, Dec. 20, 2019, pp. 1517-1522.
D. Jonauskaite et al., "Universal Patterns in Color-Emotion Associations Are Further Shaped by Linguistic and Geographic Proximity," Psychological Science, vol. 31, No. 10, Oct. 1, 2020, pp. 1245-1260.
E. T. Rolls et al., "Gustatory, Olfactory, and Visual Convergence within the Primate Orbitofrontal Cortex," Journal of Neuroscience, vol. 14, No. 9, Sep. 1, 1994, pp. 5427-5452.
M. T. Chai et al., "Exploring EEG Effective Connectivity Network in Estimating Influence of Color on Emotion and Memory," Frontiers in Neuroinformatics, vol. 13, No. 66, Oct. 9, 2019, 21 pages.
T. Bayes et al. "An Essay towards Solving a Problem in the Doctrine of Chance," By the late Rev. Mr. Bayes, communicated by Mr. Price, in a letter to John Canton, A. M. F. R. S. Philosophical Transactions of the Royal Society of London, vol. 53, Jan. 1, 1763, pp. 370-418.
S. Chen et al., "Using Task-Induced Pupil Diameter and Blink Rate to Infer Cognitive Load," Human-Computer Interaction, Apr. 2014, 31 pages.
G. J. Siegle et al., "Blink Before and After You Think: Blinks Occur Prior To and Following Cognitive Load Indexed by Pupillary Responses," Psychophysiology, vol. 45, Sep. 2008, pp. 679-687.
J. Zagermann et al., "Measuring Cognitive Load using Eye Tracking Technology in Visual Computing," Proceedings of the Sixth Workshop on Beyond Time and Errors on Novel Evaluation Methods for Visualization, Oct. 24, 2016, 8 pages.
S. M. Manson et al., "Using Eye-tracking and Mouse Metrics to Test Usability of Web Mapping Navigation," Cartography and Geographic Information Science, vol. 39, No. 1, Mar. 14, 2013, pp. 48-60.
M. Maldonado et al., "Mouse Tracking as a Window into Decision Making," Behavior Research Methods, vol. 51, Aug. 2019, pp. 1085-1101.
S. I. Donaldson et al., "Understanding Self-Report Bias in Organizational Behavior Research," Journal of Business and Psychology, vol. 17, No. 2, Winter 2002, pp. 245-260.
S. A. Hillyard et al., "Electrophysiology of Cognitive Processing," Annual Review of Psychology, vol. 34, Feb. 1983, pp. 33-61.
M. S. Humphreys et al., "Personality, Motivation and Performance: A Theory of The Relationship Between Individual Differences and Information Processing," Psychological Review, vol. 91, No. 2, Apr. 1984, pp. 153-184.
M. Ester et al., "A Density-Based Algorithm for Discovering Clusters in Large Spatial Databases with Noise," Proceedings of the Second International Conference on Knowledge Discovery and Data Mining, Aug. 1996, pp. 226-231.
T. J. Buschman et al., "Neural Substrates of Cognitive Capacity Limitations," Proceedings of the National Academy of Sciences, vol. 108, No. 27, Jul. 5, 2011, 4 pages.
R. Marois et al., "Capacity Limits of Information Processing in the Brain," TRENDS in Cognitive Sciences, vol. 9, No. 6, Jun. 2005, pp. 296-305.
J. Gross et al., "Modulation of Long-Range Neural Synchrony Reflects Temporal Limitations of Visual Attention in Humans," Proceedings of the National Academy of Sciences, vol. 101, No. 35, Aug. 31, 2004, pp. 13050-13055.
J. Duncan et al., "Restricted Attentional Capacity Within but not between Sensory Modalities," Nature, vol. 387, Jun. 19, 1997, pp. 808-810.
J. Sweller, "Cognitive Load During Problem Solving: Effects on Learning," Cognitive Science, vol. 12, No. 2, Apr.-Jun. 1988, pp. 257-285.
The Math Works, Inc. "MATLAB," Version 2020a, http://www.mathworks.com/, Accessed Feb. 24, 2022, 3 pages.
M. F. Land et al., "The Evolution of Eyes," Annual Review of Neuroscience, vol. 15, Mar. 1992, pp. 1-29.
J. Aloimonos et al., "Active Vision," International Journal of Computer Vision, vol. 1, Jan. 1988, pp. 333-356.
R. Desimone et al., "Neural Mechanisms of Selective Visual Attention," Annual Review of Neuroscience, vol. 18, Mar. 1995, pp. 193-222.
M. Rubo et al., "Social Content and Emotional Valence Modulate Gaze Fixations in Dynamic Scenes," Nature Scientific Reports, vol. 8, No. 3804, Feb. 28, 2018, 11 pages.
D. J. Simons et al., "Gorillas in Our Midst: Sustained Inattentional Blindness for Dynamic Events," Perception, vol. 28, Jun. 20, 1999, pp. 1059-1074.
T. J. Smith et al., "The Penny Drops: Change Blindness at Fixation," Perception, vol. 41, No. 4, Jan. 1, 2012, 16 pages.
J. M. Henderson, "Human Gaze Control During Real-World Scene Perception," Trends in Cognitive Science, vol. 7, No. 11, Nov. 2003, pp. 498-504.
O. Le Meur et al., "Predicting Visual Fixations on Video Based on Low-level Visual Features," Vision Research, vol. 47, No. 19, Sep. 2007, pp. 2483-2498.
M. R. Furtner et al., "Nomen est Omen: Investigating the Dominance of Nouns in Word Comprehension with Eye Movement Analyses," Advances in Cognitive Psychology, vol. 5, Dec. 23, 2009, 91-104.
K. Rayner et al., "Raeding Wrods with Jubmled Lettres: There is a Cost," Psychological Science, vol. 17, Mar. 1, 2006, 8 pages.
S. T. Iqbal et al., "Towards an Index of Opportunity: Understanding Changes in Mental Workload during Task Execution," Proceedings of the SIGCHI Conference on Human Factors in Computing Systems, Apr. 2-7, 2005, pp. 311-320.
M. Mills et al., "Examining the Influence of Task Set on Eye Movements and Fixations," Journal of Vision, vol. 11, No. 8, Jul. 28, 2011, pp. 1-15.

(56) References Cited

OTHER PUBLICATIONS

J. F. G. Boisvert et al., "Predicting Task from Eye Movements: On the Importance of Spatial Distribution, Dynamics, and Image Features," Neurocomputing, vol. 207, May 2016, 16 pages.
M. F. Land et al., "In What Ways Do Eye Movements Contribute to Everyday Activities?" Vision Research, vol. 41, Nov.-Dec. 2001, pp. 3559-3565.
M. F. Land et al., "The Roles of Vision and Eye Movements in the Control of Activities of Daily Living," Perception, vol. 28, Aug. 9, 1999, pp. 1311-1328.
M. G. Calvo et al., "Time Course of Attentional Bias to Emotional Scenes in Anxiety: Gaze Direction and Duration," Cognition and Emotion, vol. 19, No. 3, Mar. 1, 2005, pp. 433-451.
E. Scheller et al., "Diagnostic Features of Emotional Expressions Are Processed Preferentially," PLoS One, vol. 7, No. 7, Jul. 2012, 15 pages.
I. Krajbich et al., "The Attentional Drift-Diffusion Model Extends to Simple Purchasing Decisions," Frontiers in Psychology, vol. 3, No. 193, Jun. 13, 2012, 18 pages.
K. Guo et al., "Left Gaze Bias in Humans, Rhesus Monkeys and Domestic Dogs," Animal Cognition, Nov. 2008, 28 pages.
K. Guo, "Initial Fixation Placement in Face Images Is Driven by Top-Down Guidance," Experimental Brain Research, vol. 181, No. 4, Jul. 7, 2007, pp. 673-677.
C. Toth et al., "A Normal Bias Toward a Pictorially Defined Top in Line Bisection," Canadian Journal of Neurological Sciences, vol. 23, No. 2, May 1, 1996, pp. 110-113.
N. Liu et al., "Predicting Eye Fixations Using Convolutional Neural Networks," Proceedings of the IEEE Conference on Computer Vision and Pattern Recognition, Jun. 2015, pp. 362-370.
M. Cerf et al., "Predicting Human Gaze Using Low-Level Saliency Combined with Face Detection," Advances in Neural Information Processing Systems, Dec. 2007, 8 pages.

\* cited by examiner

COGNITIVE LOAD SCORING OF A VISUAL STIMULUS

FIELD

The field relates generally to information processing, and more particularly to managing content in information processing systems.

BACKGROUND

Various organizations develop designs that include a visual stimulus with various information content that an organization is seeking to communicate via that visual stimulus. An organization, for example, may provide users with multiple products (e.g., applications, websites and webpages, etc.) for presenting a given design. It can be difficult, however, to adapt the given design for different computing devices, output formats, for individual differences across viewers of the given design, etc. It is also difficult to quantitatively measure the effectiveness of the given design, such as to ensure that the given design communicates a desired amount and type of information.

SUMMARY

Illustrative embodiments of the present disclosure provide techniques for cognitive load scoring of a visual stimulus.

In one embodiment, an apparatus comprises at least one processing device comprising a processor coupled to a memory. The at least one processing device is configured to perform steps of obtaining an information density matrix for an input visual stimulus, the information density matrix characterizing information density of feature points in the input visual stimulus, and identifying one or more clusters of feature points in the input visual stimulus by performing spatial clustering of the feature points utilizing the information density matrix. The at least one processing device is also configured to perform the step of determining a cognitive load score for the input visual stimulus based at least in part on the identified one or more clusters of feature points, the cognitive load score characterizing cognitive energy required to mentally process the input visual stimulus. The at least one processing device is further configured to perform the step of modifying a design of the input visual stimulus to adjust the cognitive load score of the input visual stimulus.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
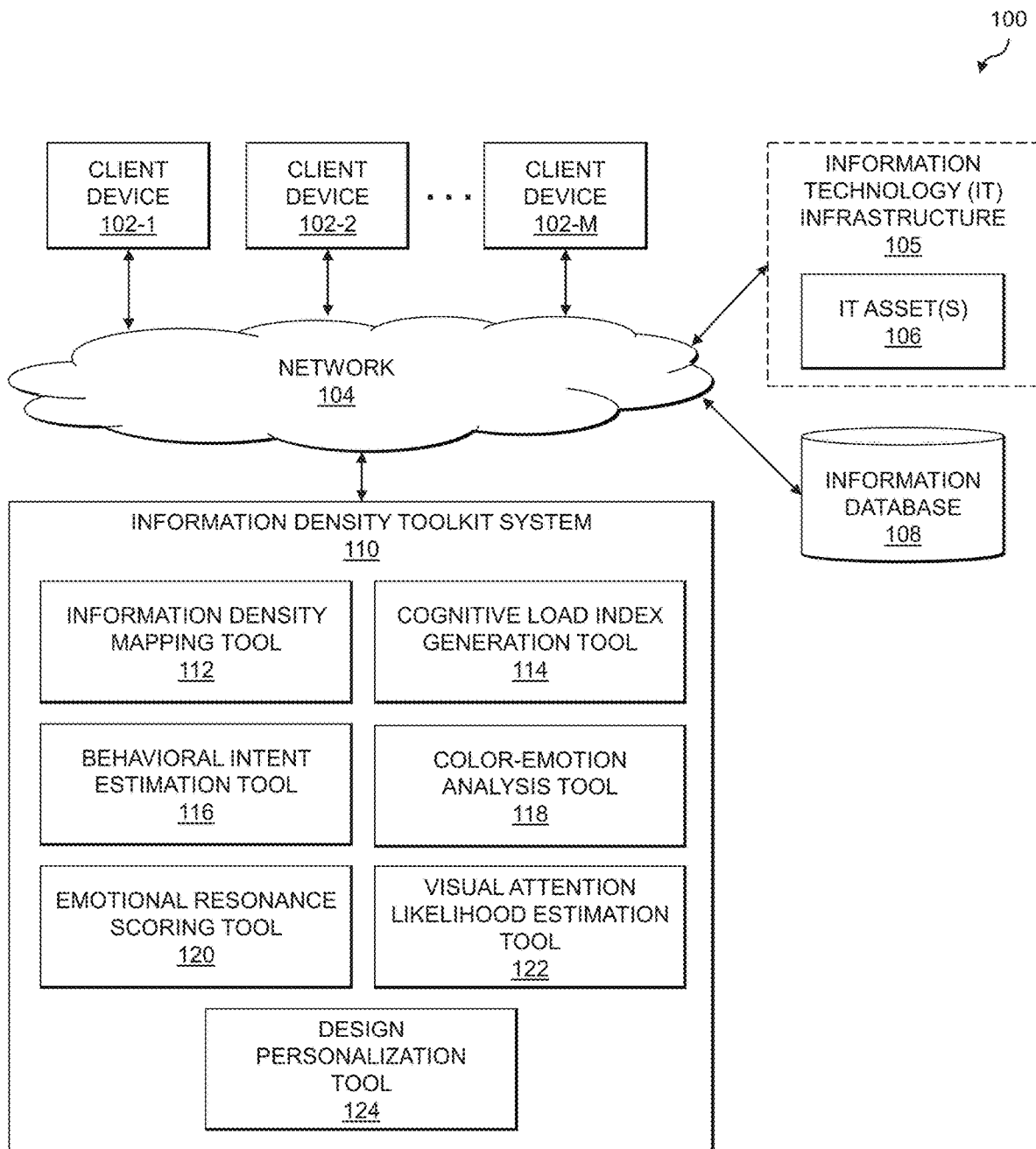
FIG. 1 is a block diagram of an information processing system including an information density toolkit system in an illustrative embodiment.

FIG. 1 shows an information processing system 100 configured in accordance with an illustrative embodiment. The information processing system 100 includes a set of client devices 102-1, 102-2, . . . 102-M (collectively, client devices 102) which are coupled to a network 104. Also coupled to the network 104 is an IT infrastructure 105 comprising one or more IT assets 106, an information database 108, and an information density toolkit system 110. As used herein, "information density" refers to a measure of the amount and compactness of visual features within a design (e.g., a digital design, such as a webpage, a webpage component, a scrollable image, document, etc.). The IT assets 106 may comprise physical and/or virtual computing resources in the IT infrastructure 105. Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), containers, etc.

The IT assets 106 of the IT infrastructure 105 may host applications that are utilized by respective ones of the client devices 102, such as in accordance with a client-server computer program architecture. In some embodiments, the applications comprise web applications designed for delivery from assets in the IT infrastructure 105 to users (e.g., of client devices 102) over the network 104. Various other examples are possible, such as where one or more applications are used internal to the IT infrastructure 105 and not exposed to the client devices 102. It should be appreciated that, in some embodiments, some of the IT assets 106 of the IT infrastructure 105 may themselves be viewed as applications that are to be analyzed for information density.

The information density toolkit system 110 utilizes various information stored in the information database 108 in analyzing input (e.g., source images). Such analysis may include, but is not limited to, determining the information density of the input, a cognitive load (e.g., the information processing demands placed on an individual's brain while completing a task) of the input, behavioral intent of users viewing the input, color-emotion analysis of the input, emotional resonance of the input, visual attention likelihood for different portions of the input, etc. In some embodiments, the information density toolkit system 110 is used for or by an enterprise system. For example, an enterprise may subscribe to or otherwise utilize the information density toolkit system 110 for analyzing input (e.g., source documents, webpages, applications, etc. which are generated and made available or accessed via the IT assets 106 of the IT infrastructure 105, on client devices 102 operated by users of the enterprise, etc.). As used herein, the term "enterprise system" is intended to be construed broadly to include any group of systems or other computing devices. For example, the IT assets 106 of the IT infrastructure 105 may provide a portion of one or more enterprise systems. A given enterprise system may also or alternatively include one or more of the client devices 102. In some embodiments, an enterprise system includes one or more data centers, cloud infrastructure comprising one or more clouds, etc. A given enterprise system, such as cloud infrastructure, may host assets that are associated with multiple enterprises (e.g., two or more different business, organizations or other entities).

The client devices 102 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 102 may also or alternately comprise virtualized computing resources, such as VMs, containers, etc.

The client devices 102 in some embodiments comprise respective computers associated with a particular company, organization or other enterprise. Thus, the client devices 102 may be considered examples of assets of an enterprise system. In addition, at least portions of the information processing system 100 may also be referred to herein as collectively comprising one or more "enterprises." Numerous other operating scenarios involving a wide variety of different types and arrangements of processing nodes are possible, as will be appreciated by those skilled in the art.

The network 104 is assumed to comprise a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks.

The information database 108, as discussed above, is configured to store and record various information that is used by the information density toolkit system 110. Such information may include, but is not limited to, information that is to be analyzed (e.g., for information density, cognitive load, behavioral intent, color-emotion analysis, emotional resonance, and visual attention likelihood). In some embodiments, the information database 108 is a source of input (e.g., one or more images) that are to be analyzed by the information density toolkit system 110. The information database 108 may therefore represent one or more data sources. The information database 108 may also or alternatively store the output of analysis of such input by the information density toolkit system 110. The information database 108 in some embodiments is implemented using one or more storage systems or devices associated with the information density toolkit system 110. In some embodiments, one or more of the storage systems utilized to implement the information database 108 comprises a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the information density toolkit system 110, as well as to support communication between the information density toolkit system 110 and other related systems and devices not explicitly shown.

The client devices 102 are configured to access or otherwise utilize the IT infrastructure 105. In some embodiments, the client devices 102 are assumed to be associated with system administrators, IT managers or other authorized personnel responsible for managing the IT assets 106 of the IT infrastructure 105 (e.g., where such management includes performing analysis of input that is generated and made available by, or accessed by the IT assets 106, or of applications or other software that runs on the IT assets 106). For example, a given one of the client devices 102 may be operated by a user to access a graphical user interface (GUI) provided by the information density toolkit system 110 to analyze input (e.g., one or more source images). The information density toolkit system 110 may be provided as a cloud service that is accessible by the given client device 102 to allow the user thereof to analyze some input. In some embodiments, the IT assets 106 of the IT infrastructure 105 are owned or operated by the same enterprise that operates the information density toolkit system 110 (e.g., where an enterprise such as a business provides support for the assets it operates). In other embodiments, the IT assets 106 of the IT infrastructure 105 may be owned or operated by one or more enterprises different than the enterprise which operates the information density toolkit system 110. Various other examples are possible.

In some embodiments, the client devices 102 may implement host agents that are configured for automated transmission of information to and from the information density toolkit system 110. Such host agents may also or alternatively be configured to automatically receive from the information density toolkit system 110 commands to execute remote actions (e.g., to modify input or source images that are generated and made available to or accessed on or by the client devices 102 and/or the IT assets 106 of the IT infrastructure 105). Host agents may similarly be deployed on the IT assets 106 of the IT infrastructure 105. It should be noted that a "host agent" as this term is generally used herein may comprise an automated entity, such as a software entity running on a processing device. Accordingly, a host agent need not be a human entity.

The information density toolkit system 110 in the FIG. 1 embodiment is assumed to be implemented using at least one processing device. Each such processing device generally comprises at least one processor and an associated memory, and implements one or more tools (e.g., functional features or logic) for controlling certain features of the information density toolkit system 110. In the FIG. 1 embodiment, the information density toolkit system 110 comprises an information density mapping tool 112, a cognitive load index generation tool 114, a behavioral intent estimation tool 116, a color-emotion analysis tool 118, an emotional resonance scoring tool 120, a visual attention likelihood estimation tool 122, and a design personalization tool 124. Functionality of the various tools of the information density toolkit system 110 will be described in further detail below.

It is to be appreciated that the particular arrangement of the client devices 102, the IT infrastructure 105, the information database 108 and the information density toolkit system 110 illustrated in the FIG. 1 embodiment is presented by way of example only, and alternative arrangements can be used in other embodiments. As discussed above, for example, the information density toolkit system 110 (or portions of components thereof, such as one or more of the information density mapping tool 112, the cognitive load index generation tool 114, the behavioral intent estimation tool 116, the color-emotion analysis tool 118, the emotional resonance scoring tool 120, the visual attention likelihood estimation tool 122, and the design personalization tool 124 may in some embodiments be implemented internal to one or more of the client devices 102 and/or the IT infrastructure 105.

At least portions of the information density mapping tool 112, the cognitive load index generation tool 114, the behavioral intent estimation tool 116, the color-emotion analysis tool 118, the emotional resonance scoring tool 120, the visual attention likelihood estimation tool 122, and the design personalization tool 124 may be implemented at least in part in the form of software that is stored in memory and executed by a processor.

The information density toolkit system 110 and other portions of the information processing system 100, as will be described in further detail below, may be part of cloud infrastructure.

The information density toolkit system 110 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 102, the IT infrastructure 105, the information database 108 and the information density toolkit system 110 or components thereof (e.g., the information density mapping tool 112, the cognitive load index generation tool 114, the behavioral intent estimation tool 116, the color-emotion analysis tool 118, the emotional resonance scoring tool 120, the visual attention likelihood estimation tool 122, and the design personalization tool 124) may be implemented on respective distinct processing platforms, although numerous other arrangements are possible. For example, in some embodiments at least portions of the information density toolkit system 110 and one or more of the client devices 102, the IT infrastructure 105 and/or the information database 108 are implemented on the same processing platform. A given client device (e.g., 102-1) can therefore be implemented at least in part within at least one processing platform that implements at least a portion of the information density toolkit system 110.

The term "processing platform" as used herein is intended to be broadly construed so as to encompass, by way of illustration and without limitation, multiple sets of processing devices and associated storage systems that are configured to communicate over one or more networks. For example, distributed implementations of the information processing system 100 are possible, in which certain components of the system reside in one data center in a first geographic location while other components of the system reside in one or more other data centers in one or more other geographic locations that are potentially remote from the first geographic location. Thus, it is possible in some implementations of the information processing system 100 for the client devices 102, the IT infrastructure 105, the IT assets 106, the information database 108, and the information density toolkit system 110, or portions or components thereof, to reside in different data centers. Numerous other distributed implementations are possible. The information density toolkit system 110 can also be implemented in a distributed manner across multiple data centers.

Additional examples of processing platforms utilized to implement the information density toolkit system 110 and other components of the information processing system 100 in illustrative embodiments will be described in more detail below in conjunction with FIGS. 25 and 26.

It is to be understood that the particular set of elements shown in FIG. 1 is presented by way of illustrative example only, and in other embodiments additional or alternative elements may be used. Thus, another embodiment may include additional or alternative systems, devices and other network entities, as well as different arrangements of modules and other components.

It is not currently feasible to quantitatively map, measure and test how effectively digital designs transmit information to a viewer, especially at scale. Without accurate metrics mapping and measuring information density, customers or other end-users can find themselves either under- or over-burdened by the amount of information being provided within a product design. The information density toolkit system 110 provides the information density mapping tool 112 which implements functionality for automating the mapping of the density of information a user will experience when viewing a particular input design (e.g., a product webpage). The information density mapping tool 112 measures the amount of information within the design and provides quantitative statistical output, which can be used to predict or compare the effectiveness of many different product designs prior to launch and to personalize our digital experience in a scalable manner. Such output may be used in or by various other tools of the information density toolkit system 110, such as the cognitive load index generation tool 114, the behavioral intent estimation tool 116, the color-emotion analysis tool 118, the emotional resonance scoring tool 120, the visual attention likelihood estimation tool 122, and the design personalization tool 124.

The Return on Investment (ROI) of the information density mapping tool 112 solutions described herein is high, due to the potential for optimizing direct (e.g., conversion) and indirect (e.g., UCX, CLTV) revenue from product design, especially given the information density mapping tool 112's ability to facilitate more rapid increases in design iteration throughout the design process. Furthermore, the capacity for the information density mapping tool 112 of the information density toolkit system 110 to be leased to outside parties makes it a potential source of direct revenue for an operator of the information density toolkit system 110.

Consider, as an example, a "product" or design input that is a checkout screen of a webpage or web application. The component features of this product (e.g., a "Hero Banner" of the webpage) are built by design teams with the ultimate goal of transmitting visual information to viewers (e.g., customers or other end-users). However, human visual perception and cognition have natural limitations on the amount of information that can be perceived and processed at any given moment. Designers do not currently have a means of measuring or predicting how effectively a design will transmit information to viewers, which prevents designers from creating a scalable, personalized digital experience for customers or other end-users.

The amount of information that can be perceived at any given time is largely dependent on the quantity and quality of the content at hand. The semantic content of this information can take many forms, such as: company or product information; procedural information; social information; etc. The amount of information on a screen or within a specific area of interest (AOI) can vary from sparse to rich, depending on the design at hand. Likewise, the semantic characterization of the information can range from entirely homogenous (e.g., a banner with product information only) to extremely heterogenous (e.g., a banner with product information, social ratings, procedural information on purchasing, etc.). The quantity and quality of information on a screen are representative of the cognitive demands placed on the viewer, thus serving as predictors of the following: cognitive load; findability; accessibility; usability; information recall; customer satisfaction; emotional resonance; etc. Effective digital design functions to minimize a viewer's cognitive load and maintain it at reasonable levels, which makes the most of his or her limited human cognitive capacity by facilitating the maximum potential for information retrieval and effective processing.

Conventional approaches lack the ability to quantitatively map the amount and type of information transmitted to a user during visual inspection. Designers are therefore unable to measure the cognitive demands placed on viewers. The launch of suboptimal content design has the potential to negatively impact financials and user experience. Various tools of the information density toolkit system 110, including but not limited to the information density mapping tool 112, can solve these and other issues by allowing researchers to measure and predict the cognitive load imparted on viewers pre-launch.

Conventional approaches can also be difficult to scale. Although usability and A/B testing can be extremely powerful, implementation and analysis require, on average, two weeks per test. Furthermore, a new test or test condition must be implemented for each webpage or component feature of interest. It is therefore not tenable to test more than five or six potential "recipes" prior to launch. As such, it is not feasible to test many variations in design features and layouts in a systematic, controlled way without great time, effort and resource expenditure. The information density toolkit system 110 enables incorporation of an automated, quantitative analysis either: as governance into the design systems language itself, or as a pre-launch analytic toolkit for designers. The information density toolkit system 110 can therefore remedy these and other problems, enabling designers to experiment in a scalable, proactive way.

Conventional approaches further lack the ability to analyze and compare the cognitive demands that different types of information (e.g., text vs. images, social vs. non-social images, etc.) have on a viewer. The cognitive load a viewer experiences can vary according to the type and modality of information (e.g., social vs. technical information). The information density toolkit system 110 can advantageously provide an automated method for classifying the semantic content of information within a digital design, aiding designers in optimizing viewers' cognitive load while interacting with their designs. Additionally, the accrual of classified semantic content and associated outcome ascertainment will be a useful resource for designers looking to efficiently experiment. Semantic content classification refers to the characterization and grouping of information based on their meaning or other implicit categorical grouping (e.g., faces can be classified as implicitly "social").

The information density toolkit system 110 provides the information density mapping tool 112 for automating the detection and quantification of information contained within a visual stimulus or design (e.g., a webpage or component thereof, a product image, a screen or AOI of an application graphical user interface (GUI), etc.). The information density mapping tool 112 can be used to predict and optimize the cognitive demands placed on an individual during visual inspection of the visual stimulus. The information density mapping tool 112 thus imparts a scalable means of personalizing digital experience. Text analysis, area analysis, and semantic categorization of image contents provide additional means of information specification and optimization.

Figure 2A:
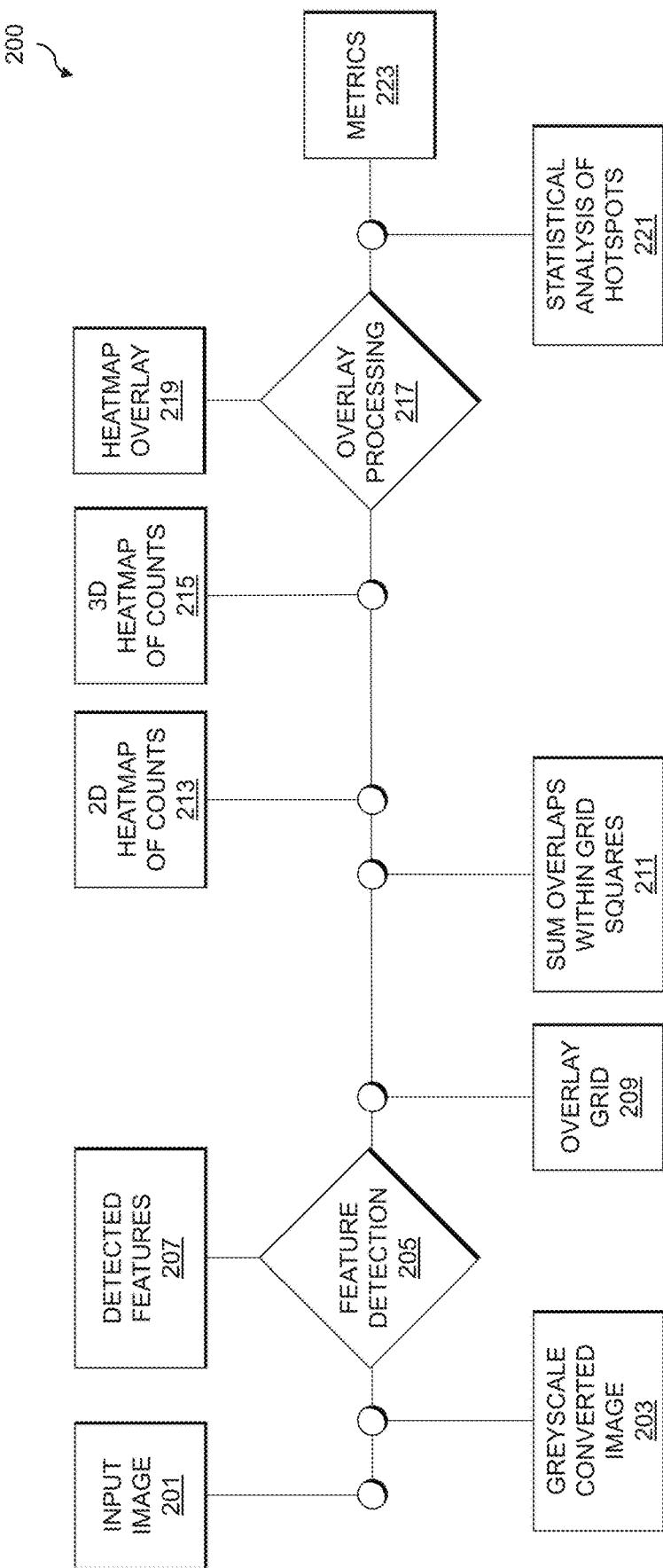
FIGS. 2A-2I show a system flow for an information density mapping tool in an illustrative embodiment.
Figure 2B:
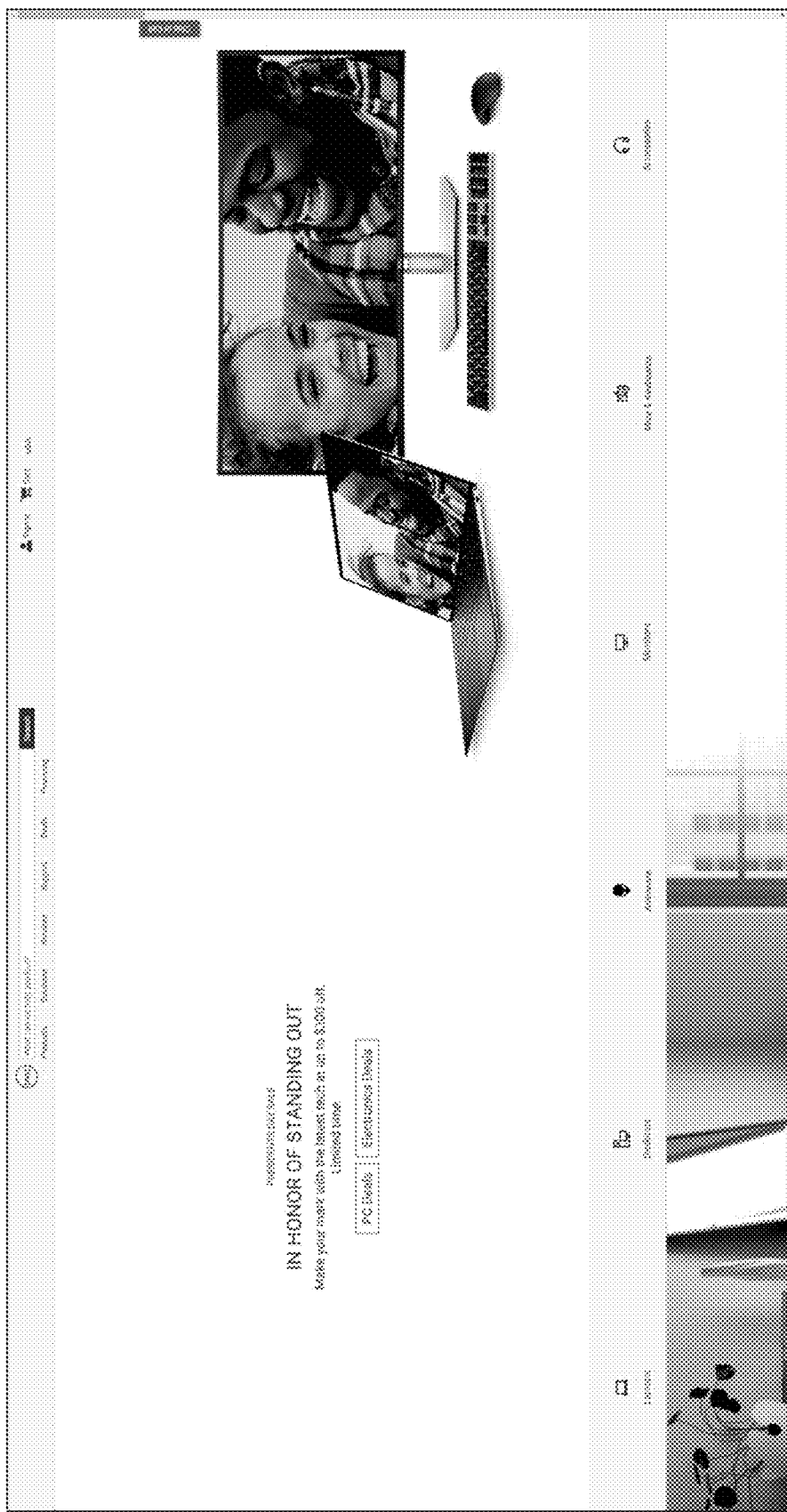

FIGS. 2A-2I show a system flow 200 for operation of the information density mapping tool 112. FIG. 2A shows an overview of the system flow 200, while FIGS. 2B-2I show examples of the input and output at different steps of the system flow 200. The system flow 200 begins with an input image or design 201, which is illustratively a 2-dimensional (2D) image file (e.g., a *.jpg file, a *.png file, etc.) or pre-render code (e.g., Java script). In the description below, the input image 201 is assumed to be a color image file. The input image 201 is next converted to a greyscale image 203 for improved feature detection and analysis (e.g., such that other information may be overlayed over the greyscale image 203 in color to highlight various features thereof). FIG. 2B shows an example of an input image 201 that is converted into greyscale image 203.

Figure 2C:
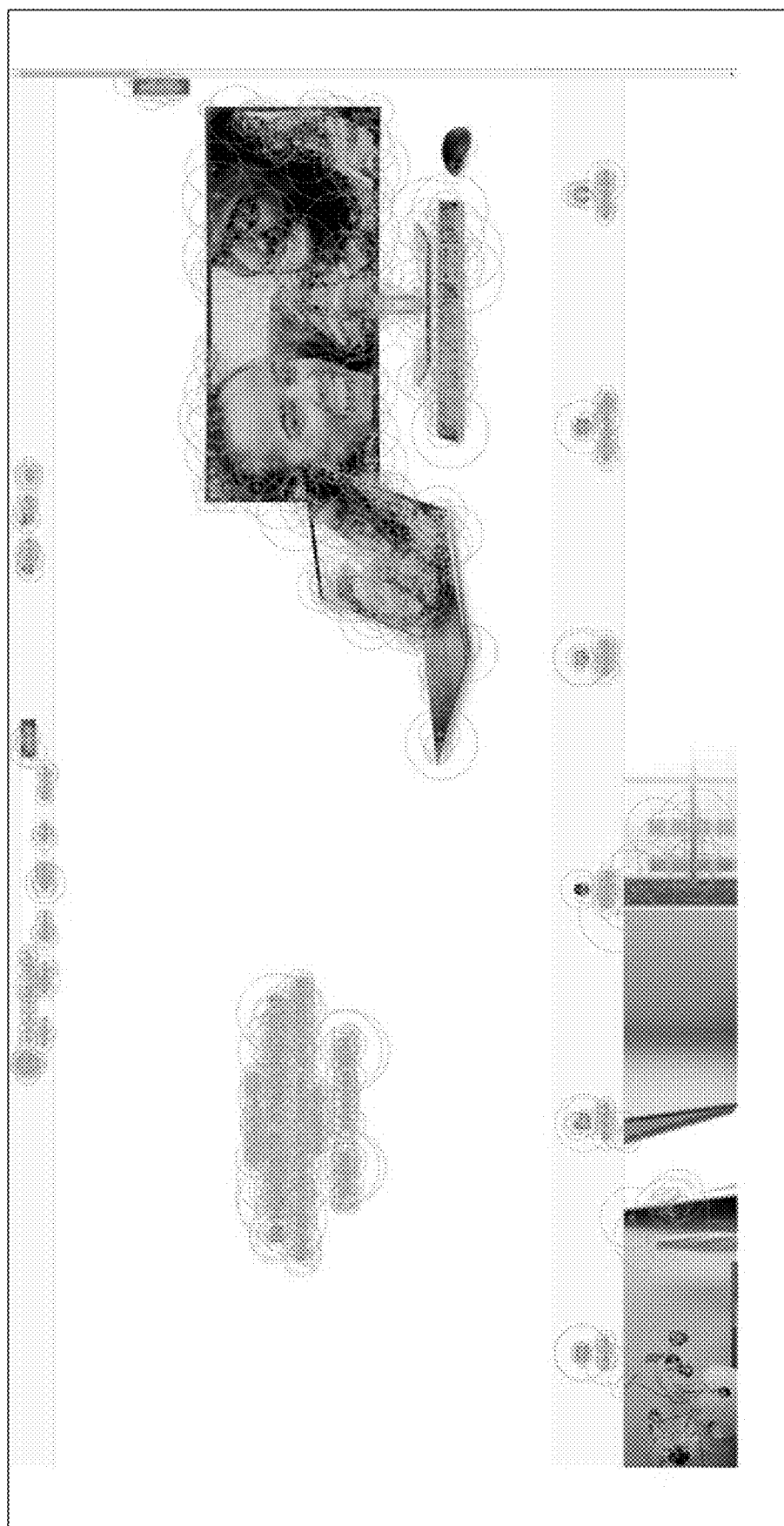

Feature detection 205 is then performed. Feature detection 205 includes calling one or more functions that automatically detect and catalog point features within the input image 201 and/or the greyscale image 203. Feature detection 205 may include detection of many features, with a subset (e.g., the strongest detected features) being selected and run through one or more algorithms with optional specifications. Feature detection 205 can be performed using one or more algorithms, including but not limited to: detection of corner points (e.g., using Harris-Stephens and/or minimum eigenvalue algorithms, etc.); detection of key points (e.g., using an Oriented Features from Accelerated Segment Test (FAST) and Rotated Binary Robust Independent Elementary Features (BRIEF) algorithm); detection of blob features (e.g., using a Speeded-Up Robust Features algorithm); etc. Once feature detection 205 is performed, the strongest feature points are selected and plotted to produce detected features 207 as shown in FIG. 2C.

Figure 2D:
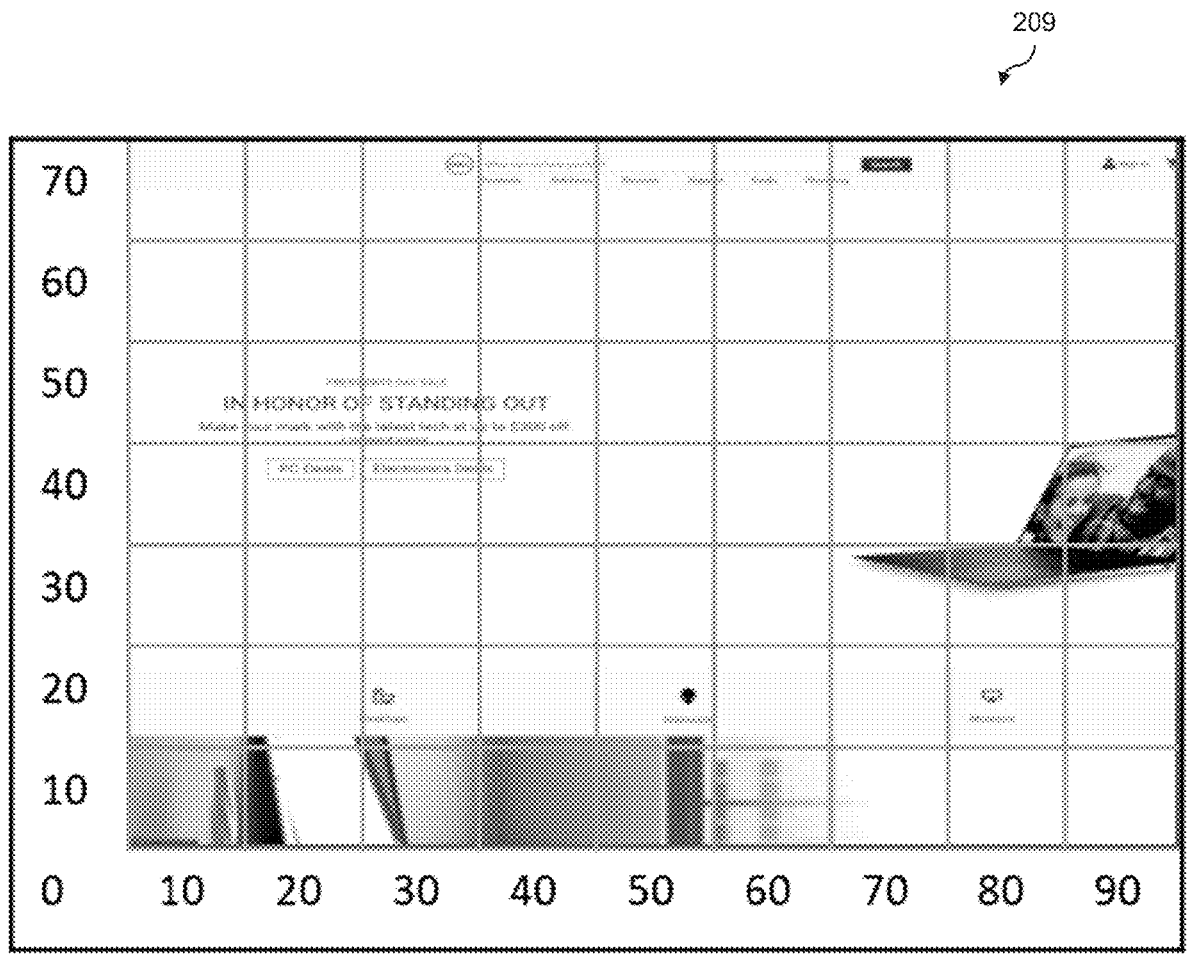
Figure 2E:
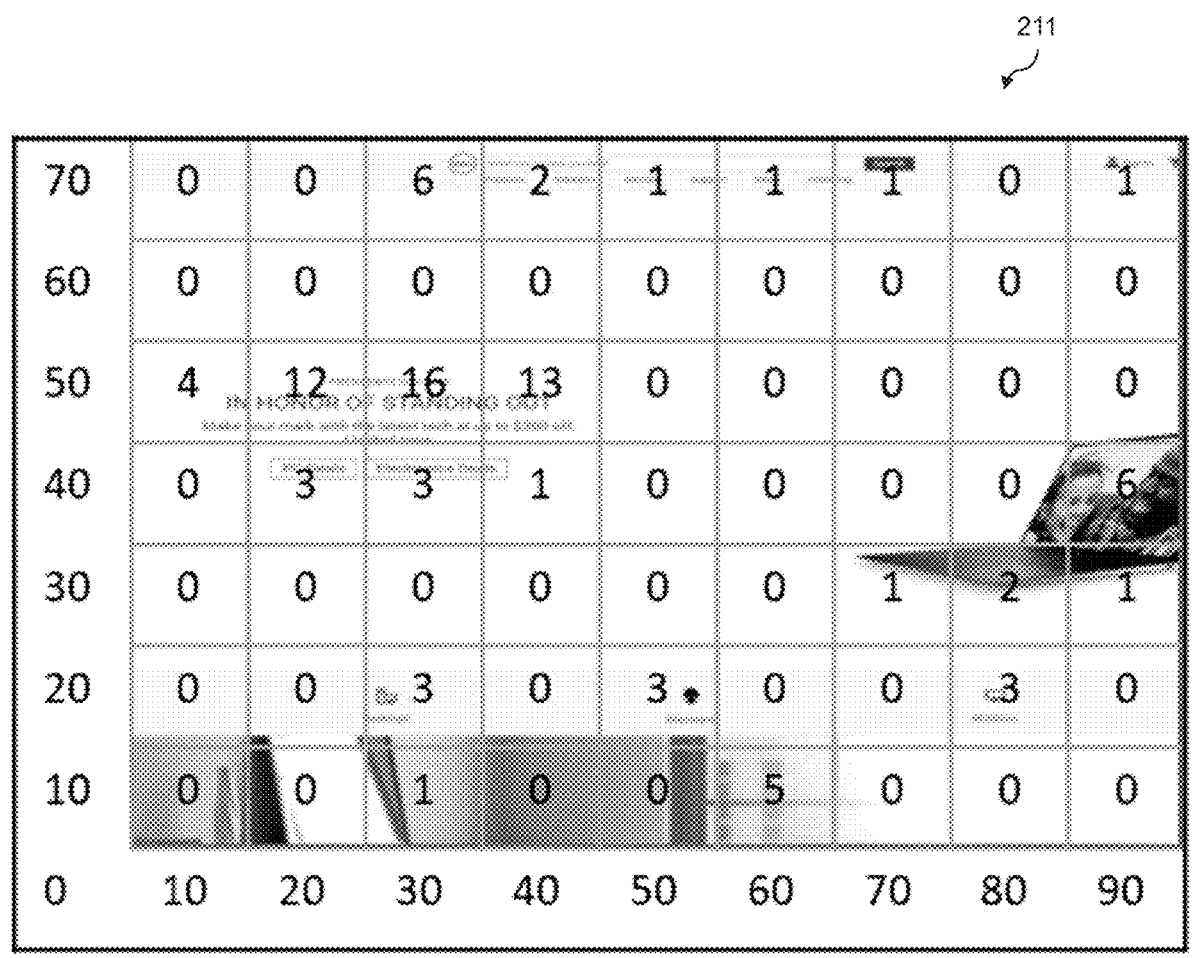

A grid is then overlayed over the input image 201 or greyscale converted image 203 to produce overlay grid 209, which is shown in FIG. 2D. The overlay grid 209 includes a grid of equally spaced bins. Next, a summation of overlapping features is performed to generate a sum of overlaps within the grid squares 211 as shown in FIG. 2E. Summation of overlapping features may include transforming point densities into bivariate histogram counts by summing arrays across equally spaced bins.

Figure 2F:
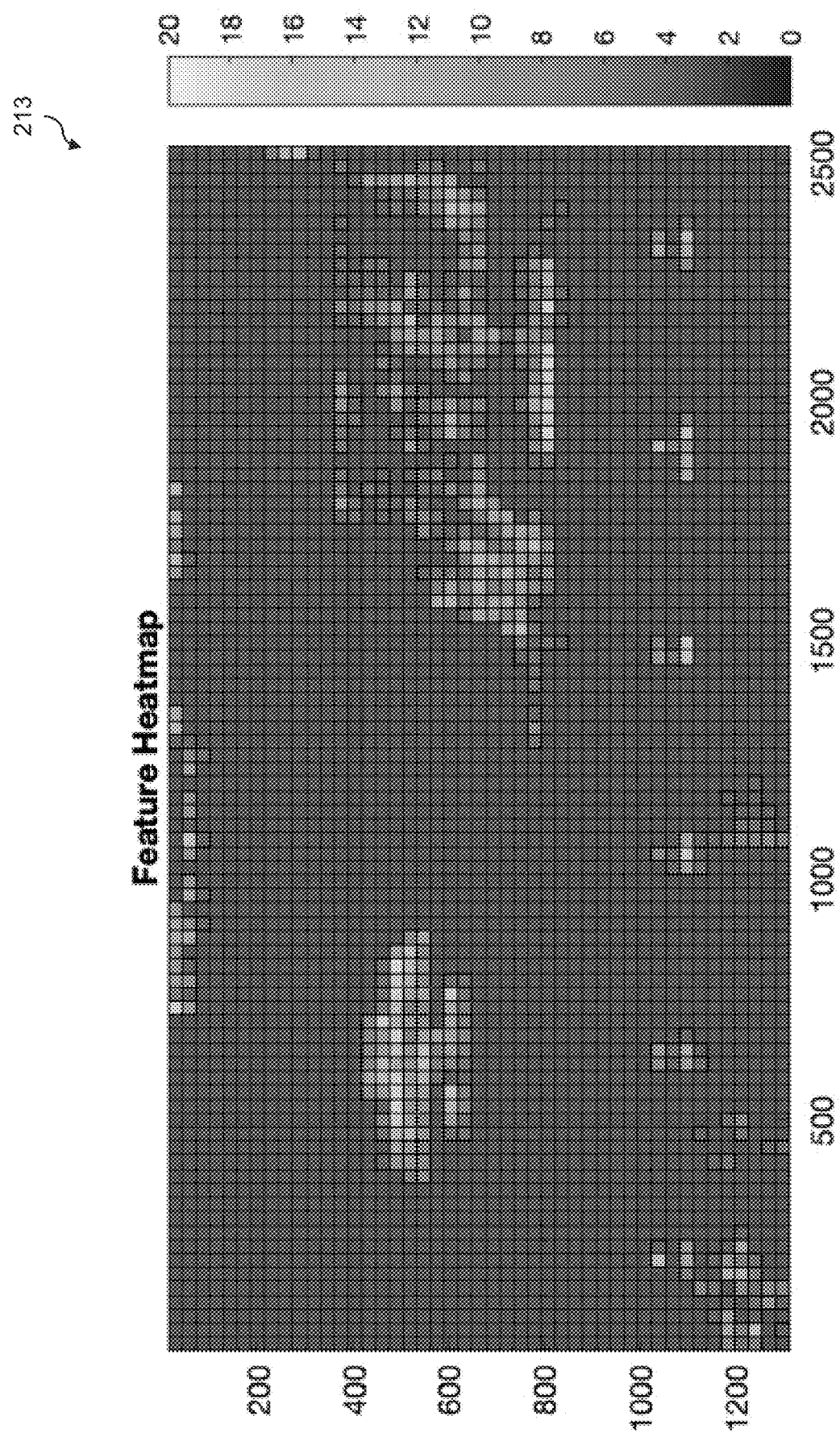
Figure 2G:
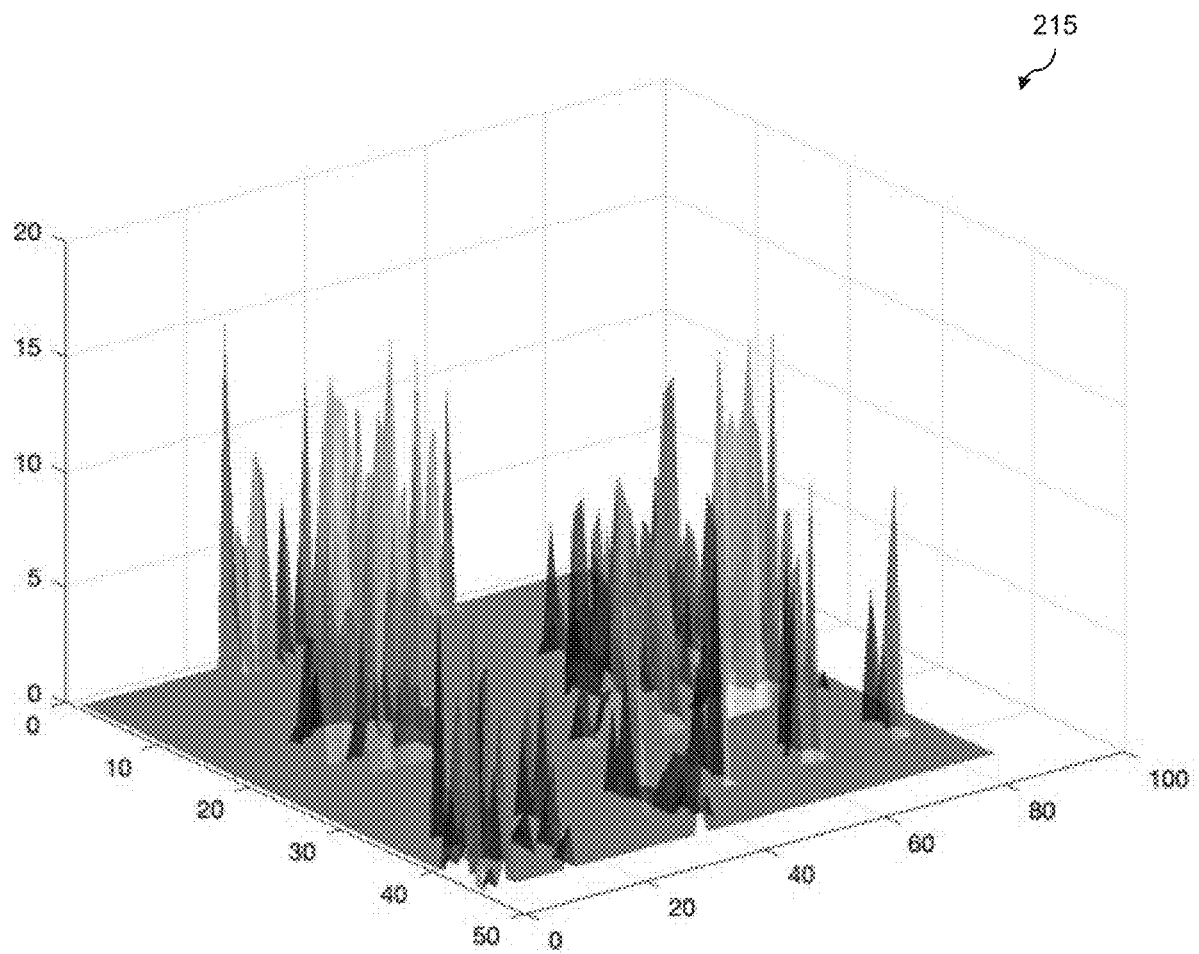

Subsequently, gridded heatmaps representing 2D and three-dimensional (3D) histograms of information density (e.g., feature densities) within the input image 201 are generated and output as the 2D heatmap of counts 213 shown in FIG. 2F, and the 3D heatmap of counts 215 shown in FIG. 2G. The 2D heatmap of counts 213 shows densely populated grid squares with lighter shades of grey, and sparsely populated grid squares (e.g., white space) with darker shades of grey. The 3D heatmap of counts 215 uses peaks to represent densely populated grid squares and valleys to represent sparsely populated grid squares.

Figure 2H:
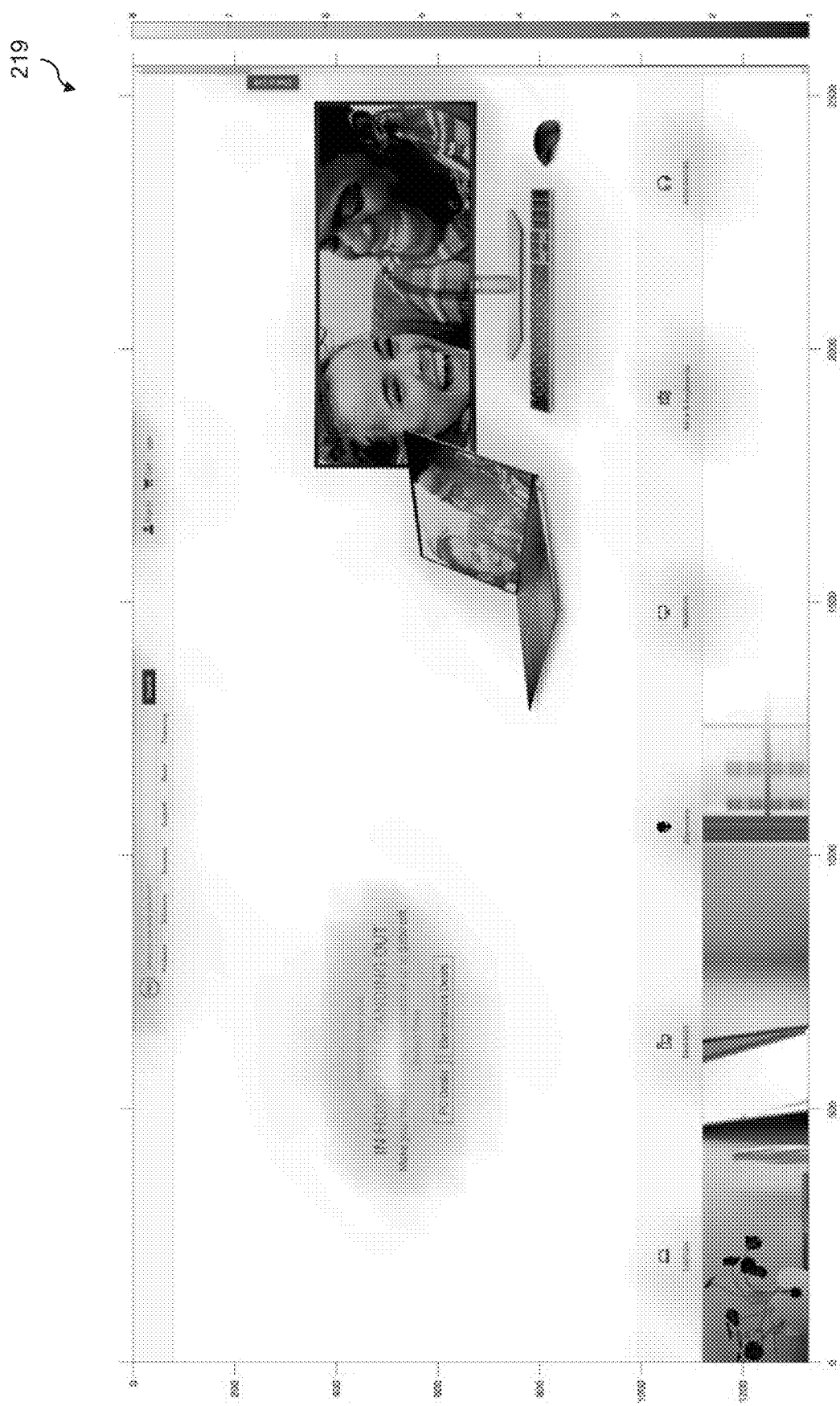

Overlay processing 217 is then performed to generate a heatmap overlay 219, shown in FIG. 2H. The overlay processing 217 produces a smoothed heatmap overlaying the input image 201 by: representing the point densities in a mesh grid; interpolating point densities across the mesh grid to smooth corners; setting alpha of null grids to zero to allow the original input image 201 to shine through; and plotting the interpolated alpha data mesh grid over the input image 201. The heatmap overlay 219 provides a visualization tool, highlighting areas of "too little" or "too much" information density to designers and researchers.

Figure 2I:
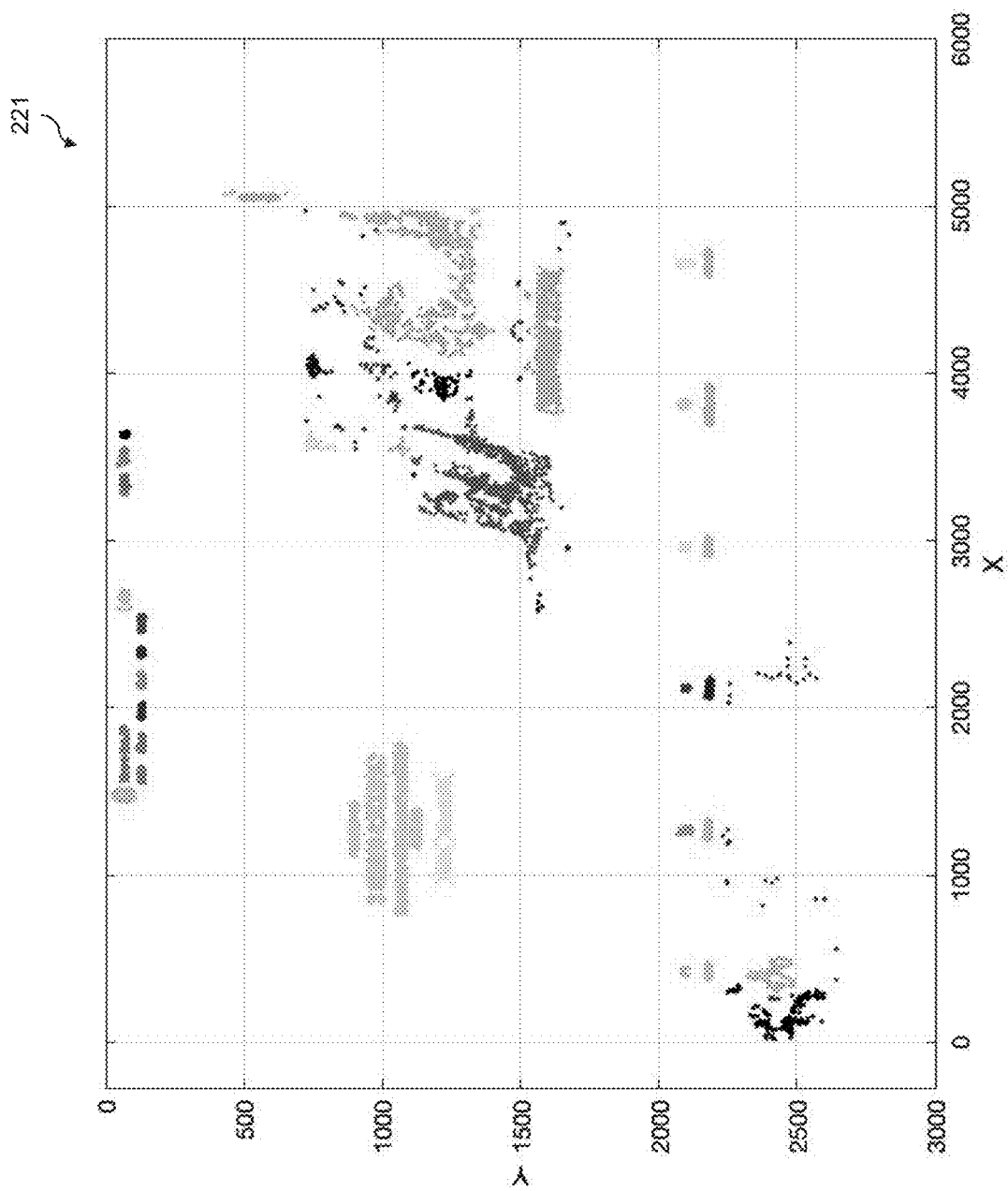

Statistical analysis of hotspots 221 is then performed, as shown in FIG. 2I. A "hotspot" illustratively refers to a cluster of points within a spatial area of a design. In some embodiments, the statistical analysis includes density-based spatial cluster analysis. If no area(s) of interest or feature(s) of interest are specified by a user, the FIG. 2 system flow may end, with the output thereof being used in generating one or more of: a Cognitive Load Index (CLI) score using the cognitive load index generation tool 114; behavioral intent estimations using the behavioral intent estimation tool 116; a map of color-emotion analysis using the color-emotion analysis tool 118; emotional resonance scores using the emotional resonance scoring tool 120; a user-defined AOI map for visual attention likelihood using the visual attention likelihood estimation tool 122; design personalization using the design personalization tool 124; etc. Various other descriptive measures and metrics may be output, including but not limited to: the mean value of the entire point density matrix; an information to whitespace signal-to-noise ratio (e.g., calculated as the count of null matrix elements, divided by the count of nonzero matrix elements); etc. The statistical analysis of hotspots 221 may include automatic identification of clusters (e.g., by color as shown in FIG. 2I). The overlay processing 217 may also result in various metrics 223, such as descriptive density statistics, a number of clusters, the size of clusters, the distance of clusters, etc.

The information density mapping tool 112 may be further specified, for example, by an end-user delineating one or more features of interest. The features of interest may include, but are not limited to: one or more strings of text (e.g., "Black Friday Sale"); one or more areas of the image (e.g., upper-left quadrant); one or more semantic categories (e.g., faces); etc. Such input features of interest subsequently initiate a cascade classifier that attempts to further specify the requested informational content within the input image 201 for such specified features of interest. If any such features of interest can be found within the input image 201, the output of this specification is one or more areas of interest (AOIs). A graphical display of the AOIs within the input image 201 is then returned. Various specific measures may also be returned as output based on the user specifications, as detailed below.

An end-user may optionally input one or more text strings in order to identify one or more AOIs (e.g., rectangular AOIs) matching one or more of the specified text strings within the input image 201. For each AOI that is identified, one or more of the following measures may be computed: the CLI score within the AOIs, and for the entire input image 201; descriptive statistics of individual components of information density within the AOIs, and for the entire input image 201; a comparison of CLI scores in the AOI compared to other specified AOIs; and the predicted likelihood of a fixation sequence to fall within the AOIs.

The end-user may also or alternatively optionally input the coordinates of one or more AOIs within the input image 201. For each AOI that is identified, one or more of the following measures may be computed: the CLI score within the AOIs, and for the entire input image 201; descriptive statistics of individual components of information density within the AOIs, and for the entire input image 201; a comparison of CLI scores in the AOI compared to other specified AOIs; and the predicted likelihood of a fixation sequence to fall within the AOIs.

The end-user may further or alternatively optionally input one or more semantic categories to be identified within the input image 201. One or more machine learning algorithms may be trained on the user-specified semantic content, such as by using pairs of "Yes" and "No" folders. For each pair, the "Yes" folder contains images of a given semantic category to be identified (e.g., human faces), while the "No" folder contains images not associated with the given semantic category (e.g., household objects). This type of semantic categorization may also be used to categorize the semantic content of individual words (e.g., social: "friend", "we", etc.) against non-category words (e.g., non-social: "purple"). The information density mapping tool 112 will subsequently output a graphical display with rectangular boxes surrounding any identified AOIs. For each AOI that is identified, one or more of the following measures may be computed: the CLI score within the AOIs, and for the entire input image 201; descriptive statistics of individual components of information density within the AOIs, and for the entire input image 201; a comparison of CLI scores in the AOI compared to other specified AOIs; the predicted likelihood of a fixation sequence to fall within the AOIs; a detailed breakdown of semantic content classification; and an emotional resonance score.

The information density mapping tool 112 can advantageously provide quantitative analysis of information density in digital design. The information density mapping tool 112 can quantify and map the amount of information conveyed from a digital design. This allows for quantitative analysis and simultaneous comparison across multiple digital designs, which in turn makes predictive analyses and assessment of cognitive load possible (e.g., for use in generating CLI values using cognitive load index generation tool 114, behavioral intent estimations using behavioral intent estimation tool 116, color-emotion analysis using color-emotion analysis tool 118, emotional resonance scores using emotional resonance scoring tool 120, visual attention likelihood estimations using visual attention likelihood estimation tool 122, design personalization using design personalization tool 124). This can be used to improve the customer experience (e.g., by reducing cognitive load, increasing findability, etc.).

The information density mapping tool 112 described herein also provides a fully automated solution, which means that the information density mapping tool 112 can test and/or compare a vast number of potential designs on the order of seconds or minutes, rather than days or weeks. This represents an impactful increase in the capacity for iterating and improving on design. It also represents a scalable means of personalizing digital experience. For example, an individual with accessibility needs could benefit by a personalized digital experience that limits the cognitive load of digital content. Thus, output of the information density mapping tool 112 can also be used to generate design personalization using the design personalization tool 124 (e.g., automatically rescaling webpage layouts to adjust the density of information on an individual basis).

The information density mapping tool 112 also provides automated methods of classifying the semantic content within a digital design. In some embodiments, a machine learning-based solution allows designers to further optimize cognitive load by adjusting how homogenous or heterogenous the semantic content of a design is (e.g., using the design personalization tool 124). Users of the information density mapping tool 112 will further benefit by being able to predict emotional resonance, and better assess potential viewers' cognitive load.

Conventional approaches for measuring a product's (e.g., a digital design's) effectiveness include A/B and user testing. Such conventional approaches allow designers to test their design "recipes", use feedback to iterate on designs, and ultimately place a winning recipe into production. However, A/B tests and user testing are time-consuming and do not scale well. The information density mapping tool 112 described herein can advantageously be used, prior to testing, in order to reduce the testing iteration cycle and improve customer or other end-user experience.

Ideally, product design offers users an experience that avoids both cognitive overload and cognitive boredom. The information density mapping tool 112 described herein can map and measure the amount of information on a page or other portion of a digital design in order to increase one or more of: findability; usability; accessibility; customer satisfaction; engagement; information retention; and emotional resonance. By improving one or more of these and other factors, the information density mapping tool 112 can provide a key competitive advantage in positively impacting conversion rates (e.g., as there is a significant correlation between cognitive load and conversion rates). Furthermore, the information density mapping tool 112 can be offered as a service to various companies or other entities to provide a direct revenue generator for the operator of the information density toolkit system 110.

The information density mapping tool 112 described herein also provides a solution that can save a company or other entity indirectly by speeding up product design iteration, avoiding opportunity costs associated with launching of suboptimal designs, and avoiding other, more time-consuming methods of design testing. Further, the information density mapping tool 112 described herein represents a cutting-edge method of differentiation by using automation at scale. The potential applications of the information density mapping tool 112 can also extend beyond digital design, allowing for adaptively tailoring products and services to individual customer's unique cognitive needs. Product differentiation, personalization, unification, and accessibility efforts could all benefit from the metrics made available by the information density mapping tool 112.

Figure 3A:
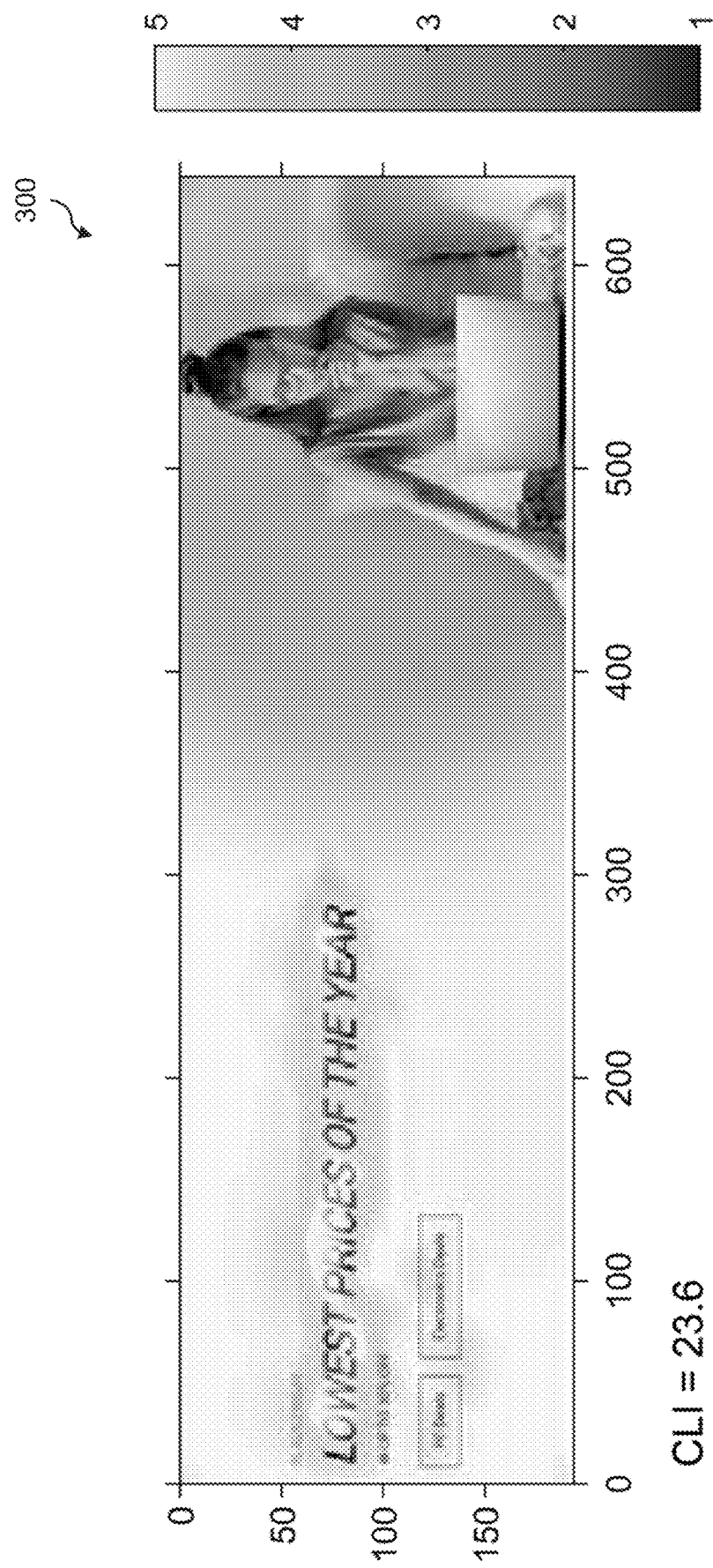
FIGS. 3A and 3B show examples of heatmap overlays for two input design images along with associated cognitive load index values in an illustrative embodiment.
Figure 3B:

FIGS. 3A and 3B shows examples 300 and 305 of two versions of a "Hero Banner" for a Black Friday promotional webpage. The example 300 has a CLI score of 23.6, while the example 305 has a CLI score of 18.2. In some embodiments, CLI scores have a numeric output ranging between 1 and 100, with the values predicting the cognitive demands a given design will place on a viewer. Thus, example 305 places less cognitive load on the viewer than does example 300. Both the examples 300 and 305 have the densest information at the bolded promotional content "Lowest Prices of the Year" and at the eyes of the woman in the banner image. In both examples, the Call-to-Action (CTA) buttons for "PC Deals" and "Electronic Deals" lie within hotspots. FIGS. 3A and 3B illustrate how the information density mapping tool 112 may be used to compare and refine a digital design.

Figure 4:
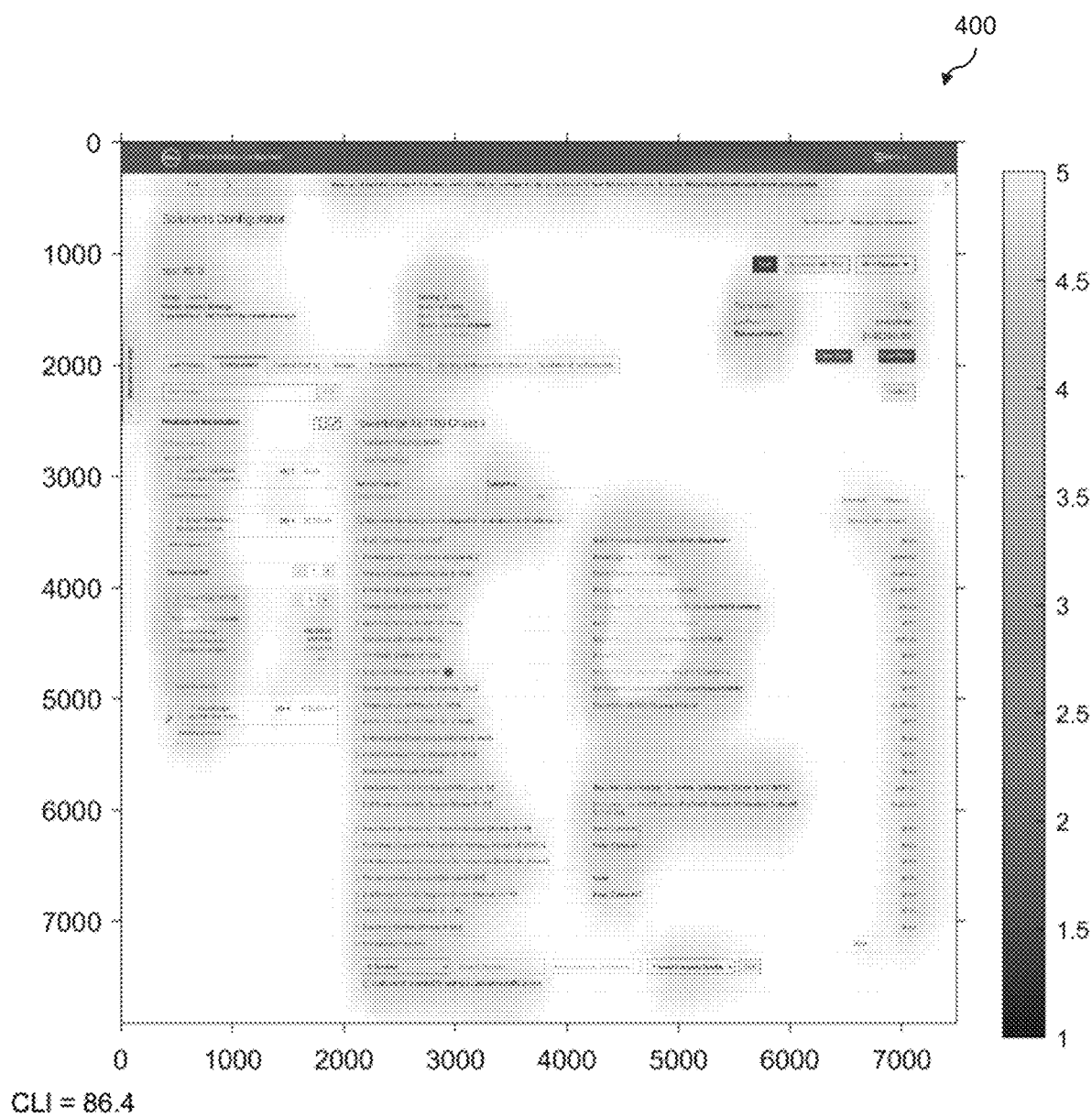
FIG. 4 shows another example of a heatmap overlap for an input image along with a cognitive load index in an illustrative embodiment.

FIG. 4 shows an example 400 view of an Online Sales Counselor (OSC) configurator tool, which may be used by a sales team of an enterprise. It is clear from the extremely high density of information mapped in the example 400 that the members of the sales team must deal with high cognitive load (e.g., a CLI score of 86.4) while using the OSC configurator tool. This implies that a redesign of the OSC configurator tool interface should incorporate fewer clusters of information, smaller clusters of information, clusters that are well-delineated by whitespace, and information that is hierarchically organized (e.g., with differentiated font sizes and overall size of the information area).

An exemplary process for information density mapping of visual stimulus will now be described in more detail with reference to the flow diagram of FIG. 5. It is to be understood that this particular process is only an example, and that additional or alternative processes for information density mapping of a visual stimulus may be used in other embodiments.

In this embodiment, the process includes steps 500 through 508. These steps are assumed to be performed by the information density toolkit system 110 utilizing the information density mapping tool 112 and the design personalization tool 124.

The process begins with step 500, obtaining an input visual stimulus. The input visual stimulus may comprise, for example, an image file. The image file may be of a product, an application screen or portions thereof, a website or webpage or portion thereof, a document, etc., that is to be analyzed for its associated information density. In step 502, feature points in the input visual stimulus are detected. Step 502 may utilize at least one of a corner point detection algorithm, a key point detection algorithm, and a blob feature detection algorithm.

Densities of the detected feature points in each of the two or more distinct regions of the input visual stimulus are identified in step 504. Relative information density in the two or more distinct regions of the input visual stimulus is determined in step 506. Step 506 may comprise calculating at least one of: a mean value of a point density matrix of the detected feature points; and an information to whitespace signal-to-noise ratio, the information to whitespace signal-to-noise ratio being calculated as a count of null elements in the point density matrix divided by a count of nonzero elements in the point density matrix. Step 506 may also or alternatively comprise performing a density-based spatial cluster analysis of the detected feature points to identify statistical hotspots representing ones of the two or more distinct regions of the input visual stimulus having an information density exceeding a designated threshold.

In some embodiments, step 504 comprises overlaying a grid of equally spaced bins over the input visual stimulus and generating bivariate histogram counts for the bins of the overlay grid. The bivariate histogram counts represent numbers of the detected feature points in each of the bins of the overlay grid. Step 506 may comprise generating at least one information density heatmap representing the generated bivariate histogram counts for the bins of the overlay grid. The at least one information density heatmap may comprise a two-dimensional heatmap of the grid of equally spaced bins. The at least one information density heatmap may also or alternatively comprise a three-dimensional heatmap of the grid of equally spaced bins in which peaks of the three-dimensional heatmap represent densely populated ones of the bins and valleys represent sparsely populated ones of the bins. The at least one information density heatmap may be generated by representing the identified densities of the detected feature points in a mesh grid surface, interpolating the identified densities of the detected feature points across the mesh grid surface to generate an interpolated mesh grid surface that smooths corners, setting an alpha value of null grids in the interpolated mesh grid surface to zero to generate an interpolated alpha mesh grid surface, and plotting the interpolated alpha mesh grid surface over the input visual stimulus.

In some embodiments, step 506 comprises determining, for one or more user-specified features of interest, at least one of: cognitive load index scores for one or more areas of interest of the input visual stimulus containing at least one of the one or more user-specified features of interest; descriptive statistics of individual components of information density within the one or more areas of interest; a comparison of the cognitive load index scores across different ones of the one or more areas of interest; and a predicted likelihood of a fixation sequence to fall within the one or more areas of interest. The user-specified features of interest may comprise at least one of: one or more text strings of interest; coordinates for at least one of the one or more areas of interest; and one or more semantic categories of interest. Step 506 may further comprise generating a visualization of the input visual stimulus highlighting the one or more areas of interest.

Figure 5:
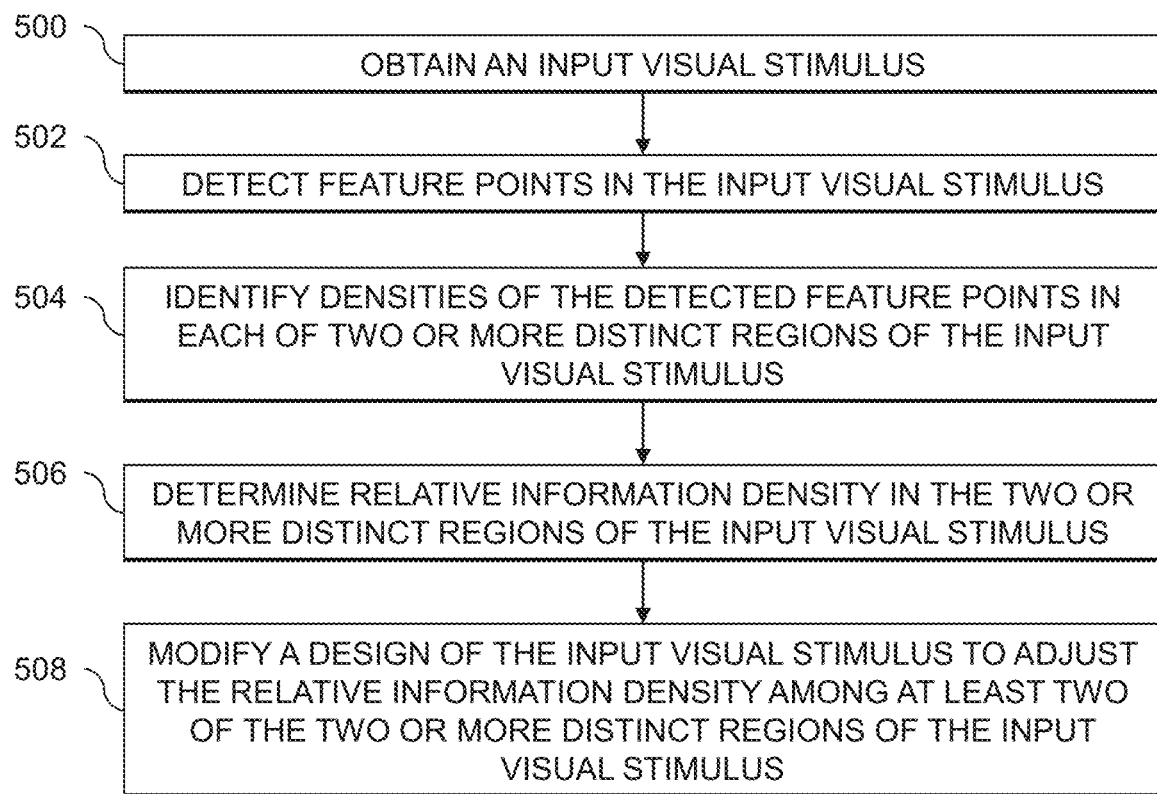
FIG. 5 is a flow diagram of an exemplary process for information density mapping of visual stimulus in an illustrative embodiment.

The FIG. 5 process continues with step 508, modifying a design of the input visual stimulus to adjust the relative information density among at least two of the two or more distinct regions of the input visual stimulus. Step 508 may comprise at least one of: modifying content in at least a given one of two or more distinct regions of the input visual stimulus; moving content from a first one of the two or more distinct regions of the input visual stimulus to a second one of the two or more distinct regions of the input visual stimulus; and adjusting a distance between the at least two of the two or more distinct regions of the input visual stimulus.

Currently, designers and researchers do not have a method to measure the cognitive demands imparted on an individual while viewing and interacting with digital content. Compared to a webpage with sparsely populated content, webpage content that is very densely populated requires a greater amount of cognitive energy in order for a viewer to process the information and complete an intended task. Too many potential fixation points can lead to attentional blindness at one or more features where attention is intended (e.g., viewers fail to find and interact with an intended CTA). Conversely, too little content within a page can lead to cognitive boredom, increasing page exits and/or the number of pages needed for a user to complete a task. The techniques described herein provide a novel quantitative measure for computing cognitive load, referred to as the Cognitive Load Index or CLI, generated using the cognitive load index generation tool 114. CLI values may be used in various other tools of the information density toolkit system 110. For example, the CLI values may be used as an input for the visual attention likelihood estimator tool 122 and the design personalization tool 124. The CLI values may also be part of an output of the information density mapping tool 112, etc. The CLI values may be used for optimizing digital design to enhance information transmission, retention, and usability for end-users. Given that each individual is unique in his or her cognitive capacity, CLI values allow for scalable, neurodiversity-based personalization for digital experience.

The novel solutions for generating CLI values described herein represent an automated method of statistically analyzing digital content to determine its potential for placing cognitive demands on our users. As noted above, CLI values may be provided as a quantitative output of the information density mapping tool 112, which maps the density of information contained within a digital design. The CLI is illustratively a numerical output that can range from 1 to 100, representing the range from extremely sparse content to extremely dense content within a design. The goal of the CLI is to anchor the optimization of digital content, transmission, and retention of information in a standard, interpretable scale. In turn, designers who use the CLI will be better able to facilitate task completion (e.g., reduce negative sentiment, errors and exits) and to enhance digital experiences (e.g., increase usability metrics, conversion rates, and long-term customer value) for individual end-users.

The visual complexity of a digital design directly affects how a user can cognitively process and interact with the content. Visually processing a large amount of densely packed digital content represents a difficult task for a user's cognitive system. Conversely, there is a risk of cognitively boring users when a design's content is too sparse. Without a quantitative method for measuring the potential demands a digital design might place on users' cognitive processes, designers are unable to predict and optimize digital content to better meet users' individual needs.

Conventional cognitive demand assessments require in-person laboratory assessment of physiologic responses to visual stimuli. Conventional remote user research techniques lack the ability to quantify the amount of information transmitted to a user during visual inspection. Such conventional approaches are therefore unable to measure the cognitive demands placed on users. The launch of suboptimal content design has the potential to negatively impact financials and user experience. Development of the cognitive load index would solve this issue by allowing researchers to measure and predict the cognitive load imparted on viewers.

There is currently no automated way to predict a user's cognitive load response to digital content. Some conventional approaches for measuring cognitive load rely on eye-tracking and other in-person biometric measures. These approaches, however, cannot be automated or utilized outside of research laboratories and therefore do not scale well. Conventional approaches also have no means of optimizing digital content to an individual user's cognitive abilities. Without knowledge of how an individual's brain might be able to process visual information (e.g., an individual with accessibility requirements might perform better with sparser content), designers cannot personalize digital experience to users' specific cognitive needs.

Figure 6:
FIG. 6 is a table showing scenarios and their interpretation for spatial clustering of feature values in an illustrative embodiment.

In some embodiments, the cognitive load index generation tool 114 takes as input a matrix of values outputted from the information density mapping tool 112. The input matrix represents the density of information within the digital design inputted into the information density mapping tool 112. In order to facilitate simple comparability and interpretation of cognitive load, several statistical measures based on the spatial clustering of the input matrix may be combined into a single index value. Spatial autocorrelation statistics will be used to assess the clusters' size, number, and distance to evaluate whether a given pattern of content is clustered, dispersed, or random. As spatial autocorrelation is an inferential statistic, it is interpreted in the context of the null hypothesis ($H_0$). FIG. 6 shows a table 600, providing a guide for interpretation of possible combinations of results. In effect, the higher or lower the z-score, the more intense the clustering. A z-score near 0 indicates no apparent spatial clustering. The cognitive load index or CLI may be represented as a single numerical value, calculated as described below.

Cluster analysis is performed based on an information density mapping matrix. The cluster analysis may include identifying a number of clusters, the distance between clusters, and the size of clusters. In some embodiments, a normalized number of clusters, N, is generated (e.g., using a minimum-maximum scalar method) by performing a clustering algorithm (e.g., a density-based clustering algorithm) on the information density mapping matrix. The number of clusters identified by the algorithm are then normalized such that:

$$X_{norm} = \frac{X - X_{min}}{X_{max} - X_{min}}$$

The normalized cluster number, $\hat{N}$ will, therefore, fall within the range of [0,1]: $x_1=\hat{N}$. In some embodiments, a hypothesis is used that the larger the number of clusters, the higher the cognitive load will be on an individual.

To determine the distance between clusters, a distance metric may be calculated between the generated clusters. In some embodiments, the average normalized Euclidean distance, $\hat{D}$, between all possible cluster centroid pairs is calculated by:
1. Identifying the centroid of each cluster;
2. Calculating the Euclidean distance between all possible centroid pairs;
3. Normalizing the Euclidean distances such that:

$$X_{norm} = \frac{X - X_{min}}{X_{max} - X_{min}},$$

where the normalized Euclidean distances will, therefore, fall within the range of [0,1]; and
4. Taking 1 minus the average of all normalized Euclidean distances, $\hat{D}$:

$x_2 = 1 - \hat{D}$

In some embodiments, a hypothesis is used that the smaller the average distance between the cores of each cluster, the higher the cognitive load will be on an individual.

To determine the size of the clusters, some embodiments calculate 1 minus the average normalized cluster size, $\hat{S}$, by:
1. Identifying the centroid of each cluster;
2. Drawing the lines to form a polygon around the border cluster points;
3. Calculating the area within each polygon;
4. Normalizing the cluster areas such that $$X_{norm} = \frac{X - X_{min}}{X_{max} - X_{min}};$$

and
5. Taking 1 minus the average of all normalized sizes of the clusters, $\hat{S}$:

$x_3 = 1 - \hat{S}$

In some embodiments, a hypothesis is used that the larger the average size of the cluster, the higher the cognitive load will be on an individual.

Cognitive load may also be based on optional text complexity score inputs. End-users may have the option to manually input a text complexity/readability score. This input is not required, but may improve the accuracy of the cognitive load index score. The user should input the readability score associated with the original input image, as well as the possible range that the score can take (e.g., 1-100). The average normalized readability score, $\hat{G}$, may be calculated by:

1. Normalizing the inputted score based on the inputted maximum and minimum range between 0 and 1, such that:

$$X_{norm} = \frac{X - X_{min}}{X_{max} - X_{min}};$$

and

2. If no user input is provided, $\hat{G}=0$ and $w_G=0$:

$$x_4 = \hat{G}$$

In some embodiments, a hypothesis is used that the higher the text complexity, the higher the cognitive load will be on an individual.

Each of the elements $\hat{N}$, $\hat{D}$, $\hat{S}$, and $\hat{G}$ may be weighted, with the weights being predefined or optionally manually inputted by a designer or other end-user. If no weights are inputted or defined, the weights may default such that each element will be assigned an equal weight. The cognitive load index or CLI value can then be calculated as follows:

$$CLI = \frac{1}{n}\sum_{i=1}^{n} w_i x_i$$

where n=4 if a readability score, $\hat{G}$, is available, and n=3 if $\hat{G}$ is not available. The higher the CLI value, the higher the cognitive burden placed on an individual viewing the content. As such, relatively high and relatively low values represent less desirable digital designs compared with those that receive a midpoint value.

Figure 7:
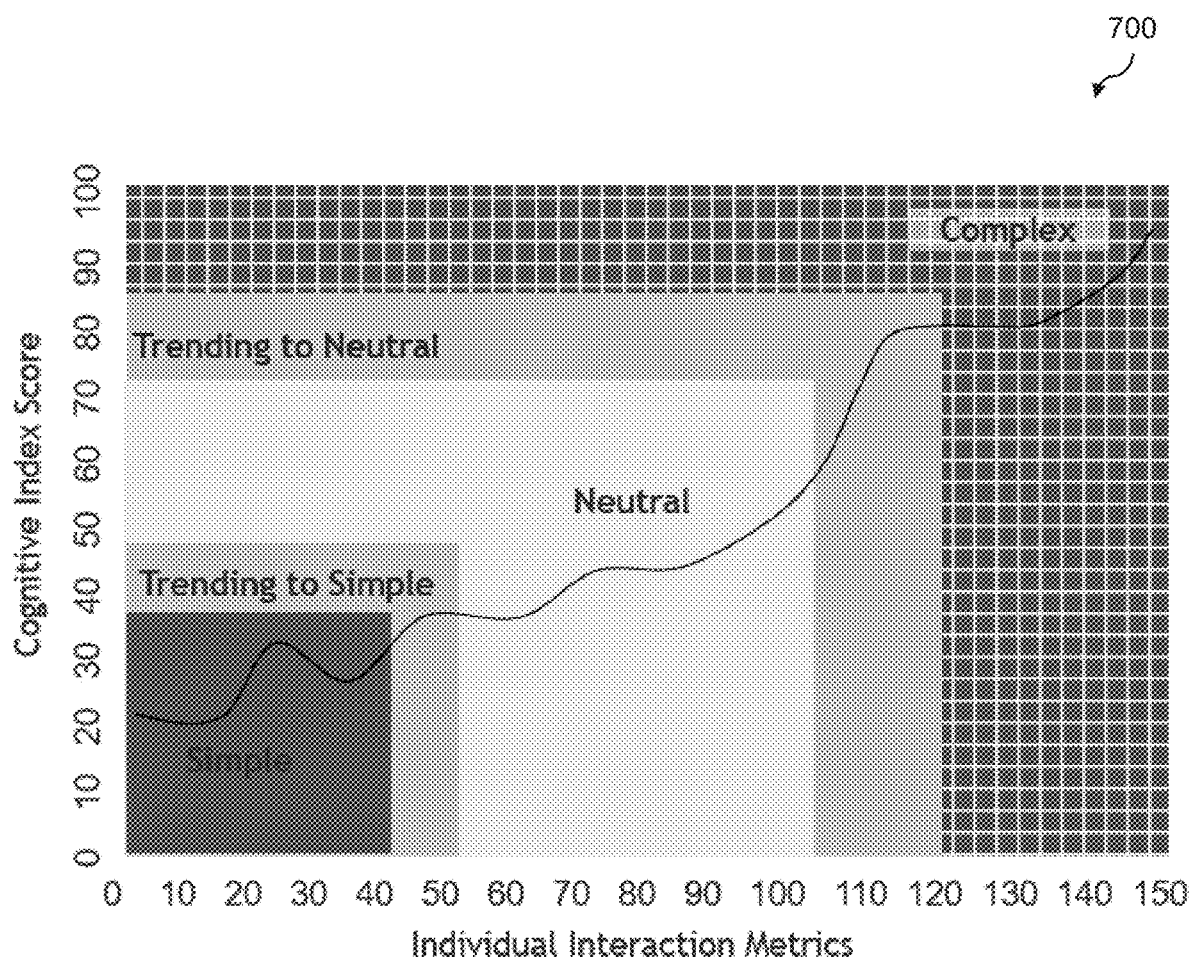
FIG. 7 is a graph illustrating ranges of visual complexity in an illustrative embodiment.

The cognitive load index generation tool 114 may output a plot of the ranges of visual complexity for a given design. The plot shows CLI scores against individual webpage interaction metrics, with the plot being utilizable for helping guide designers and researchers toward an optimal mix of interest, content and information density. FIG. 7 shows an example plot 700, which provides a range of validated "targets" for designers and should accompany a library of sorts in which simple, neutral and complex design examples are cataloged for study and reference. Learnings from different combinations of cluster size, distance and count with associated CLI scores will allow for purposeful experimentation. Designers can reference and learn the types and combinations of pictures and text that lend themselves to better CLI scores along with better engagement and performance in a real-world setting (e.g., online e-commerce).

In order to validate the accuracy, precision, and interpretation of the CLI and its component measures, various methods can be employed including but not limited to: mouse-tracking and engagement metrics; platform analytics metrics; remote eye-tracking; and physiologic validation. Third-party consumer analytic tools (e.g., Adobe Omniture, ContentSquare, etc.) may be used to create a heat map that shows real user hovers, clicks, and individual mouse-based engagement with the digital input. The hovers and clicks from the heatmap are indicative of actual eye motion, so this heatmap will act as a proxy for a physiological assessment of eye-tracking motion. The interactive output will be compared against the information density heatmap to determine the overlap between the hypothesized areas of engagement with the actual areas of engagement. Acceptance or rejection of initial hypotheses around predicted individual engagement with the content can then be made.

Further engagement and individual content interaction metrics may be taken from platform analytics tools (e.g., an Adobe Cloud Analytics suite) to measure variables such as page clicks, pathing, time spent on page, overall engagement, conversion rates, etc. These metrics will be compared against the CLI and its component measures to assess how and the degree to which the number, spacing, and size of the algorithmically produced clusters affect the individual's engagement with content. This should act as a proxy for the cognitive load on the individuals interacting with the content and aid in the interpretation of simple, neutral, and more complex designs. More specifically, the analytics platform metrics will be used to evaluate the digital designs' effectiveness and are expected to correlate with the CLI.

Using web-based eye-tracking software, researchers can remotely capture users' eye-movements while remotely (e.g., not in an in-person laboratory) viewing the digital design input. The eye-tracking coordinates and blink rates can then be compared to the information density heatmap and CLI for validation. The eye-tracking coordinates will be compared against the information density heatmap to determine the overlap between the hypothesized areas of visual attention with the actual areas of visual attention. The blink rates will be compared with the CLI, whereby a positive linear relationship is hypothesized (e.g., higher blink rates are associated with higher cognitive load).

The gold standard for confirmation or rejection of the hypotheses used in some embodiments would be done with in-person laboratory-grade measurement of individuals' physiologic responses to their interaction with the visual content. These measurements could include eye-tracking, pupil dilation, blink rate, and temperature assessments throughout task-oriented interactions with the inputted digital content and designs.

Conventional approaches for measuring cognitive load rely on in-person laboratory-based research methods, such as eye-tracking glasses and physiological measures. Researchers often use blink rate as a metric of cognitive load. The solutions described herein differ from conventional approaches in that the solutions described herein are predictive and automated. The CLI solutions described herein use inputs from a visual stimulus to predict cognitive load prior to testing, rather than measuring it post hoc in a research setting. Furthermore, the CLI solutions described herein are fully automated, which means they can scale to analyze any product or other design image in seconds, facilitating rapid iteration in testing and design.

The cognitive load index generation tool 114 provides a quantifiable analysis of a digital design's potential for exerting cognitive demands on a user. The quantitative assessment enables designers and researchers to measure and compare the potential effectiveness of digital designs. This can be used to improve the customer experience by reducing cognitive load or cognitive boredom. The cognitive load index generation tool 114 further provides scalable and automated prediction of the cognitive load that a user will experience while interacting with digital designs and content. The cognitive load index generation tool 114 provides an algorithmic approach which, once validated, does not rely on in-laboratory testing or user input. It is therefore easily scalable and can be used to automatically assess and compare the potential effectiveness of any digital design. The cognitive load index generation tool 114 described herein further enables neurodiversity-based personalization (e.g., using the design personalization tool 124). Every individual has a unique capacity for cognitive processing. The cognitive load index generation tool 114 allows for digital design to be personalized to each individual's unique needs and preferences.

The cognitive load index generation tool 114 represents an opportunity for differentiation from conventional approaches by tailoring better, smarter experiences and designs. There is competitive advantage in utilizing the scalable methods for generating CLI metrics provided using the cognitive load index generation tool 114 for predicting and facilitating customer success. These techniques may be used in a multitude of industries and use cases, such as companies or entities that endeavor to create product designs that reflect "cognitive ergonomics" (e.g. similar to endeavors for creating ergonomic workplaces for employees). Making products and decision environments simpler and easier for customers or other end-users, and even personalized to each individual's unique cognitive capacity, is a customer-centric future that various entities across many industries strive to attain.

In general, there is established value in assessing behavioral metrics. Behavioral metrics are objective and can be collected implicitly while the user is completing their task and without overt collection activities (e.g., stopping to ask the user to provide a subjective rating of ease of use). Individuals tend to have subconscious biases which prevent them from self-reporting with any fidelity, whereas behavioral metrics provide a more objective measure of customer sentiment. There is evidence that shows that these kinds of behavioral features can reflect mental states, such as mental effort and cognitive load. There is considerable margin for differences within and between users. Understanding behavioral markers of individual variance in cognitive capacity allows for tailoring tools provided by the information density toolkit system 110, including the cognitive load index generation tool 114, to an individual's needs (e.g., accessibility needs), which is likely to enhance CLTV and loyalty. These metrics are also distinct from physiological measures in that they are mostly or entirely under the users' voluntary control and may, therefore, be subject to intervention by website design. In sum, a behavioral metric for cognitive load prediction will provide researchers and designers a more accurate and reliable measure (e.g., compared to self-reporting), which can be used to make personalized, human-centric improvements to digital design. This is hypothesized to lead to increases in direct (e.g., conversion rates due to enhanced in-page performance) and indirect (e.g., CLTV, loyalty) sources of revenue.

Figure 8A:
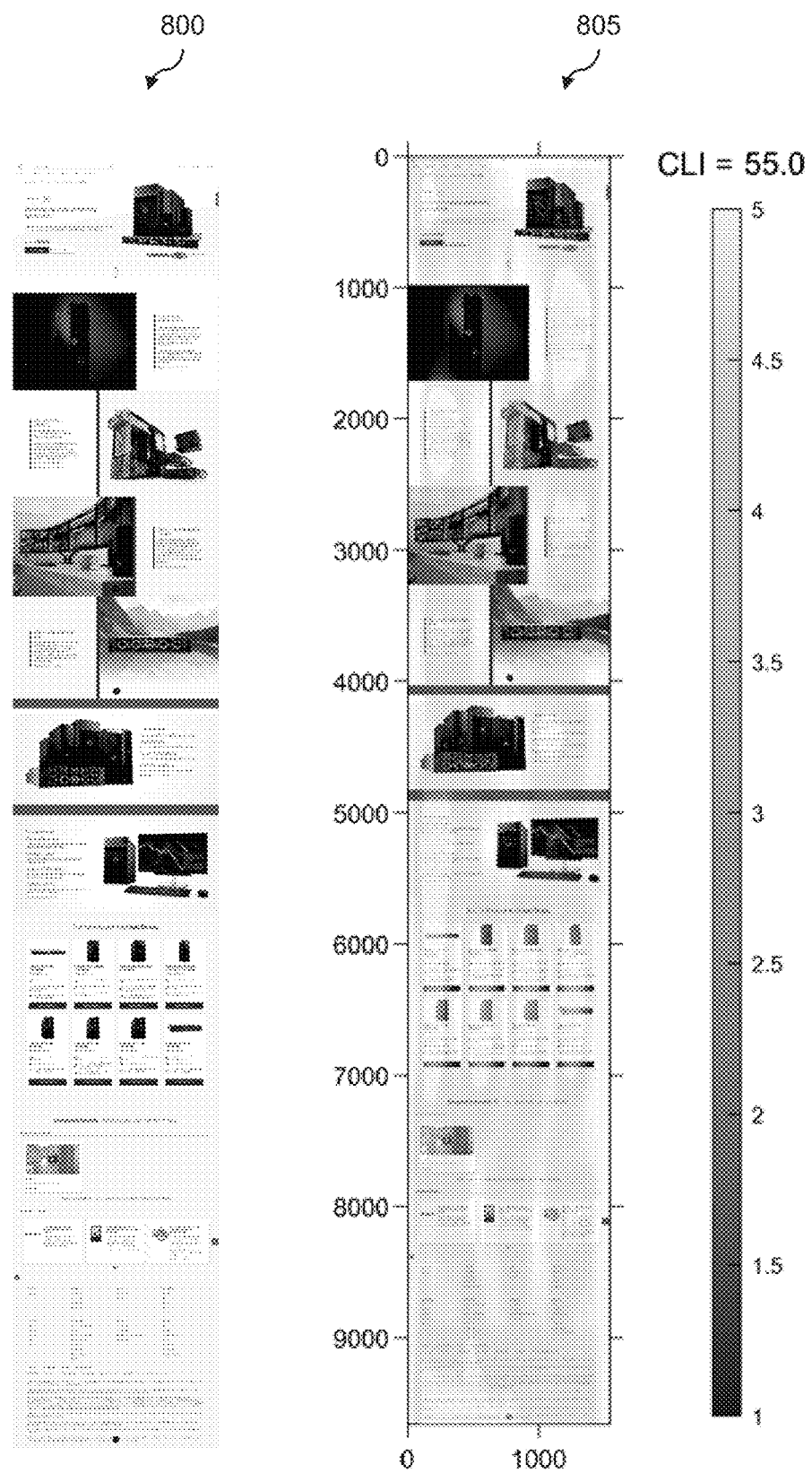
FIGS. 8A and 8B show an example application of information density heat mapping and automated cluster analysis for an input product page in an illustrative embodiment.
Figure 8B:
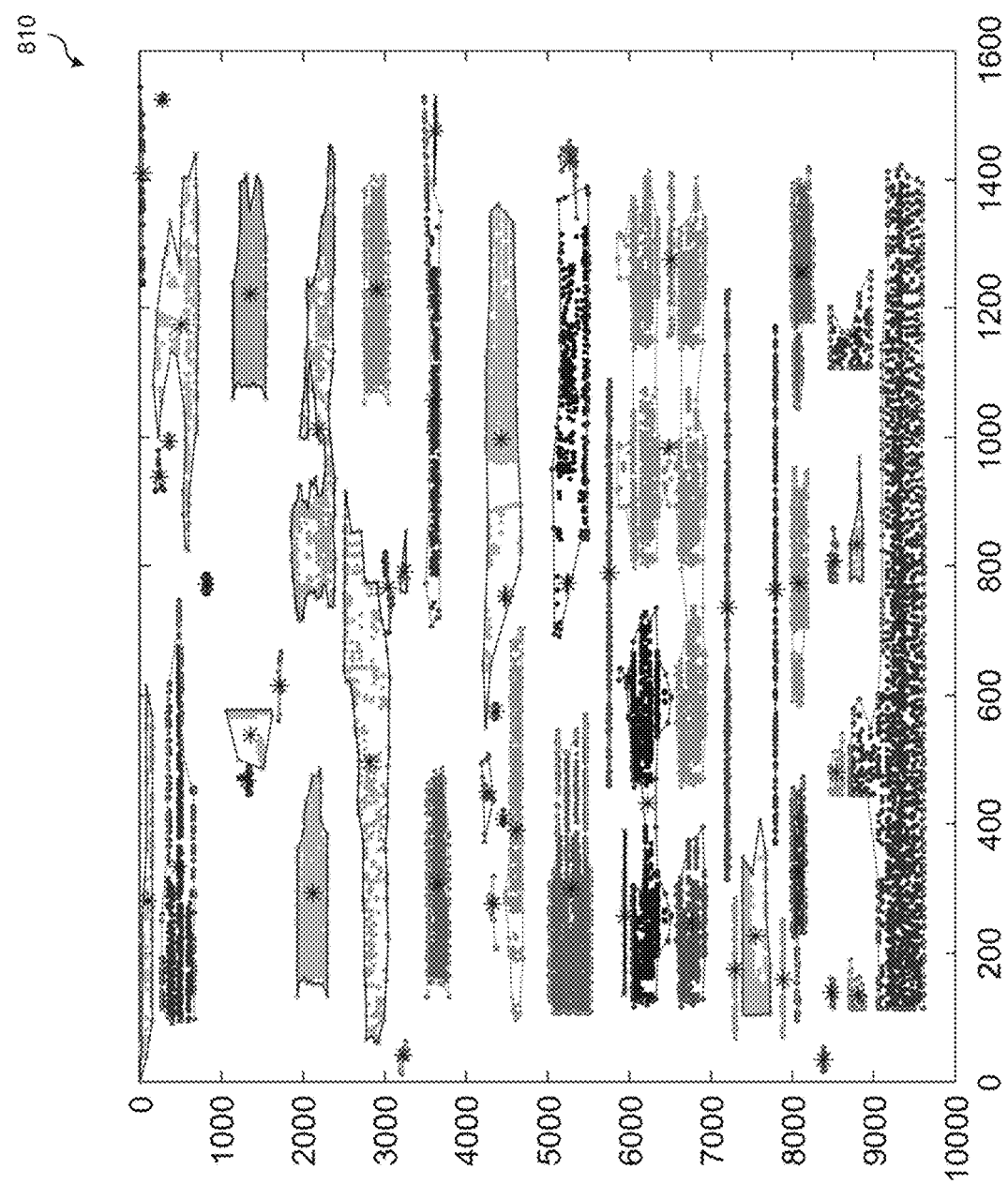
Figure 9A:
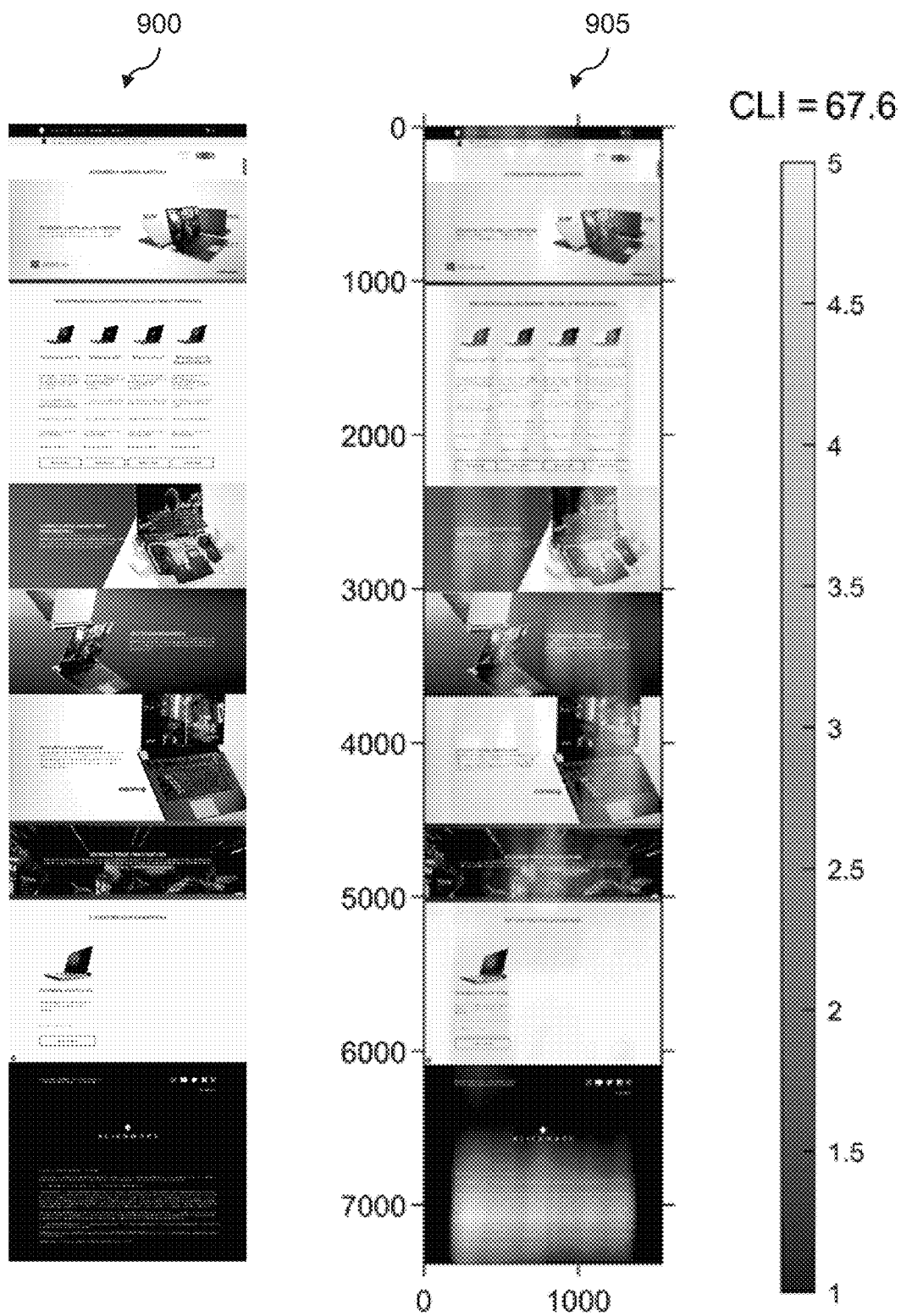
FIGS. 9A and 9B show another example application of information density heat mapping and automated cluster analysis for an input product page in an illustrative embodiment.
Figure 9B:
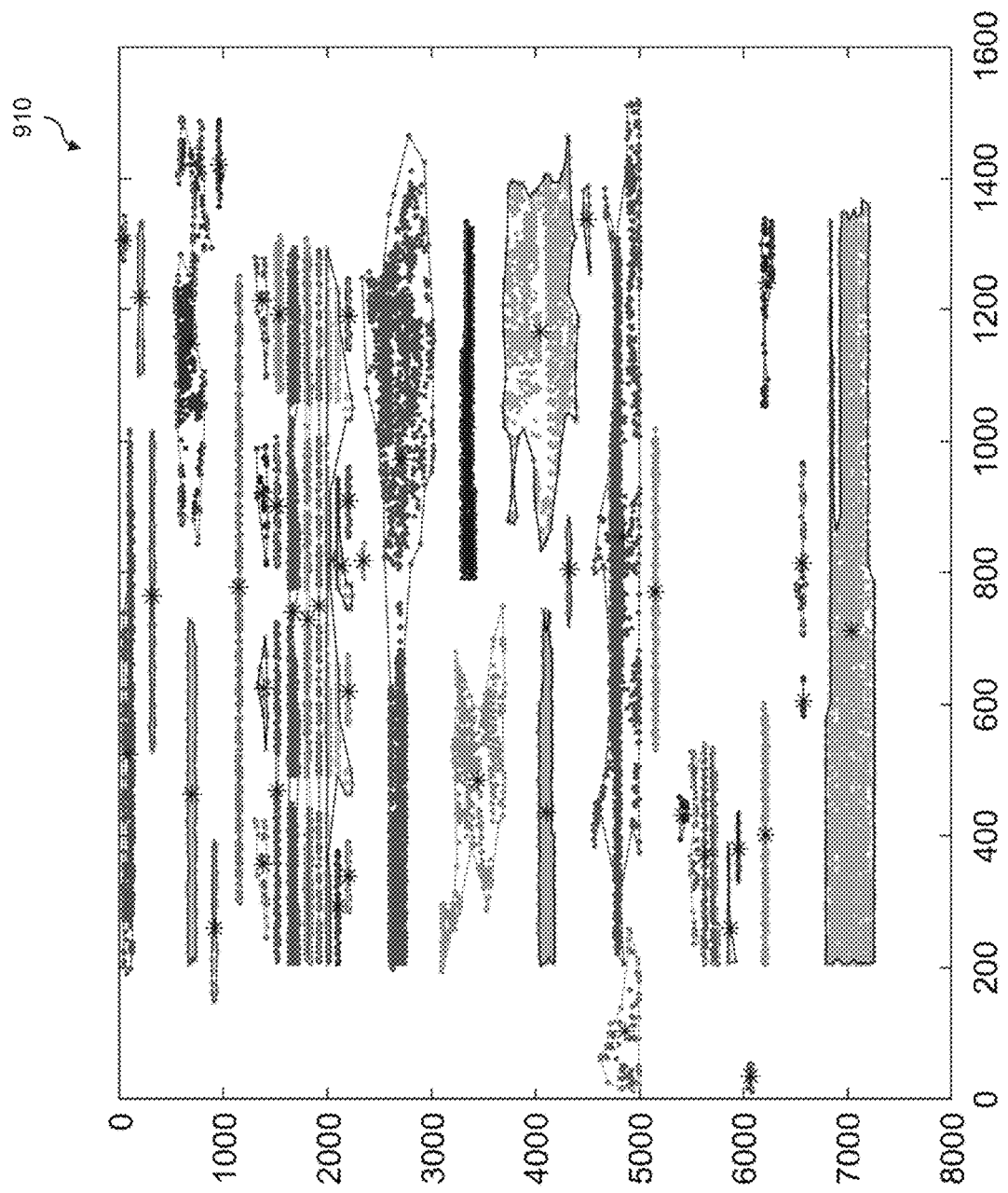
Figure 10:
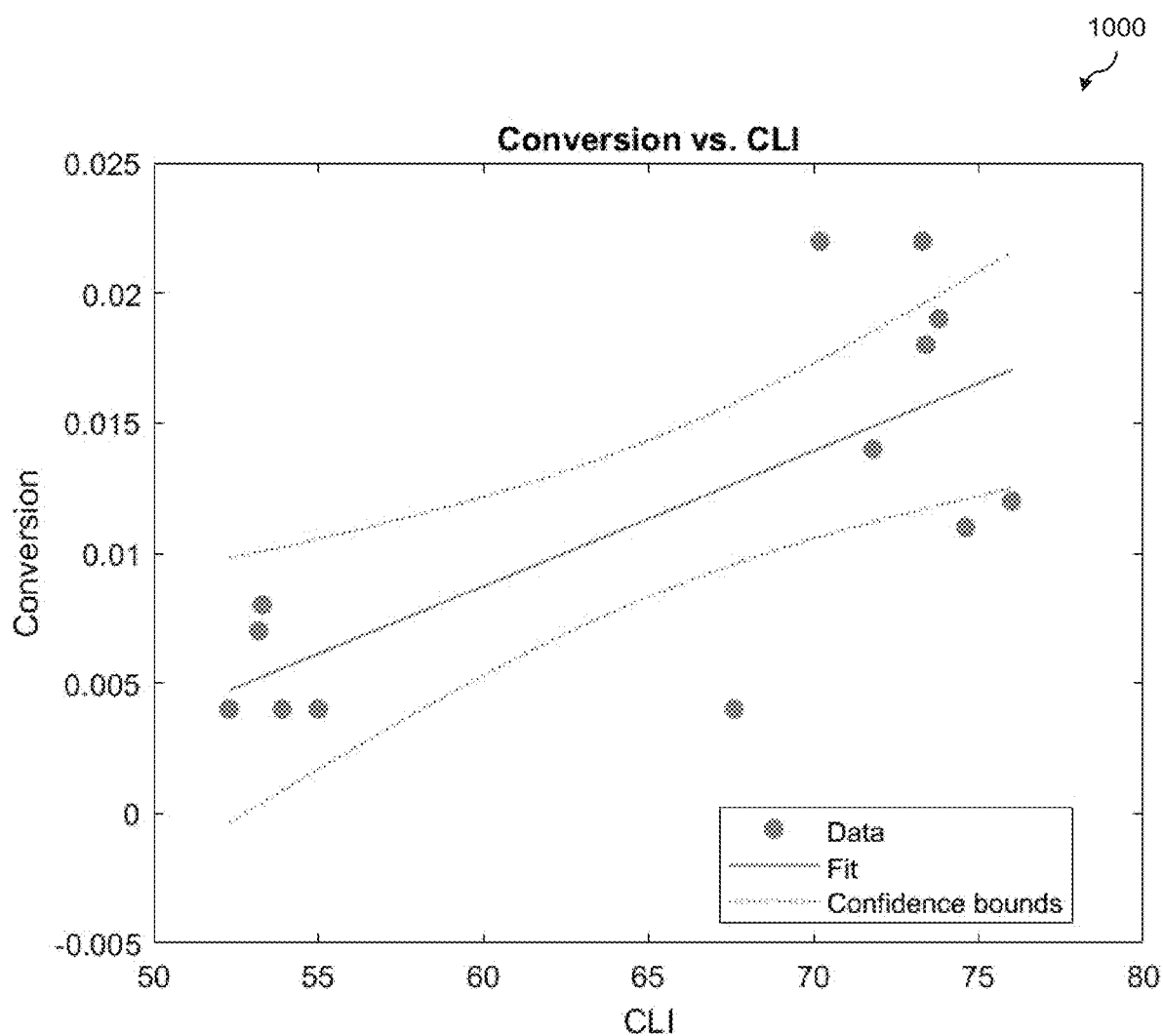
FIG. 10 shows a plot of a generalized linear model indicating that cognitive load index is a significant predictor of conversion rates in an illustrative embodiment.

The correlation between CLI scores and conversion rates for designs (e.g., webpages) is investigated by inputting various product webpages into the cognitive load index generation tool 114 to calculate the CLI per page. CLI scores ranged between 52.3 and 76. Two examples are illustrated in FIGS. 8A-8B and 9A-9B. FIG. 8A shows an input webpage 800 (e.g., a product webpage for Dell Precision desktops) along with a heatmap overlay thereof 805 with a CLI of 55. This suggests the overall cognitive load of the input webpage 800 is moderate. FIG. 8B shows a plot 810 of the output of automated cluster analysis for the input webpage 800, with cluster centers marked by asterisks. FIG. 9A shows an input webpage 900 (e.g., a product webpage for Alienware laptops) along with a heatmap overlay thereof 905 with a CLI of 67.6. This suggests the overall cognitive load of the input webpage 900 is tending towards high. FIG. 9B shows a plot 910 of the output of automated cluster analysis for the input webpage 900, with cluster centers marked by asterisks. FIG. 10 shows a plot 1000, illustrating the results of a generalized linear model indicating that CLI scores are a significant predictor (e.g., $p<0.01$) on conversion rates across 13 product pages. This model suggests that conversion increases with CLI score.

An exemplary process for cognitive load scoring of a visual stimulus will now be described in more detail with reference to the flow diagram of FIG. 11. It is to be understood that this particular process is only an example, and that additional or alternative processes for cognitive load scoring of a visual stimulus may be used in other embodiments.

In this embodiment, the process includes steps 1100 through 1106. These steps are assumed to be performed by the information density toolkit system 110 utilizing the cognitive load index generation tool 114 and the design personalization tool 124.

The process begins with step 1100, obtaining an information density matrix for an input visual stimulus, the information density matrix characterizing information density of feature points in the input visual stimulus. The input visual stimulus may comprise an image file. The image file may be of a product, an application screen or portions thereof, a website or webpage or portion thereof, a document, etc., that is to be analyzed for its associated cognitive load index.

In step 1102, one or more clusters of feature points in the input visual stimulus are identified by performing spatial clustering of the feature points utilizing the information density matrix. A cognitive load score for the input visual stimulus is determined in step 1104 based at least in part on the identified one or more clusters of feature points. The cognitive load score characterizes cognitive energy required to mentally process the input visual stimulus. In some embodiments, step 1104 comprises determining a weighted average of two or more cognitive load score components. The two or more cognitive load score components may comprise two or more of: a normalized number of the identified one or more clusters; an average normalized distance between the identified one or more clusters; an average normalized size of the identified one or more clusters; and an average normalized readability score of the input visual stimulus.

Step 1104 may be based at least in part on a number of the identified one or more clusters of feature points. The cognitive load score for the input visual stimulus increases with the number of the identified one or more clusters of feature points. Step 1102 may comprise performing a density-based clustering algorithm on the information density matrix to generate a normalized number of the identified one or more clusters of feature points. The cognitive load score for the input visual stimulus determined in step 1104 may be based at least in part on the normalized number of the identified one or more clusters of feature points. The normalized number of the identified one or more clusters of feature points may be generated utilizing a minimum-maximum scalar algorithm.

Step 1104 may comprise calculating distances between the identified one or more clusters. The cognitive load score for the input visual stimulus increases as distances between the identified one or more clusters increases. Calculating the distances between the identified one or more clusters may comprise calculating Euclidean distances between centroids of the identified one or more clusters, normalizing the calculated Euclidean distances, and determining an average of the normalized Euclidean distances. Step 1104 may also or alternatively comprise calculating sizes of the identified one or more clusters. The cognitive load score for the input visual stimulus increases as the sizes of the identified one or more clusters increases. Calculating the sizes of the identified one or more clusters may comprise, for each of the identified one or more clusters, identifying a centroid of that cluster, drawing lines to form a polygon around border feature points of that cluster, and calculating an area within the polygon, and normalizing the areas of the polygons for the identified one or more clusters. Step 1104 may further or alternatively comprise determining text complexity scores for one or more areas of the input visual stimulus.

Figure 11:
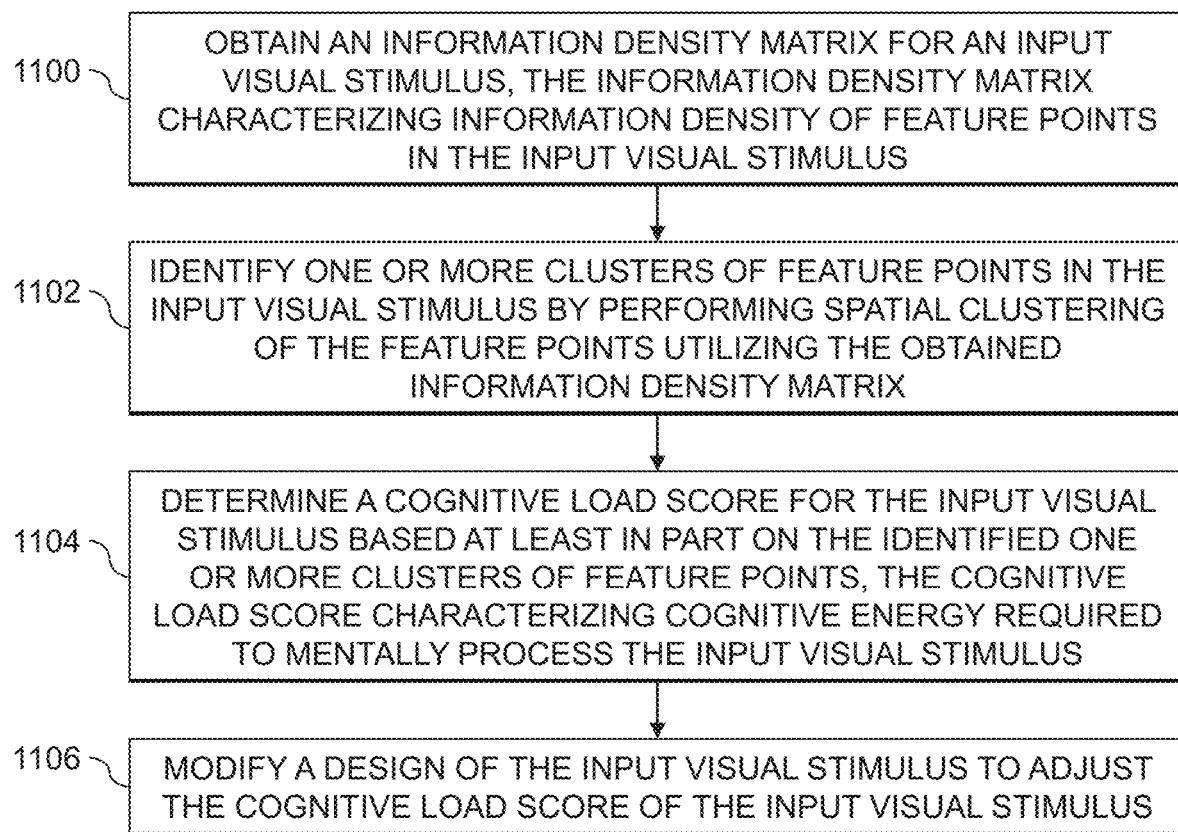
FIG. 11 is a flow diagram of an exemplary process for cognitive load scoring of a visual stimulus in an illustrative embodiment.

The FIG. 11 process continues with step 1106, modifying a design of the input visual stimulus to adjust the cognitive load score of the input visual stimulus. Step 1106 may comprise modifying the identified one or more clusters of feature points to reach a target cognitive load score, the target cognitive load score being personalized for a given end-user viewing the input visual stimulus. Step 1106 may comprise at least one of modifying a number of the identified one or more clusters, modifying a distance between a first one of the identified one or more clusters and a second one of the identified one or more clusters, and modifying a size of at least one of the identified one or more clusters.

When designing a product, understanding a user's intent while interacting with that product is an important but often difficult task. Knowing a user's intent allows a designer to tailor that user's specific journey, thereby facilitating a smooth and positive experience. However, a user's intent—and likewise his or her journey—is often anything but singular and linear. Therefore, the information density toolkit system 110 provides the behavioral intent estimation tool 116 as a solution for dynamically updating the predicted likelihood that a user has at any given point in time when viewing an inputted visual stimulus. Using behavioral inputs and historical user data, the behavioral intent estimation tool 116 can constrain the list of possible user intents, allowing researchers and designers to better focus their product design toward a behavioral intent-oriented experience.

Establishing an individual's intent at any given time is a particularly difficult task. As demonstrated in a game of chess, intent is only known privately within an individual's own mind in the first instance, but can later be revealed through that individual's subsequent behavior. Careful observation of an individual's actions allows one to establish an estimate that those behaviors will lead to a particular outcome, thereby revealing the intent behind those actions.

To complicate matters further, a user's intent can change based on the potential pathways presented to him or her in that moment. To continue the chess analogy, a player will dynamically change their original strategy based on their opponent's actions. Similarly, a user may change his or her original intent based on the possible options or information presented by the current visual stimulus. For example, a user of a new laptop may originally intend to use that product for browsing the Internet at that time, but may pivot away from that original intent after seeing an icon for a new software of interest. Another example might be a digital user intending to browse for a new monitor, who then gets distracted by a marketing banner indicating new laptops on sale, and subsequently starts searching for specs and reviews for a particular laptop.

By establishing a pattern of actions that most often leads to a particular outcome, over many different patterns and outcomes, it is possible to create an algorithm that sequentially updates the likelihood of a user's intent at any point in the journey. This also allows the behavioral intent estimation tool 116 to dynamically observe and predict changes in intent.

Knowing a user's intent at any given moment allows a product designer to optimally shape the user's experience. Yet, defining a user's intent at any given moment is a problem of considerable complexity. Conventional approaches are not able to achieve a point-in-time estimate of possible user intents from an input digital design (e.g., a product image). Therefore, design of the user experience cannot be truly optimized. The information density toolkit system 110 provides a number of tools (e.g., the information density mapping tool 112, the cognitive load index generation tool 114, the color-emotion analysis tool 118, the emotional resonance scoring tool 120, the visual attention likelihood estimation tool 122, the design personalization tool 124) which can be used for optimizing customer or other end-user experience through improved design using the outputs of the behavioral intent estimation tool 116. The behavioral intent estimation tool 116 can enhance various other tools of the information density toolkit system 110 by providing an estimation of user intent while interacting with designs. The behavioral intent estimation tool 116 can estimate user intent based on user inputs into the information density toolkit system 110 to fully optimize output.

Various entities endeavor to develop intent engines that algorithmically capture individual users' intents, but such intent engines are insufficient for various purposes. Namely, some embodiments require an intent engine that can calculate behavioral intent based on a point-in-time digital design (e.g., a product image) and/or pathway analysis, rather than based on user cookies or online behavior. For example, a product designer may wish to know how changing the number of buttons/options on a page will affect user intent. In conventional approaches, a designer would need to design and test A/B alternatives to arrive at a solution. Such conventional approaches are inadequate at scale, which prevents designers from serially testing and comparing a large volume of designs. Without behavioral intent estimation, an optimized output cannot necessarily be provided.

In some embodiments, Bayes' Theorem is used to estimate and subsequently update the likelihood of a user's intent based on historical user behavior and possible future options. Given the point in time represented by the hypothetical moment that a viewer is first presented with a visual stimulus, the program arrives at an estimation by utilizing historical user data as priors and updating with any identified object-based pathways within the visual stimulus. An object-based pathway is a visual object that represents a pathway, which might lead a viewer closer towards fulfilling their original intent. For example, a CTA button is a digital object that, when clicked, redirects the viewer to a page that may bring them closer to his or her end goal. As another example, a block of text is an object, which after being read by the viewer, fulfills the viewers intent of searching for the information contained within that block of text. As a further example, a side view of a laptop in an image can provide the viewer with a visual estimation of the laptop's lightweight design and portability, which satisfies the viewer's search for such information. A forward movement pathway is an object-based pathway (e.g., a hyperlink) that allows a user to move forward in their journey. A backward movement pathway (e.g., the back button) is an object-based pathway that allows a user to move backward one or more steps in their journey.

Figure 12:
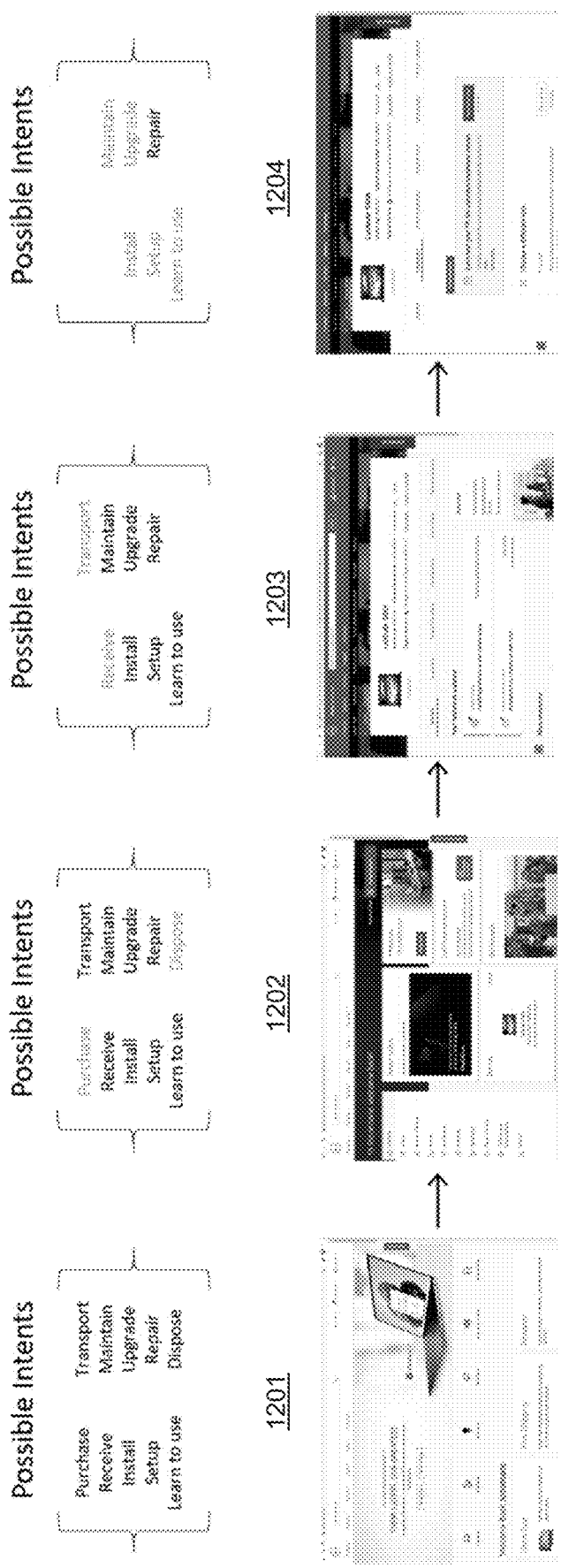
FIG. 12 shows sets of possible behavioral intents associated with a user traversing a set of webpages in an illustrative embodiment.

FIG. 12 shows an example of behavioral intent estimation, illustrating possible intents as an end-user traverses through a set of product webpages 1201, 1202, 1203 and 1204. As illustrated, the possible behavioral intents narrow as the end-user selects particular options and moves among the product webpages 1201, 1202, 1203 and 1204. The behavioral intent estimation begins by defining a very large set of possible behavioral intents. At the beginning of the user's journey at product webpage 1201 (e.g., a website's homepage), all potential behavioral intents within a previously defined set are possible. It is therefore unlikely for the user's initial visit to the product webpage 1201 to have much predictive power, aside from historical behavioral patterns (e.g., 40% of users typically go from the product webpage 1201 to one or more category pages). However, at a certain point in the customer journey, it becomes very likely that potential decision pathways (e.g., CTAs, links, the back button, etc.) accurately constrain the intent space. In other words, a user's intent can likely be guessed based on what pathways are available at any given point.

Available pathways are represented by backward and forward movement. In the digital space, the back button typically represents either a misstep (e.g., "the link did not provide what I was looking for"), a mid-step (e.g., "I found some, but not all, of the information I was looking for"), or an end-step (e.g., "I found the information I was looking for, and now I want to go back and do something else"). Thus, it is advantageous to include the forward pathways from the prior page in the current page's intent space, albeit weighted in a manner that reflects the decreased possibility of them being the true intent. These backward movement possibilities, along with those represented by each forward movement pathway (e.g., links), can be represented in a weighted fashion within the model's intent space. Weights can be assigned based on historical user behavior and strength of the pathway stimulus (e.g., large banner vs. very small CTA). All other intents not represented by backward and forward movement can be safely rejected as likely intents.

In this manner, it is possible to constrain the intent space and assign weights to each remaining potential intent, arriving at a likelihood estimate that any given intent is the user's true intent at that moment in time. When only a single time point in this journey is known (e.g., corresponding to visiting the webpage 1203 in the FIG. 12 example), it is typically not possible to include weighted estimates of backward movement intents (e.g., the greyed-out intents in FIG. 12), as the prior page is unknown. In this case, the user has the option to manually input the backward movement intents, or the estimation can be calculated based solely on forward movement intents.

Figure 13:
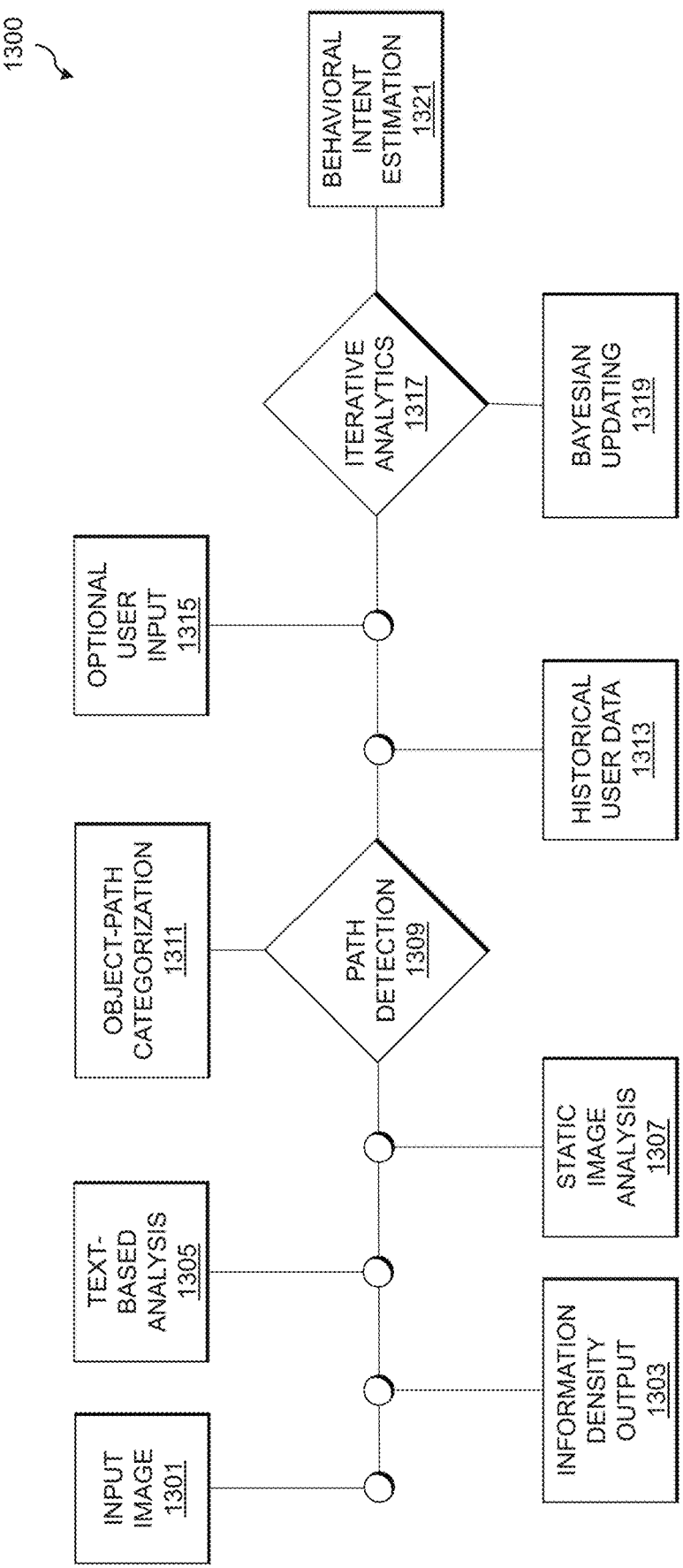
FIG. 13 shows a system flow for a behavioral intent estimation tool in an illustrative embodiment.

FIG. 13 shows a system flow 1300 for the behavioral intent estimation tool 116. The system flow 1300 starts with an input image 1301 or other visual stimulus file (e.g., a *.jpg file, a *.png file, etc.). The behavioral intent estimation tool 116 also takes as input a statistical analysis output 1303 from the information density mapping tool 112. The behavioral intent estimation tool 116 performs text-based analysis 1305, such as by detecting text within the input image 1301. Identified characters and words are accompanied with confidence levels and stimulus boundary locations for subsequent analyses. Static image analysis 1307 is then performed to detect static images within the input image 1301, with the image boundaries being stored for subsequent analyses.

Path detection 309 is then performed for object-path categorization 1311, which may include optional specifications, selection of one or more algorithms, recognizing objects, and backward-forward subcategorization. The behavioral intent estimation tool 116 uses user input, JavaScript input, and/or machine learning semantic classification to categorize any objects identified during the text-based analysis 1305 and static image analysis 1307 as potential decision pathways. Identified object-based pathways are then further subcategorized as forward-movement pathways (e.g., a button that turns a product on, or a digital link that sends a user to a new page) or backward-movement pathways (e.g., the "back" button on a webpage). Object-based pathways can be specified by the user, identified from JavaScript (e.g., if it is a web design), or identified algorithmically using one or more machine learning classifiers. If machine learning is used, libraries of example object-based pathway stimuli (e.g., text or images) for the specific product-type should first be accumulated or provided by the user. A default list of intents is called by the behavioral intent estimation tool 116, and all intents are initially equally likely. The object-based pathways specified in this step act as priors, P(A), for the Bayesian updater. Essentially, the priors modify the default list of intents to specify whether they are a likely possibility (e.g., intent is represented by at least one object-based pathway) or an unlikely possibility (e.g., no object-based pathways represent the intent).

The list of intents can be further modified based on historical user data 1313. When available, the user uploads historical user data 1313 (e.g., such as from a website homepage, 10% of users use the search bar, 8% of users visit a "Deals" page from the "Hero Banner", etc.). The historical user data 1313 acts as the likelihood function, P(B|A), within the Bayesian updater calculation. Additional optional user input 1315 may also be provided. The optional user input 1315 may comprise, for example, user-specified intent outright. The benefit of such optional user input 1315 would be to examine how different personas or user types are represented in the rest of the behavioral intent estimation tool 116 or across different inputs.

Iterative analytics 1317 are then performed based on the object-path categorization 1311, the historical user data 1313 and the optional user input 1315. The iterative analytics 1317 may include Bayesian updating 1319 which utilizes the Bayes Theorem:

$$P(A|B) = \frac{P(B|A) \times P(A)}{P(B)}$$

to define the conditional probability of a given behavioral intent, A, occurring given that the user is viewing the current stimulus, B. Using the probability of a user viewing the stimulus given their behavioral intent, P(B|A) as defined by the historical user data 1313, and the probability of the behavioral intent as defined by the object-path categorization 1311, the behavioral intent estimation tool 116 can iteratively calculate the probability of each behavioral intent occurring. The final output is a behavioral intent estimation 1321, which is a list of possible intents and their associated probabilities.

Conventional approaches to measuring intent include approaches that utilize artificial intelligence, machine learning and neural networks to identify intent based on digital engagement. Such conventional approaches can be powerful, but are costly to develop and maintain. The behavioral intent estimation tool 116 provides an approach that is less costly but is unique in its ability to address a specific need for a point-in-time estimate of behavioral intent based on an inputted visual stimulus.

The behavioral intent estimation tool 116 described herein provides a novel approach for estimating a user's intent based on an input visual stimulus or design (e.g., a product image, a webpage, etc.) and object-based pathway analysis. In some embodiments, Bayesian analysis is performed using identified object-based pathways to update priors and provide a point-in-time estimate of the user's most likely intent. This automated methodology can be used at scale to provide analysis on hundreds of different design recipes in minutes. This is advantageous to any design or research group interested in quickly testing and comparing product designs.

The behavioral intent estimation tool 116 may also advantageously be specifically designed for the inputs and constraints of the information density toolkit system 110. The behavioral intent estimation tool 116 can advantageously take the same input, with the option to prompt the user for additional input when desirable, and return a user intent estimation that both stands alone and acts as important input to other tools within the information density toolkit system 110, including but not limited to the visual attention likelihood estimation tool 122. As described above, the behavioral intent estimation tool 116 can provide a key input that allows designers and researchers across a variety of industries to improve how they design products and display information. "Cognitive ergonomics" is a customer-centric future in which various entities facilitate better information transmission, better products, better decisions, and better experiences.

An exemplary process for behavioral intent estimation for a visual stimulus will now be described in more detail with reference to the flow diagram of FIG. 14. It is to be understood that this particular process is only an example, and that additional or alternative processes for behavioral intent estimation for a visual stimulus may be used in other embodiments.

In this embodiment, the process includes steps 1400 through 1408. These steps are assumed to be performed by the information density toolkit system 110 utilizing the behavioral intent estimation tool 116 and the design personalization tool 124.

The process begins with step 1400, obtaining an information density matrix for an input visual stimulus, the information density matrix characterizing information density of feature points in the input visual stimulus. The input visual stimulus may comprise an image file. The image file may be of a product, an application screen or portions thereof, a website or webpage or portion thereof, a document, etc., that is to be analyzed for its associated behavioral intent.

In step 1402, content of the input visual stimulus is analyzed utilizing the information density matrix to identify one or more objects in the input visual stimulus. Step 1402 may comprise detecting text within the input visual stimulus and associating at least a given portion of the detected text with at least a given one of the one or more objects in the input visual stimulus, the given portion of the detected text having a stimulus boundary location within the given object in the input visual stimulus. Step 1402 may also or alternatively comprise detecting one or more images within the input visual stimulus and associating at least a given one of the one or more images with at least a given one of the one or more objects in the input visual stimulus, the given image having a stimulus boundary location within the given object in the input visual stimulus.

One or more object-based pathways in the input visual stimulus are determined in step 1404. Each of the one or more object-based pathways is associated with one of the one or more objects in the input visual stimulus. The one or more object-based pathways represent potential decision pathways for a user viewing the input visual stimulus to reach a desired result. The input visual stimulus may comprise one of a sequence of visual stimuli. At least a given one of the one or more object-based pathways may be associated with a given one of the one or more objects representing a forward-movement pathway or a backward movement pathway. The forward-movement pathway, when selected, initiates display of a subsequent visual stimulus in the sequence of visual stimuli. The backward-movement pathway, when selected, initiates display of a previous visual stimulus in the sequence of visual stimuli.

In step 1406, probabilities for two or more different behavioral intents of the user viewing the input visual stimulus are estimated based at least in part on the one or more object-based pathways. Step 1406 may comprise calculating conditional probabilities for the two or more different behavioral intents utilizing a machine learning algorithm. The machine learning algorithm may comprise a Bayes algorithm, and the one or more object-based pathways modify a default list of possible behavioral intents used in the Bayes algorithm. The Bayes algorithm may utilize a likelihood function that takes as input historical user data specifying historical probabilities for the two or more different behavioral intents. In some embodiments, the two or more different behavioral intents are part of a plurality of possible behavioral intents, with each of the plurality of possible behavioral intents being initialized with an equal conditional probability value, and wherein the initialized conditional probability values of respective ones of the plurality of possible behavioral intents are adjusted based at least in part on whether at least one of the one or more object-based pathways represents that possible behavioral intent. Step 1406 may comprise assigning weight values to the two or more different behavioral intents based at least in part on at least one of information density of the objects associated with the one or more object-based pathways and sizes of the objects associated with the one or more object-based pathways.

Figure 14:
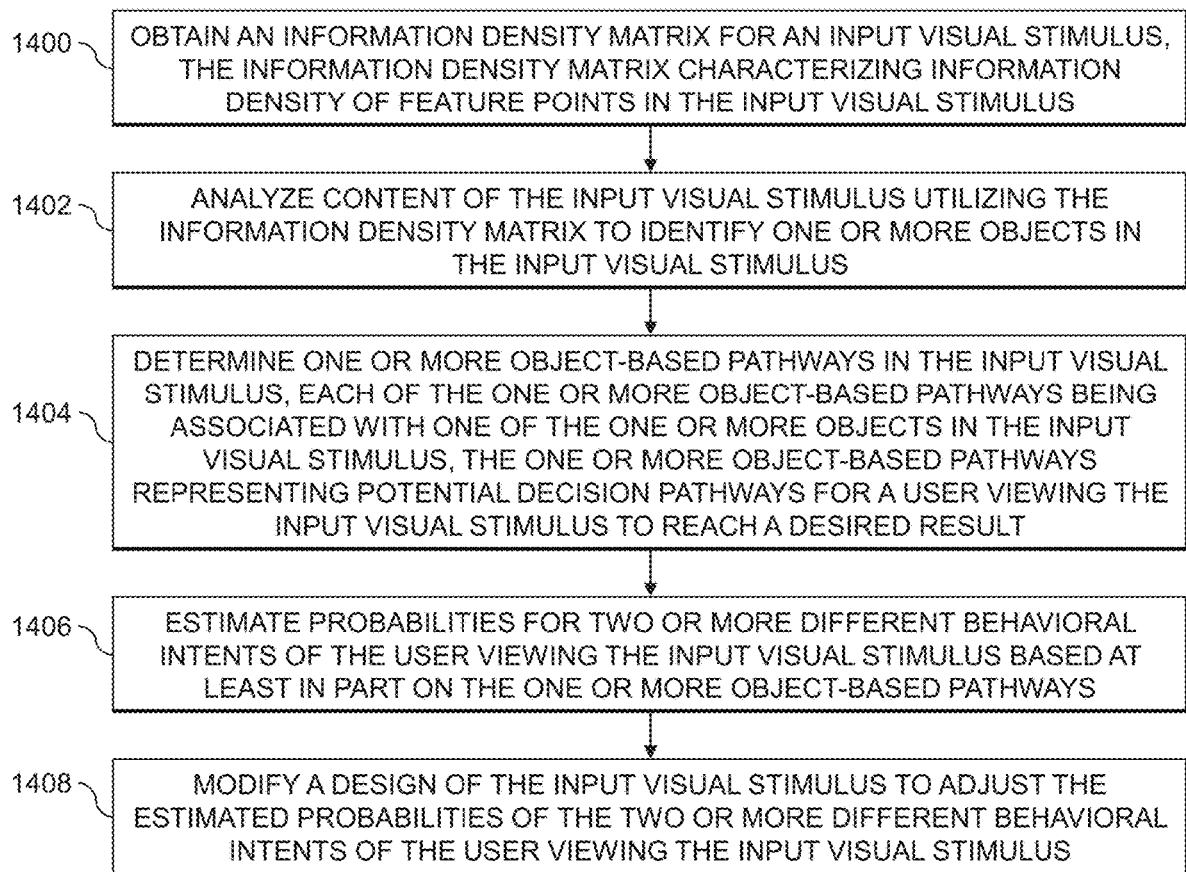
FIG. 14 is a flow diagram of an exemplary process for behavioral intent estimation for a visual stimulus in an illustrative embodiment.

The FIG. 14 process continues with step 1408, modifying a design of the input visual stimulus to adjust the estimated probabilities of the two or more different behavioral intents of the user viewing the input visual stimulus. Step 1408 may comprise modifying at least one of the one or more objects in the input visual stimulus to increase an estimated probability of a given one of the two or more different behavioral intents relative to other ones of the two or more different behavioral intents. Step 1408 may also or alternatively comprise at least one of modifying information content of at least one of the one or more objects in the input visual stimulus, modifying locations of at least one of the one or more objects in the input visual stimulus, and modifying a size of at least one of the one or more objects in the input visual stimulus.

In some embodiments, the color-emotion analysis tool 118 of the information density toolkit system 110 is used to analyze an input image or other visual stimulus. Color can influence an individual's emotions and decision-making. The associations between color and emotion are universal, and can be measured in the brain. Furthermore, color's impact on emotion has been shown to have a significant impact on an individual's cognitive processes, affecting performance and recall. Therefore, measures of color and associated emotions can provide a useful input in various other tools of the information density toolkit system 110, including but not limited to the emotional resonance scoring tool 120.

As used herein, emotion refers to a set of discrete reactions to an internal or external event, and may represent a complex reaction pattern involving experiential, behavioral and physiological elements. Emotion affects users, where the affect may be an experience of feeling or emotion, ranging from suffering to elation, and from the simplest to the most complex sensations of feeling, and from the most normal to the most pathological emotional reactions. Often described in terms of positive affect or negative affect, both mood and emotion are considered affective states. Along with cognition and conation, affect is one of the three traditionally identified components of the mind. Emotional valence is the value associated with a stimulus, as expressed on a continuum from pleasant to unpleasant, or from attractive to aversive. In factor analysis and multidimensional scaling studies, emotional valence is one of two axes (or dimensions) on which an emotion can be located, the other axis being arousal (expressed as a continuum from high to low). For example, happiness is typically characterized by pleasant valence and relatively high arousal, whereas sadness or depression is typically characterized by unpleasant valence and relatively low arousal.

Figure 15:
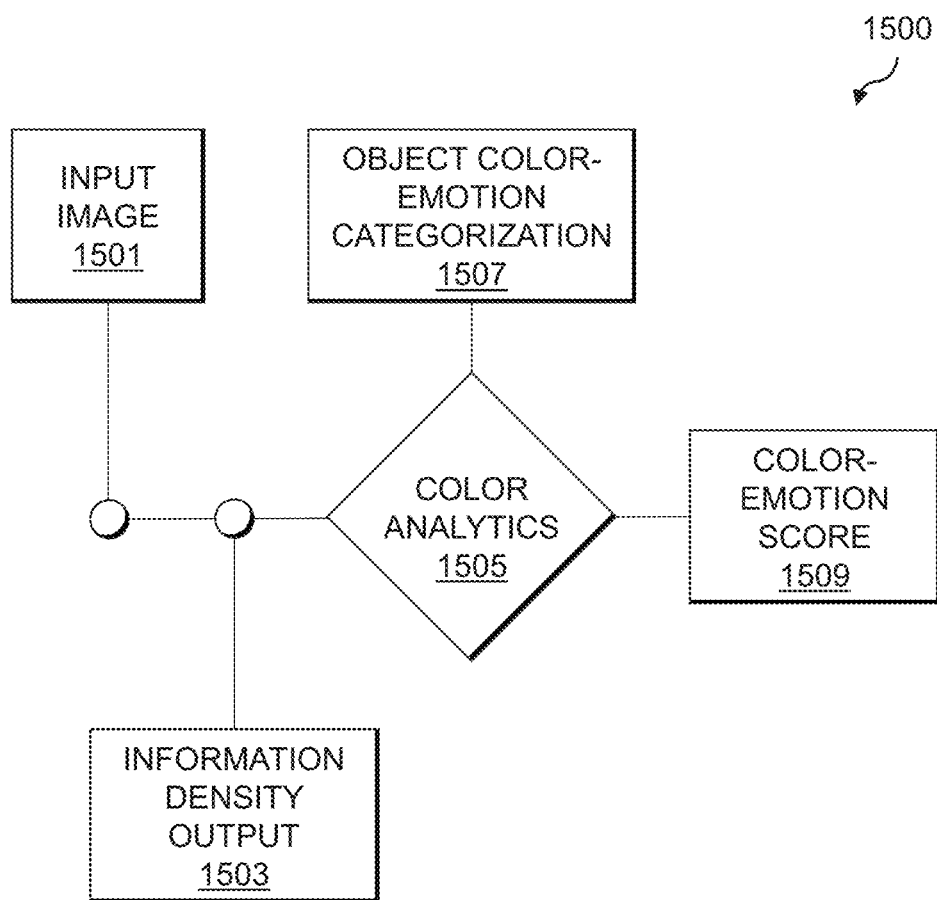
FIG. 15 shows a system flow for a color-emotion analysis tool in an illustrative embodiment.

FIG. 15 shows a system flow 1500 for the color-emotion analysis tool 118. The system flow 1500 starts with an input image 1501 and information density output 1503 (e.g., from the information density mapping tool 112), which are provided as input for color analytics 1505. The color analytics 1505 performs a color analysis on any identified objects or user-specified areas of interest in the input image 1501. For each identified object, the color analytics 1505 provides that object's color-emotion categorization 1507 as well as a color-emotion score 1509 (e.g., a score based on the Geneva Emotion Wheel).

Figure 16:
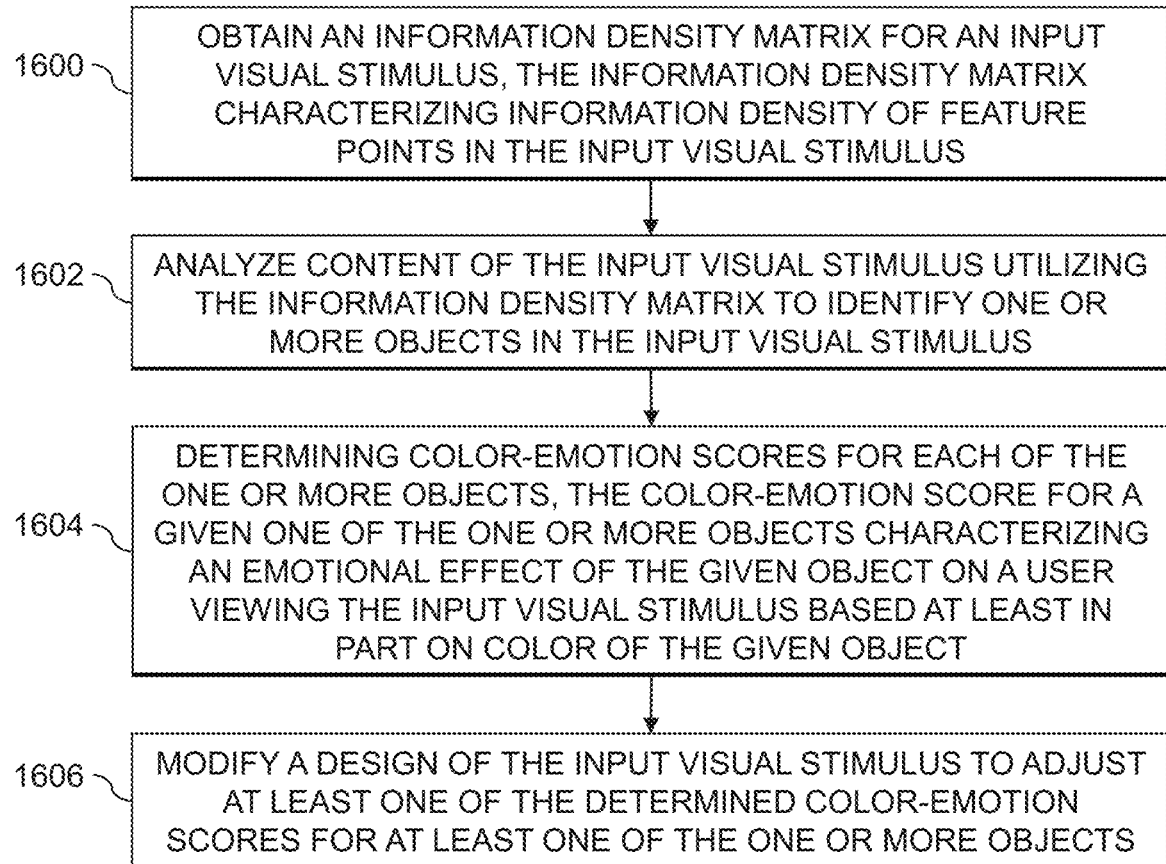
FIG. 16 is a flow diagram of an exemplary process for color-emotion analysis of a visual stimulus in an illustrative embodiment.

An exemplary process for color-emotion analysis of a visual stimulus will now be described in more detail with reference to the flow diagram of FIG. 16. It is to be understood that this particular process is only an example, and that additional or alternative processes for color-emotion analysis of a visual stimulus may be used in other embodiments.

In this embodiment, the process includes steps 1600 through 1606. These steps are assumed to be performed by the information density toolkit system 110 utilizing the color-emotion analysis tool 118 and the design personalization tool 124.

The process begins with step 1600, obtaining an information density matrix for an input visual stimulus, the information density matrix characterizing information density of feature points in the input visual stimulus. The input visual stimulus may comprise an image file. The image file may be of a product, an application screen or portions thereof, a website or webpage or portion thereof, a document, etc., that is to be analyzed for its associated color-emotion characteristics.

In step 1602, content of the input visual stimulus is analyzed utilizing the information density matrix to identify one or more objects in the input visual stimulus. Color-emotion scores for each of the one or more objects are determined in step 1604. The color-emotion score for a given one of the one or more objects characterizes an emotional effect of the given object on a user viewing the input visual stimulus based at least in part on color of the given object. The color-emotion score may have a magnitude indicating an intensity thereof, as well as a sign indicating whether the emotional effect is positive or negative. A design of the input visual stimulus is modified in step 1606 to adjust at least one of the determined color-emotion scores for at least one of the one or more objects. Step 1606, for example, may include adjusting a color of at least one of the one or more objects to change a magnitude of the color-emotion score of that object or a sign of the color-emotion score of that object.

As social beings, the human brain has developed complex emotional pathways that can prioritize attention and engagement, improve brand recall and loyalty, and increase a sense of attachment and community. Therefore, the ability to predict an individual's emotional response to a novel design or product would be advantageous. In some embodiments, the emotional resonance scoring tool 120 provides a solution for estimating how likely an object (e.g., a product or webpage component) is to elicit an emotional response from a viewer. This is particularly useful as an input for the estimation and mapping of visual attention and cognitive load (e.g., using the information density mapping tool 112, using the cognitive load index generation tool 114, using the behavioral intent estimation tool 116, using the color-emotion analysis tool 118, using the visual attention likelihood estimation tool 122, using the design personalization tool 124, etc.). The emotional resonance scoring tool 120 represents part of a scalable solution (e.g., of the information density toolkit system 110) for product designers and researchers to evaluate the efficacy of their designs prior to launch. The emotional resonance scoring tool 120 provides various advantages in its ability to predict customer engagement and purchase decisions, especially when combined with various other tools offered within the information density toolkit system 110.

Emotions can play a large role in the decision-making process. Consumers often lack introspective access to their emotional states, and it is therefore difficult to measure the impact of emotional content on consumers' decision-making processes. The neural circuitry underlying emotional processing is highly integrated with key areas of the decision-making process. For example, the hippocampus is a brain area well-known for storing and retrieving memories. Under highly emotional or arousing circumstances, the amygdala (e.g., a brain area best known for its control over our emotional "fight or flight" responses) modulates hippocampal activity and memory storage. Similarly, emotional circumstances cause the amygdala to modulate activity in the visual cortex, prioritizing visual attention toward emotionally-salient stimuli.

Studies have demonstrated the effectiveness of emotional resonance on customers' willingness to pay, and on product satisfaction. In some experiments, different participant groups were subliminally presented with either happy, sad or neutral faces. The groups then poured, consumed and rated their willingness to pay for a non-alcoholic beverage. Participants exposed to happy faces poured and consumed more of the beverage, while also rating it more highly and reporting a higher willingness to pay. Participants exposed to sad faces demonstrated the opposite effect. Therefore, emotional primes (e.g., happy or sad faces) can bias appraisal and decision-making behavior.

As discussed above, color can also influence an individual's emotions and decision making. The associations between color and emotion are universal, and can be measured in the brain. Furthermore, color's impact on emotion has been shown to have a significant impact on an individual's cognitive processes, affecting performance and recall. Therefore, it is important to incorporate measures of color in any potential measure of emotional resonance.

Given that emotional resonance can meaningfully impact behavioral outcomes, it would be beneficial to be able to measure the emotional content of a product or design. To this end, the emotional resonance scoring tool 120 provides a solution for an automated method of measuring predicted emotional responses to content through emotional resonance scores. The solutions described herein allow for the measurement of all visual content, including but not limited to text, image and video-based content. Researchers and designers will be able to use the emotional resonance scores to predict and enhance viewers' emotional responses.

There is currently no automated methodology for measuring the predicted emotional response of a viewer to content (e.g., product or web designs). Since emotional responses can have a large impact on the brain's appraisal and decision-making processes, it is useful to capture this information, especially as a component of more complex processes (e.g., visual attention, willingness to pay, product satisfaction, etc.).

Conventional approaches lack the ability to quantitatively measure and predict a viewer's emotional response to content. Although the use of happy faces has a long history in marketing practices, no methodology has been developed to measure and predict the effectiveness of this emotional content. Without appropriate measures, it is difficult to optimize emotional content. Conventional approaches also lack the ability to comprehensively measure the emotional resonance of visual content as a whole. Although some vendors provide emotional analysis of, for example, text through natural language processing (NLP) algorithms, there are currently no solutions that can offer a comprehensive emotional resonance score based on all types of content (e.g., a combined score for static images, moving images, colors, and textual components of a webpage or product).

The emotional resonance scoring tool 120 can operate as a component of a suite of analytic tools provided by the information density toolkit system 110, and has a primary function of measuring and predicting emotional resonance to a visual stimulus. The emotional resonance score takes input from various other tools in the information density toolkit system 110 (e.g., such as the information density mapping tool 112, the cognitive load index generation tool 114, the behavioral intent estimation tool 116, etc.), and returns values estimating the visual stimulus' likelihood to elicit an emotional response from its viewers. This score takes into account all aspects of the visual stimulus (e.g., text, colors, static images, and moving images) to provide a comprehensive score, which may be used in various other tools in the information density toolkit system 110 (e.g., such as the visual attention likelihood estimation tool 122, the design personalization tool 124, etc.).

In some embodiments, the emotional resonance scoring tool 120 combines the output of a variety of algorithms, where each individual algorithm or approach is selected to assess a specific type of visual stimulus. Various different possible types of visual stimuli can be utilized, including but not limited to: text-based content (e.g., including font-based emojis); color content; static images; moving images or videos; manual user input; etc. Each identified object is analyzed accordingly and given an emotional resonance score. The emotional resonance score may range from −100 to 100, with negative scores representing negatively-valenced emotions and positive scores representing positively-valenced emotions, and with higher magnitude scores representing greater emotional intensity and lower magnitude scores representing greater emotional intensity.

Figure 17:
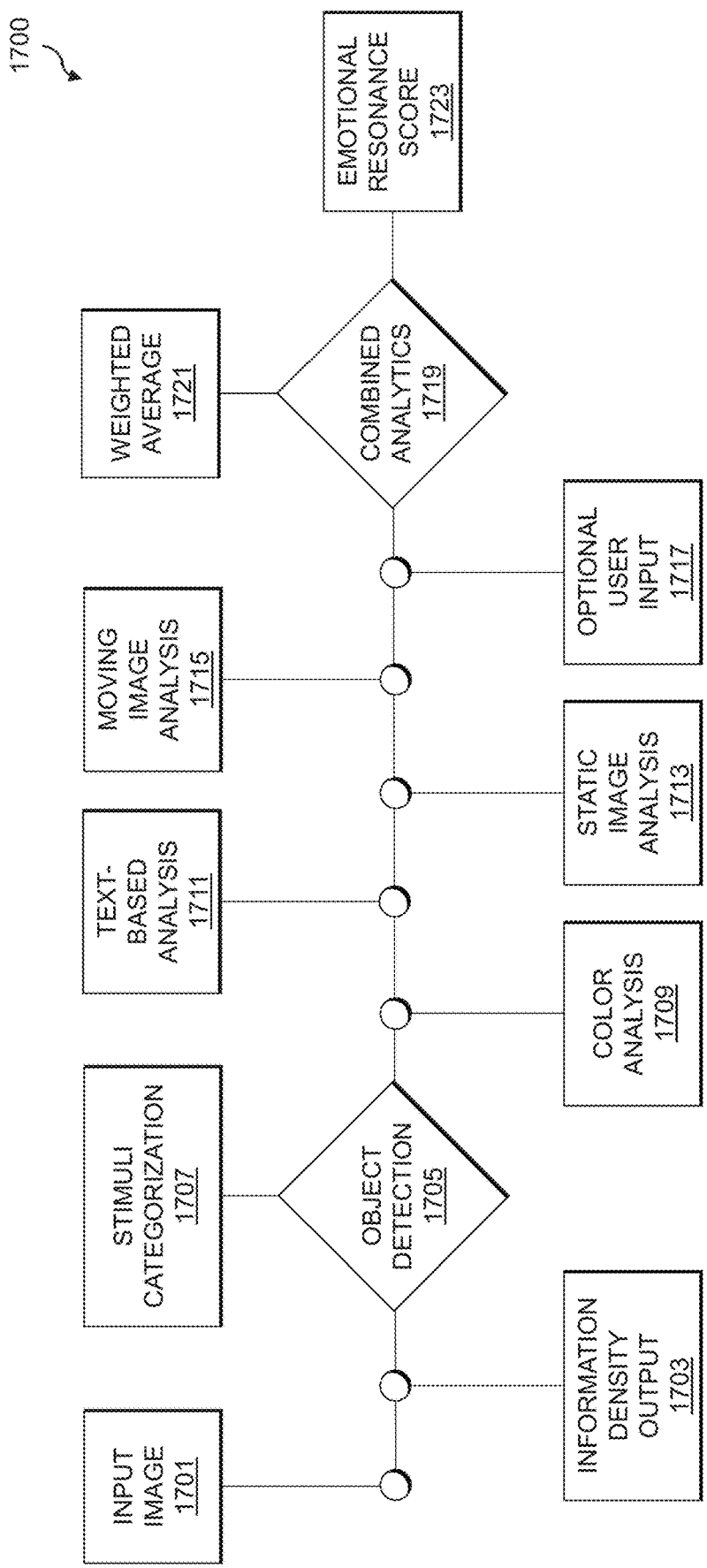
FIG. 17 shows a system flow for an emotional resonance scoring tool in an illustrative embodiment.

FIG. 17 shows a system flow 1700 for the emotional resonance scoring tool 120. The system flow 1700 receives an input image or other visual stimulus 1701 (e.g., entered by a user into the information density toolkit system 110). The input image 1701, in some embodiments, is tagged with or includes optional user-specified AOIs. Information density output or mapping 1703 is also received, which includes spatial clustering output from the information density mapping tool 112. Object detection 1705 is then performed to determine stimuli categorization 1707. The object detection 1705 may include optional specifications and algorithm selection to recognize objects and perform semantic segmentation. The object detection 1705 uses the input image 1701 and information density mapping 1703 to detect, recognize and classify objects within the image into one of a set of different types of stimuli, such as: text-based stimuli; static image stimuli; moving image (e.g., movies, animations, etc.) stimuli; optional user input stimuli; etc., output as the stimuli categorization 1707.

Color analysis 1709 is then performed on any identified object and/or any user-specified AOIs. In order to facilitate this, the color-emotion analysis tool 118 may be called. For each identified object, the color-emotion analysis tool 118 may provide a color emotion score (e.g., based on the Geneva Emotion Wheel).

Text-based analysis 1711 (e.g., NLP) is performed for any identified text-based objects. Text-based analysis 1711 may include performing a sentiment analysis using various NLP methodologies. The algorithm may begin with extracting the text data, and then evaluating the extracted text data with a sentiment lexicon (e.g., the Valence Aware Dictionary) and a sentiment classifier (e.g., the Valence Aware Dictionary and sEntiment Reasoner (VADER) algorithm). The text-based analysis 1711 will then produce an emotional resonance score for each identified text object. It should be noted that the text-based analysis 1711 can be performed on any language, with the precondition that an existing sentiment lexicon for that language can be identified.

Static image analysis 1713 includes analysis of any identified static image objects, by training a semantic segmentation network using deep learning. Each individual pixel may be classified, which results in an output image segmented by class. A default list of classes (e.g., faces, laptop, smile, etc.) is pre-trained and "built-in" to the emotional resonance scoring tool 120. This list can be updated by uploading appropriate image files for training (e.g., an additional class labeled "keyboard" can be added by uploading a training set of images of keyboards). The identified classes of image objects are then scored for emotional content.

Moving image analysis 1715 includes analysis of any identified moving images (e.g., movie files, files that contain animated content, etc.). The user can specify this content for analysis, and requires inputting a separate file that contains only the movie. The movie file will subsequently be broken down into stills. The emotional resonance scoring tool 120 will automatically detect the content within the original input by comparing any identified static images to user-inputted movie stills. The movie will then be analyzed in the same fashion as static images during static image analysis 1713. The emotional content of each static image will be scored and a combined average will be provided for the movie object as a whole.

Optional user input 1717 is then processed. The user may optionally input data to modify the analysis. For example, a user may hypothesize that an individual's recent customer satisfaction score might affect his or her emotional experience. The user must then input a set of components such as: a score; the range of possible scores; and the weight that should be applied to this input relative to the other identified stimuli. The optional user input 1717 can be any hypothesized modifier, as long as the three aforementioned components are satisfied.

Combined analytics 1719 are then performed, which may include determining relative size, preferential access, stimuli quantity and potential impact. A weighted average 1721 may be output by the combined analytics 1719 once an emotional resonance score has been attached to each identified object. In some embodiments, two types of weights are considered: analysis type (e.g., color vs. text-based analysis); and relative object size. These weights are combined with individual object scores, and scaled between −100 and 100 to calculate an overall emotional resonance score.

The final output of the system flow 1700 is an emotional resonance score 1723, which is a numeric output (e.g., in a range between −100 and 100). Negative numbers indicate negative valence (e.g., sad), while positive numbers indicate positive valence (e.g., happy). Low magnitude numbers indicate low intensity (e.g., content), whereas high magnitude numbers indicate high intensity (e.g., ecstatic). This number can be displayed independently to the user and/or used as input to other tools within the information density toolkit system 110.

Conventional approaches for capturing the emotional resonance of content are limited to A/B testing or user testing. While such conventional approaches may be useful, they lack the ability for prediction and scaling. The automated approach provided by the emotional resonance scoring tool 120 described herein directly addresses these and other drawbacks of conventional approaches. The emotional resonance scoring tool 120 represents a novel approach for measuring and predicting a viewer's emotional response to visual content. By providing a numeric emotional resonance score, users are given the ability to directly compare content (e.g., two prototypes of a product) and contrast the predicted effectiveness of their designs at eliciting an emotional reaction. For example, if version 1.0 received a score of −45 and version 2.0 received a score of 30, one can conclude that there was a 75 point increase from negative to positive emotional content, but a 15 point decrease in the intensity of the emotional content from version 1.0 to 2.0. The emotional resonance scoring tool 120 can also automatically identify and classify different types of content, and then measure those separate components based on established, scientific knowledge of how humans perceive various types of stimuli. The emotional resonance scoring tool 120 then combines individual component scores into a single comprehensive and interpretable emotional resonance score. The emotional resonance scoring tool 120 therefore provides a comprehensive solution, rather than conventional approaches which are typically limited to analyzing a single type of data (e.g., only text, or only static images).

While the connections between consumers' emotional states and consumption patterns are well documented, conventional approaches lack the ability to measure content's emotional resonance and use that quantification to predict consumptions patterns. The emotional resonance scoring tool 120 bridges this gap, allowing for a direct, measurable relationship between content's capacity for eliciting emotional responses and consumptive behavior. This is true of any visual stimulus, ranging from products to web design. Moreover, the emotional resonance scoring tool 120 may be used as part of a larger suite of analytic tools provided by the information density toolkit system 110, addressing an often overlooked, yet highly impactful, element of decision making: consumer emotions. By quantifying a typically nebulous and difficult-to-constrain concept, the automated emotional resonance scoring tool 120 offers a scalable solution to measurably improve design analytics, customer experience, brand loyalty and conversion rates.

Figure 18:
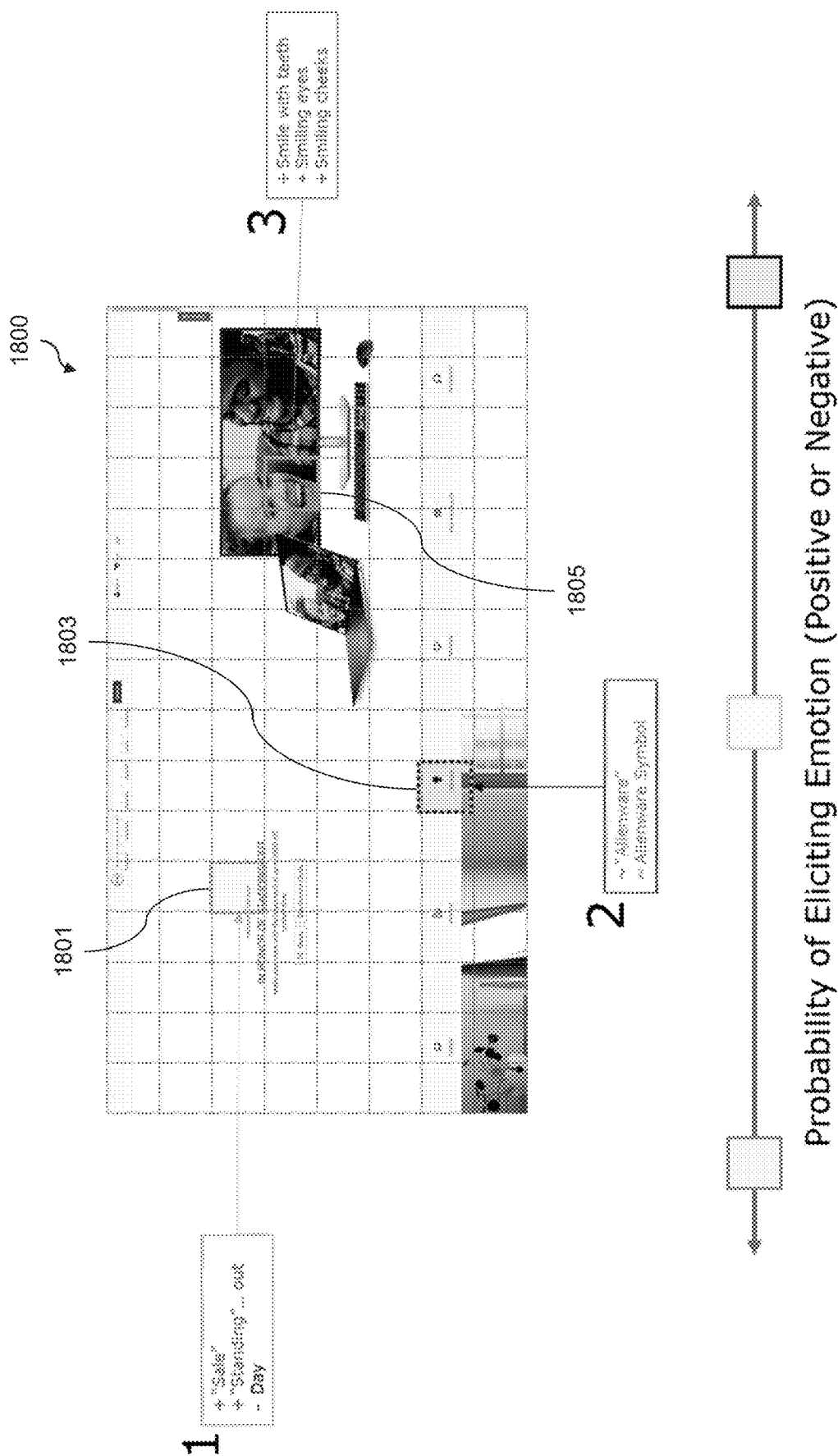
FIG. 18 shows an example of generation of emotional resonance scores for an input image in an illustrative embodiment.

FIG. 18 shows an example 1800 of an input visual stimulus (e.g., a website homepage) overlayed with a grid. In this example, the user has chosen three grid squares 1801, 1803 and 1805 as areas of interest. The emotional resonance scoring tool 120 evaluates each of the grid squares 1801, 1803 and 1805 for emotional content (e.g., emotional imagery, text, or color associations). The probability that the content within each square will elicit an emotional response from a viewer is represented here with colors (Light Grey: High; White: Medium; Dark Grey: Low). It is important to note that the output represents the likelihood of eliciting any emotion (e.g., positive or negative) and should not be interpreted as the likelihood of eliciting a positive or negative emotion.

An exemplary process for emotional resonance scoring of a visual stimulus will now be described in more detail with reference to the flow diagram of FIG. 19. It is to be understood that this particular process is only an example, and that additional or alternative processes for emotional resonance scoring of a visual stimulus may be used in other embodiments.

In this embodiment, the process includes steps 1900 through 1906. These steps are assumed to be performed by the information density toolkit system 110 utilizing the emotional resonance scoring tool 120 and the design personalization tool 124.

The process begins with step 1900, obtaining an information density matrix for an input visual stimulus, the information density matrix characterizing information density of feature points in the input visual stimulus. The input visual stimulus may comprise an image file. The image file may be of a product, an application screen or portions thereof, a website or webpage or portion thereof, a document, etc., that is to be analyzed for its associated emotional resonance.

In step 1902, content of the input visual stimulus is analyzed utilizing the information density matrix to identify one or more objects in the input visual stimulus. Step 1902 may include identifying objects in one or more user-specified areas of interest within the input visual stimulus. Emotional resonance scores associated with each of the one or more objects in the input visual stimulus are determined in step 1904. A given emotional resonance score for a given one of the one or more objects characterizes an intensity and an emotional valence of an emotional effect of the given object on a user viewing the input visual stimulus. Step 1904 may comprise performing color-emotion analysis to generate a color-emotion score characterizing the emotional effect of the given object on the user viewing the input visual stimulus based at least in part on one or more colors in the given object.

In some embodiments, determining the emotional resonance scores for the one or more objects comprises classifying stimuli type of the one or more objects, the stimuli type comprising at least one of text-based stimuli, static image stimuli, and moving image stimuli. The FIG. 19 process may further include determining an overall emotional resonance score for the input visual stimulus as a weighted average of the emotional resonance scores determined for the one or more objects, wherein weights are assigned to the one or more objects based at least in part on the classified stimuli type of the one or more objects and relative object size of the one or more objects. Determining the overall emotional resonance score for the input visual stimulus may be further based at least in part on a user-input emotional resonance score component for the user viewing the input visual stimulus, the user-input emotional resonance score component characterizing external factors affecting emotion of the given user at least one of prior to and during viewing of the input visual stimulus. The overall emotional resonance score for the input visual stimulus may have a magnitude characterizing an overall intensity of an emotional effect of the input visual stimulus on the user and a sign characterizing an overall emotional valence of the emotional effect of the input visual stimulus on the user.

The given object may comprise text content, and determining the given emotional resonance score for the given object may comprise extracting the text content from the given object and performing sentiment analysis for the text content using a machine learning-based sentiment classifier. The given object may also or alternatively comprise one or more static images, and determining the given emotional resonance score for the given object may comprise utilizing a machine learning-based semantic segmentation network that identifies, for each of one or more portions of the one or more static images, one of a set of semantic classes, and generating the given emotional resonance score based at least in part on the identified semantic classes for the one or more static images. The given object may also or alternatively comprise one or more moving images, and determining the given emotional resonance score for the given object may comprise breaking down the one or more moving images into two or more static images, generating an emotional resonance score component for each of the two or more static images, and determining the given emotional resonance score for the given object based at least in part on an average of the emotional resonance score components for the two or more static images.

Figure 19:
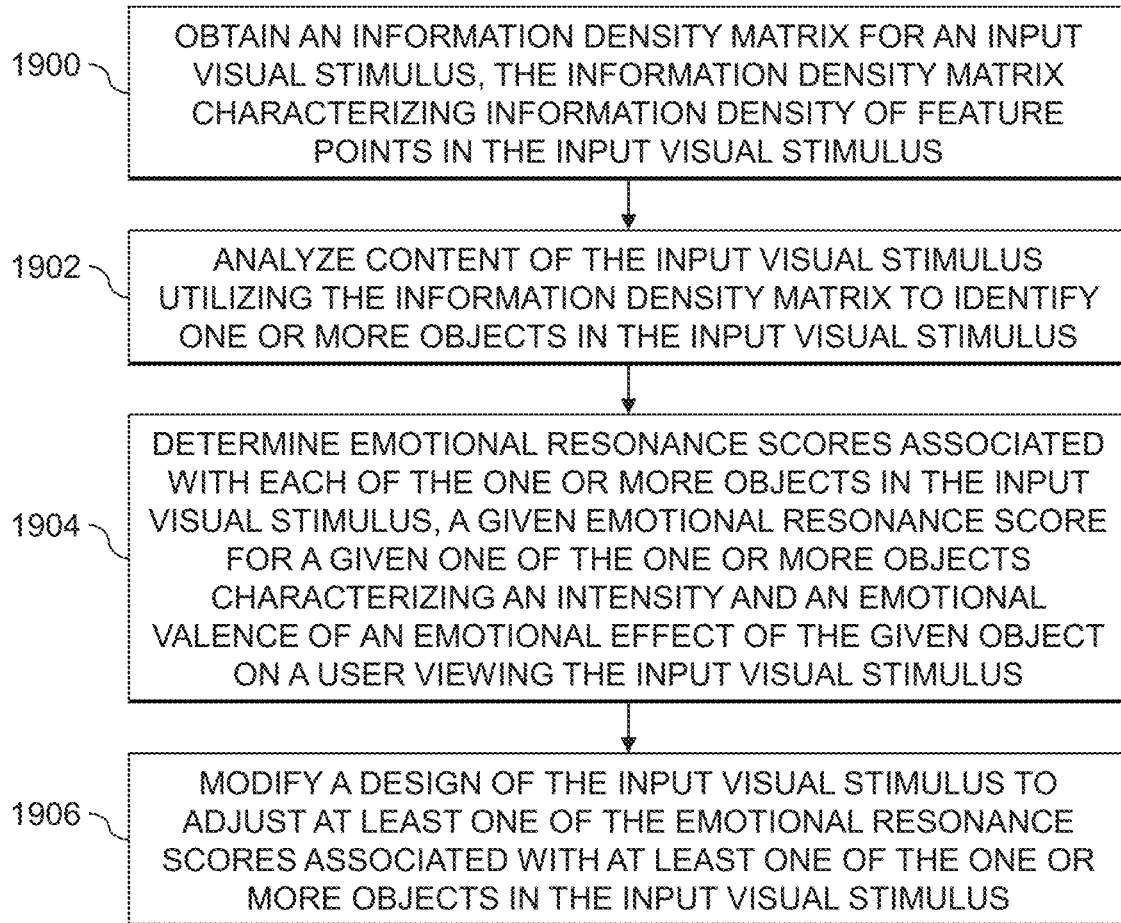
FIG. 19 is a flow diagram of an exemplary process for emotional resonance scoring of a visual stimulus in an illustrative embodiment.

In some embodiments, the FIG. 19 process further comprises generating a visualization comprising a grid of equally spaced bins overlaying the input visual stimulus. Each of the bins may be associated with a probability that content within that bin will elicit an emotional response from the user viewing the input visual stimulus, the probability being determined based at least in part on the emotional resonance scores determined for the one or more objects.

The FIG. 19 process continues with step 1906, modifying a design of the input visual stimulus to adjust at least one of the emotional resonance scores associated with at least one of the one or more objects in the input visual stimulus. Step 1906 may comprise modifying at least one of the one or more objects to adjust its emotional resonance score relative to the emotional resonance scores of other ones of the one or more objects in the input visual stimulus. Step 1906 may also or alternatively comprise modifying information content of at least one of the one or more objects in the input visual stimulus and modifying a size of at least one of the one or more objects in the input visual stimulus.

Visual attention is often preceded by a pause in eye-movement on an area of interest, which is referred to as a "fixation." A fixation refers to the orientation of the eyes so that the image of a viewed object falls on each fovea, in the central part of the retina. Visual attention refers to the process by which one item (e.g., a target) is selected for analysis from among several computing items (e.g., distractors). Research demonstrates that eyes selectively fixate on areas that are the most informative, and that cognitive factors such as behavioral intent can have a substantial impact on the spatial and temporal dynamics of these fixation patterns. Given that the average time consumers spend inspecting a visual stimulus (e.g., a novel product or webpage) can be measured in seconds, it is important for designers to be able to prioritize a user's visual attention to a desired area (e.g., to a CTA button, to a new product feature, etc.). There is currently no automated method of using top-down cognitive factors (e.g., cognitive load, emotional resonance, and behavioral intent) and behavioral biases (e.g., horizontal and vertical visual biases) to predict whether or not a user will attend to an object or area of interest. In tandem with other tools of the information density toolkit system 110 (e.g., the information density mapping tool 112, the cognitive load index generation tool 114, the behavioral intent estimation tool 116, the color-emotion analysis tool 118, the emotional resonance scoring tool 120, and the design personalization tool 124), the visual attention likelihood estimation tool 122 offers researchers and designers a means of predicting the most likely locations within a visual stimulus to draw a user's attention. The visual attention likelihood estimation tool 122 can be used to improve digital content and design, which should lead to increases in direct (e.g., conversion rates, invention licensing, etc.) and indirect (e.g., CLTV, engagement, usability, etc.) revenue.

Figure 20A:
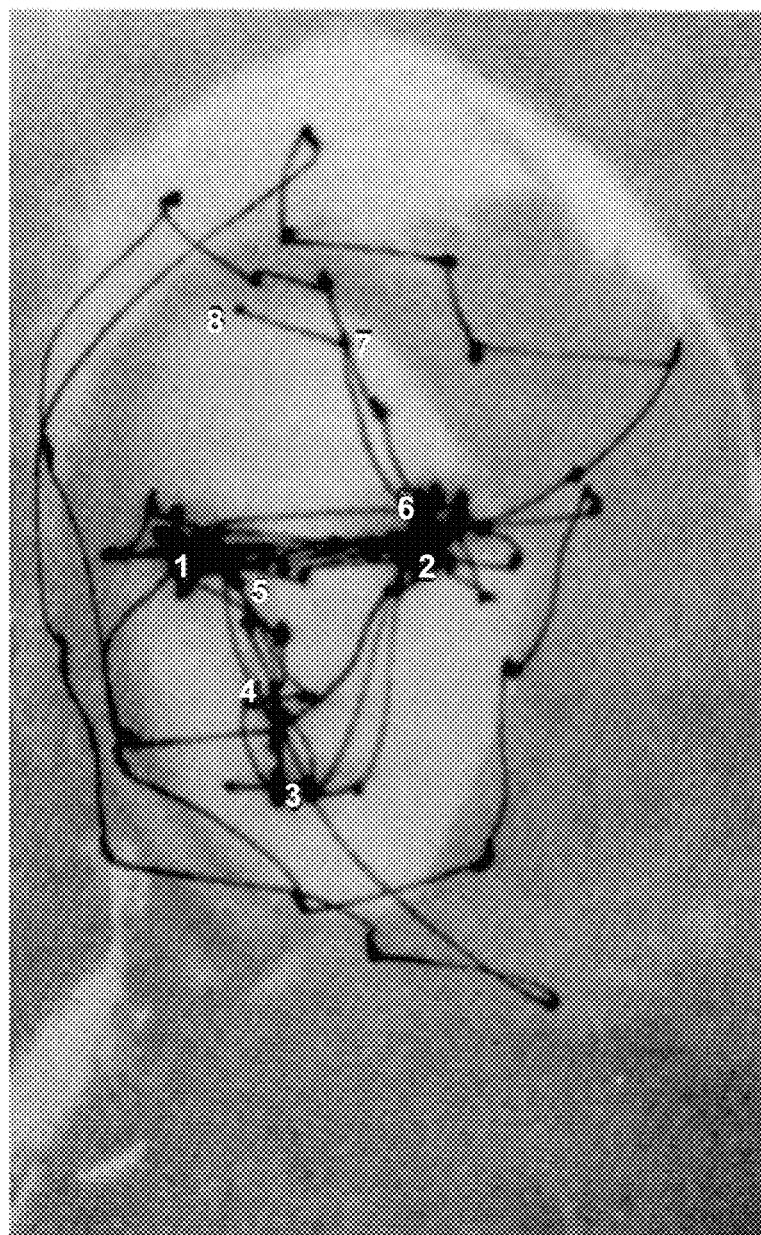
FIGS. 20A and 20B show examples of eye-tracking fixation patterns in an illustrative embodiment.
Figure 20B:
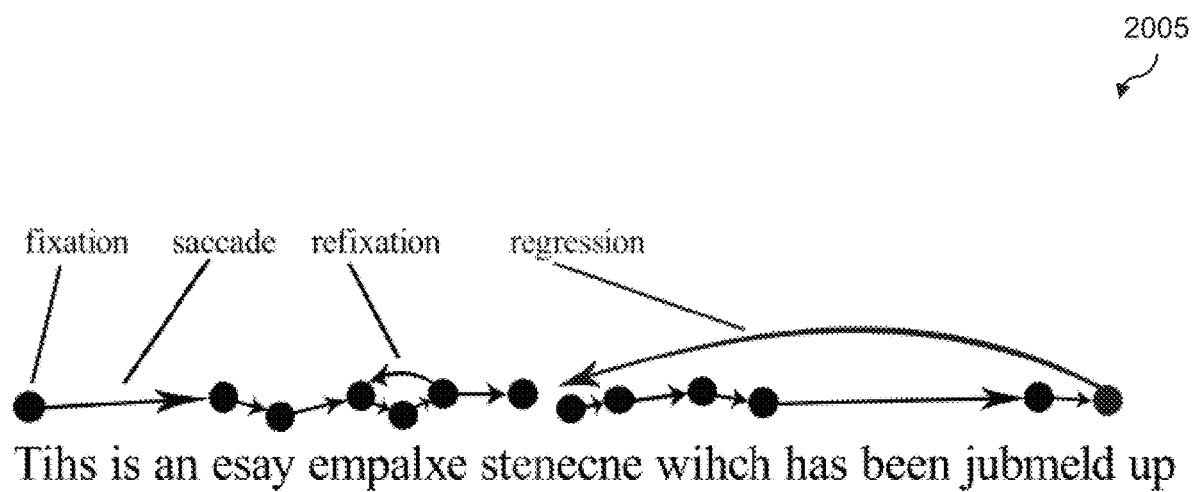

When individuals view products, webpages or other visual stimulus, their eyes will quickly move from one area of interest to another, stopping briefly at certain points on the screen to gather information. These targeted pauses in eye-movements are called "fixations." FIGS. 20A and 20B show examples 2000 and 2005 of fixations as a user views different visual stimulus. The brain takes a "snapshot" at each fixation point and then stitches together the bits of information from each fixation to generate a higher resolution mental picture of the visual environment. The example 2000 of FIG. 20A shows an eye-tracking fixation pattern for an image of a face, with the labeled numbers illustrating an example fixation sequence that begins at the woman's left eye (1), and the moves to the right eye (2), the mouth (3), the nose (4), back to the eyes (5) and (6), and finally to the forehead (7) and hairline (8). The example 2005 of FIG. 20B shows an eye-tracking fixation pattern for text-based reading. The circles indicate fixation points where the eye stops, commonly skipping words or portions of words. The brain combines the fixations as one moves along to complete the sentence cognitively afterwards. This cognitive stitching process allows readers to easily comprehend misspelled words—often completely subconsciously.

In humans, the center of the visual field is not only associated with the highest visual acuity, but also with a greater number of neurons dedicated to the processing of that information relative to the periphery. According to neuroscience research, a central task of the attentional system of the human brain is controlling gaze, along with retrieving and filtering relevant features from the environment. Therefore, determining where, when, and how long to fixate our eyes on an object are small, but very important decisions for our brains to make at any given moment. Even seemingly insignificant changes to a fixation pattern can completely alter how an individual perceives an environment. The importance of visual attention is exemplified by a phenomenon called "inattentional blindness," in which an object can be clearly visible, but not "seen." Unattended objects cannot be perceived or later recalled, because the brain has filtered out and discarded that information in order to preferentially allocate cognitive resources to attended objects. In other words, if an individual's eyes and subsequent visual attention have not been focused on a particular object, the brain will not perceive that object, nor will that individual be able to recall that object in the future.

Bottom-up information processing is information processing in which incoming stimulus data initiate and determine the higher-level processes involved in their recognition, interpretation, and categorization. For example, in vision, features would be combined into objects, and objects into scenes, recognition of which would be based only on the information in the stimulus input. Typically, perceptual or cognitive mechanisms use bottom-up processing when information is unfamiliar or highly complex. Top-down information processing is information processing in which an overall hypothesis about or general conceptualization of a stimulus is applied to and influences the analysis of incoming stimulus data. For example, in reading, knowledge about letter and word frequencies, syntax, and other regularities in language guides recognition of incoming information. In this type of processing, a person's higher-level knowledge, concepts, or expectations influence the processing of lower level information (see proofreader's illusion). Typically, perceptual or cognitive mechanisms use top-down processing when information is familiar and not especially complex.

Eye movements reflect an individual's search for information, and this process is simultaneously influenced by both "bottom-up" stimuli-driven factors as well as "top-down" cognitive factors. Bottom-up factors represent low-level visual factors that can draw the eye, such as color, luminance, and movement. There are also bottom-up behavioral biases, such as vertical and horizontal visual biases that reflect our tendency to inspect scenes from left-to-right and top-to-bottom. Top-down factors, such as cognitive load, emotional resonance, and behavioral intent, also dictate the way in which eyes move. For example, research demonstrates that as task difficulty and cognitive load increase, individuals will fixate more often and for a longer duration in order to fully comprehend the task at hand.

Similarly, behavioral intent can categorically change the spatial and temporal patterns of eye-movements, leading individuals to fixate on task-relevant objects, while ignoring more visually salient (but task-irrelevant) stimuli. The affective nature of a stimulus can also have a substantial impact in how an individual explores a visual environment, with emotional stimuli often biasing attention. This is especially true in social contexts, wherein research shows that gaze allocation is more often directed at facial areas that express emotions (e.g., someone's eyes and mouth) relative to other more visually salient areas (e.g., a shiny earring). Thus, cognitive load and intent fundamentally change the way an individual moves their eyes when completing a visual task.

Figure 21:
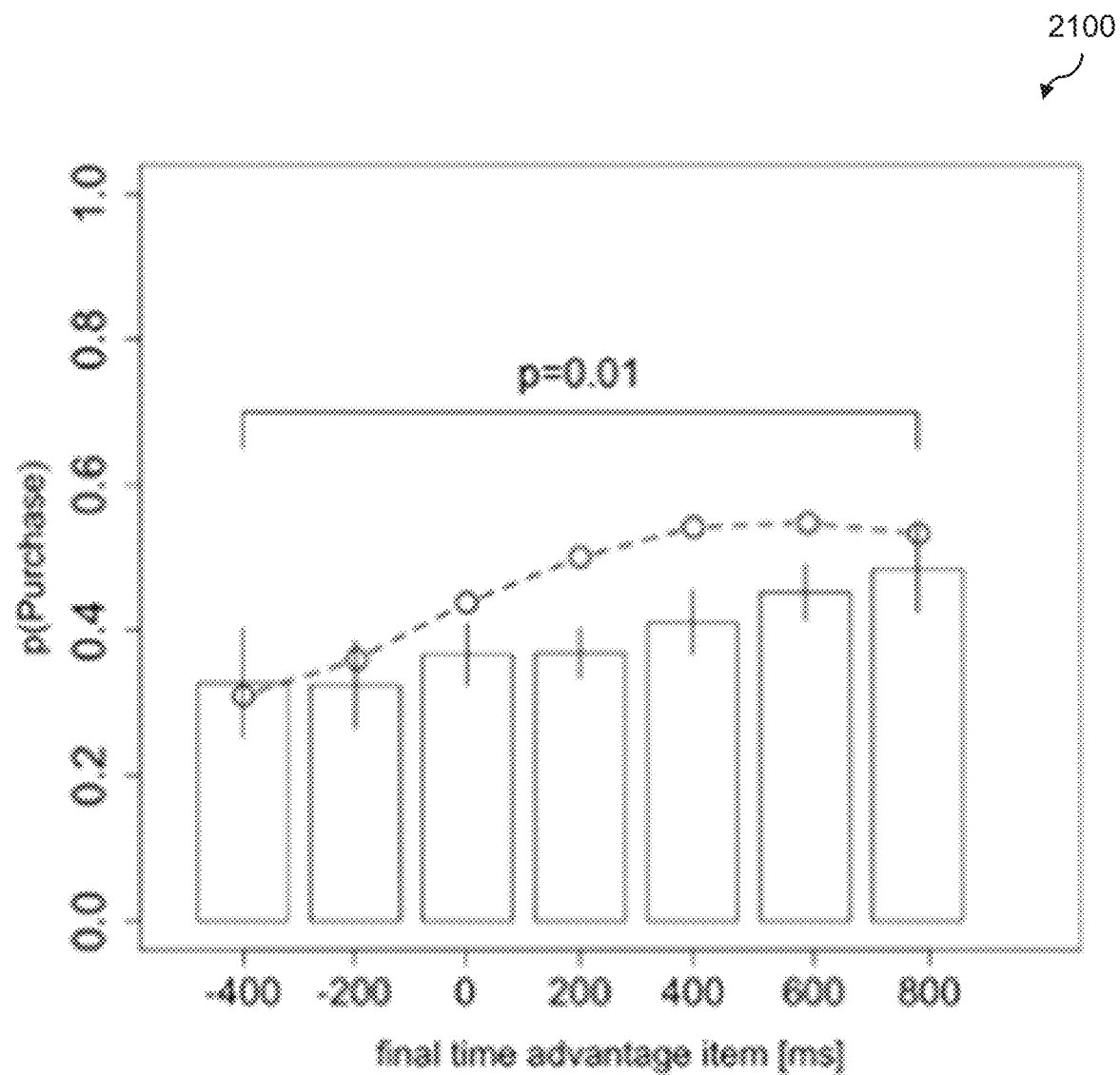
FIG. 21 shows a plot illustrating correlation between fixation time and likelihood of purchasing a product in an illustrative embodiment.

It is also important to note that eye fixation on a particular object actually biases subsequent choice of that object in a decision environment. This means that, when a consumer has spent more time looking at object A compared to object B, that person will be more likely to purchase object A over object B. This research underscores the utility of accurate predictions of consumers' visual attention. FIG. 21 shows a plot 2100, illustrating the correlation between fixation time and likelihood of purchase. As total fixation time on a product increases, the probability of purchasing that product significantly increases.

Given this background, it is evident why it is useful to be able to predict where an individual might focus his or her attention when viewing a visual stimulus (e.g., a product, a webpage, etc.) to ensure that desired areas of interest are engaged with as intended by the designer, and to predict the likelihood of a particular design to bias a viewer's choice behavior. In addition to conventional research-based eye-tracking methods that offer post-hoc analyses of visual content, there are conventional approaches (e.g., computer algorithms) that have been developed to predict eye movements based on low-level bottom-up features within visual scenes. However, such conventional approaches do not incorporate important behavioral biases and top-down cognitive factors that can bias visual attention, such as: vertical and horizontal biases; viewer intent; a viewer's cognitive load; and the emotional salience of stimuli.

An individual's behavioral intent, along with the cognitive demands and emotional salience of the visual environment, are important cognitive factors that determine where that individual's visual attention will be placed at any given moment. However, designers and researchers do not currently have a method of using cognitive factors to predict the most likely locations of visual attention when viewing an input stimulus (e.g., an object, a product, a website, etc.). Conventional approaches for eye-movement analysis are typically limited to research settings using in-lab or remote (e.g., web-based) eye-tracking software and/or hardware. While some conventional approaches provide automated algorithms to predict eye-movements, such predictions are typically based on low-level visual salience features (e.g., color, luminance, etc.) with little or no incorporation of top-down cognitive factors. A predictive, automated method of estimating likely fixation patterns based on behavioral intent, cognitive load, and emotional resonance would be of great value as a scalable means of evaluating a design's potential effectiveness. By predicting the likelihood of visual attention to fall within one area (e.g., a high value product) over a second area (e.g., a low value product), one can optimize designs (e.g., products, website layouts, product assortments, etc.) to maximize targeted attention by its viewers. Therefore, estimations of the most likely areas of a design to elicit visual attention can act as a measure of that design's effectiveness in transmitting information. This is particularly relevant in decision-making contexts, as fixation time on one option over another option will bias an individual's choice towards the option associated with the longest fixation time.

A design's effectiveness relies on its ability to transmit the intended information to its viewer. Likewise, visual perception and information processing rely on eye fixations to areas of high information. Visual environments and tasks that place high cognitive demands on an individual viewer will limit the way that individual's visual attention is allocated, thereby limiting the potential effectiveness of a design. Presently, there is no methodology that can estimate the most likely areas of visual attention based on the estimated cognitive load of viewers. Conventional approaches either rely on eye-tracking in the lab or with webcams (which cannot be automated, offer advanced predictions, or be applied at scale), or on computer algorithms that are less accurate due to their lack of incorporation of the effects of cognitive load on visual attention. The cognitive load index generation tool 114, described above, provides a solution for measuring cognitive load of visual stimulus.

The human brain uses visual attention to allocate cognitive resources to relevant aspects of an environment when completing a task, effectively filtering out most task-irrelevant information. Behavioral intent (e.g., browsing vs. searching) determines which visual features are relevant or not at any given moment. Therefore, behavioral intent plays a vastly important role in dictating which features within a visual environment are most likely to elicit visual attention. While methodologies have been developed to predict behavioral intent from eye movement patterns, predicting eye movement patterns based on intent has yet to be accomplished, likely due to the covert nature of behavioral intent and the subsequent difficulty in predicting and measuring that intent. The behavioral intent estimation tool 116, described above, provides a solution for predicting behavioral intent given an input visual stimulus.

Due to our social nature, the human brain has evolved to prioritize visual content that conveys emotion, especially regarding faces and body posture. Visual attention is largely biased towards emotion-conveying areas of a face, irrespective of other areas that are more visually salient. Irrespective of whether the stimulus is social (e.g., a face) or non-social (e.g., text), the emotion being conveyed by that stimulus typically elicits individual approach and avoidance behaviors. Therefore, the emotional resonance of an object or feature can bias visual attention either toward (e.g., approach behavior) or away (e.g., avoidance behavior) from it. This suggests that any algorithm predicting eye movement patterns should take into consideration not just low-level features of visual salience, but also the emotional content of the visual environment. However, conventional approaches fail to capture the way in which emotional content elicits visual attention. The color-emotion analysis tool 118 and the emotional resonance scoring tool 120 provide a solution for determining the emotional resonance of an input visual stimulus.

Humans, in general, have a left-right horizontal viewing bias. Although this bias can be lessened by cultural factors (e.g., in cultures where the written language is read from right to left), it still represents a strong behavioral bias during visual exploration. A left-to-right bias has even been observed in other species, including monkeys and dogs. There also exists a similar vertical bias towards the top of one's visual field (e.g., top of the screen) or the "top" of a representation or object (e.g., the head of a figure). As a result of these horizontal and vertical biases, the diagonal from the top-left to the bottom-right of a visual field represents the optimal optical placement for naturally attracting visual attention.

The visual attention likelihood estimation tool 122 takes input from a visual stimulus, and from various other tools of the information density toolkit system 110 (e.g., the information density mapping tool 112, the cognitive load index generation tool 114, the behavioral intent estimation tool 116, the color-emotion analysis tool 118, and the emotional resonance scoring tool 120), and returns an estimation of the likelihood that one or more AOIs will elicit visual attention. If the user does not specify any AOIs, then the one or more clusters identified by the information density mapping tool 112 can serve as default AOIs.

Figure 22:
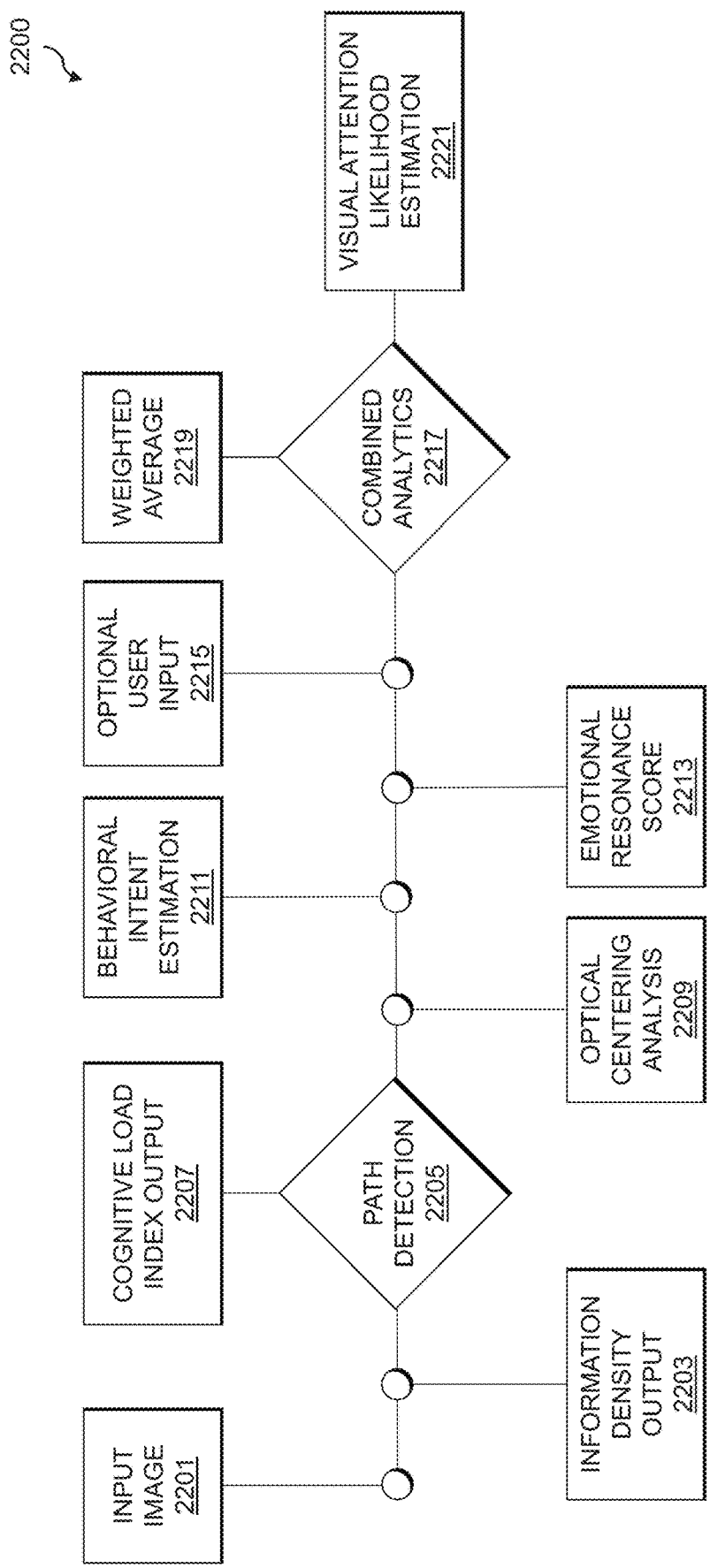
FIG. 22 shows a system flow for a visual attention likelihood estimation tool in an illustrative embodiment.

FIG. 22 shows a system flow 2200 for operation of the visual attention likelihood estimation tool 122. The visual attention likelihood estimation tool 122 takes as input a visual stimulus or image 2201, as well as an information density output 2203 (e.g., from the information density mapping tool 112), which are input to path detection 2205 resulting in cognitive load index output 2207 (e.g., from the cognitive load index generation tool 114). The path detection 2205 may include optional specifications and selection of algorithms, as well as object recognition and semantic segmentation. Optical centering analysis 2209 is then performed, followed by behavioral intent estimation 2211 (e.g., from the behavioral intent estimation tool 116, or from manual input) and emotional resonance scoring 2213 (e.g., from the emotional resonance scoring tool 120). The user also has the option of including additional optional user input 2215 (e.g., measures and their associated weights via manual input). The various cognitive measures are then provided to combined analytics 2217. The combined analytics 2217 can scale, weight and combine the various measures (e.g., information density output 2203, the cognitive load index output 2207, the optical centering analysis 2209, the behavioral intent estimation 2211, the emotional resonance score 2213 and optional user input 2215) into one measure within user-specified AOIs to product the weighted average 2219. The weighted average 2219 will be used as part of combined analytics 2217 to generate an output measure referred to as a visual attention likelihood estimation 2221 (e.g., in the form of a percentage, with a range from 0-100%).

Conventional approaches for predicting visual attention primarily rely on low level visual cues (e.g., contrast, luminance, etc.). Some algorithms take into consideration more higher-level cognitive factors, such as whether the visual stimulus contains a face. However, the conventional approaches do not consider high-level factors such as cognitive load, emotional resonance, behavioral intent, and optical centering biases that are considered by the visual attention likelihood estimation tool 122.

The visual attention likelihood estimation tool 122 provides a number of advantages, including in the consideration of cognitive load, emotional resonance, intent relevance, and optical centering components. The in-moment cognitive demands placed on individuals constrains the spatial allocation of visual attention. The visual attention likelihood estimation tool 122 utilizes this insight by incorporating a quantitative measure of cognitive load (e.g., provided via the cognitive load index generation tool 114) into the visual attention likelihood prediction. An individual's intent has a profound impact on what he or she sees and attends to within a visual environment. The visual attention likelihood estimation tool 122 takes advantage of this insight by taking behavioral intent (e.g., provided via the behavioral intent estimation tool 116) as input into the visual attention likelihood prediction. The emotional content of a visual environment can affect an individual's eye-movements and visual attention. The visual attention likelihood estimation tool 122 capitalizes on this insight by incorporating a quantitative measure of emotional resonance (e.g., provided via the color-emotion analysis tool 118 and the emotional resonance scoring tool 120) into the visual attention likelihood prediction.

Due to the evolutionary vertical and horizontal visual biases, humans' optical center is not the same as true center. Viewing patterns tend to be biased from left-to-right and top-to-bottom. The visual attention likelihood estimation tool 122 utilizes such insights in order to deliver better predictions of visual attention likelihood at any given spatial coordinate.

Figure 23:
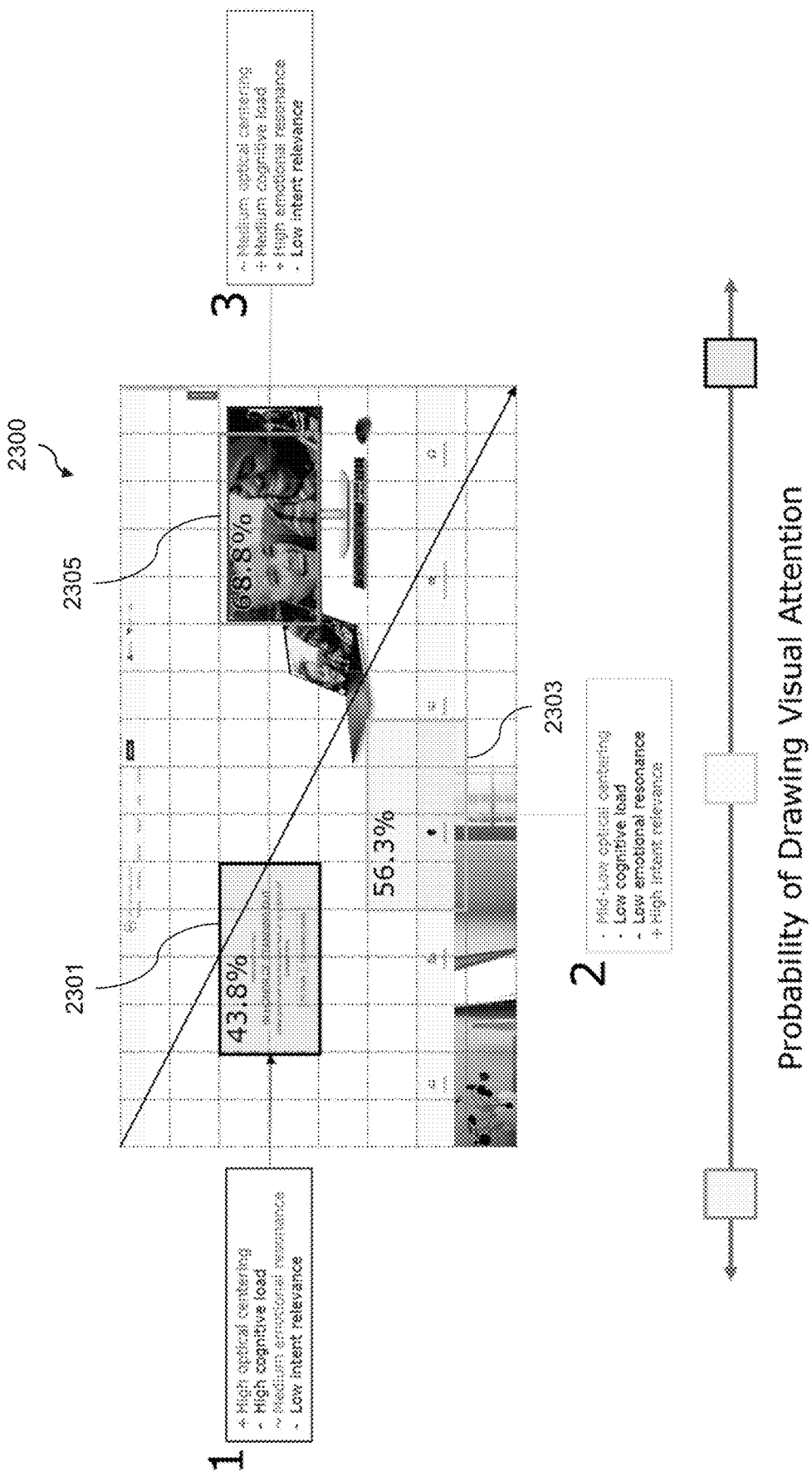
FIG. 23 shows an example of generation of visual attention likelihood estimates in an illustrative embodiment.

FIG. 23 shows an example 2300 of visual attention likelihood estimations for three AOIs 2301, 2303 and 2305 on a website homepage. Here, behavioral intent is representative of a user seeking technical specifications post-purchase. The AOI 2301 receives a 43.8% likelihood. The AOI 2301 ranks: high on optical centering (e.g., it bisects the center line high up); high on cognitive load (e.g., it has high information content); medium on emotional resonance (e.g., via its emotional word choices); and low on intent (e.g., little relevant information). The AOI 2303 in the bottom center receives a 56.3% likelihood of receiving visual attention. The AOI 2303 ranks: middle-low on optical centering (e.g., it is below the center line); low on cognitive load (e.g., it has little information content); low on emotional resonance (e.g., it has no emotional information); and high on intent (e.g., it has highly relevant information). The AOI 2305 in the top right receives a 68.8% likelihood of receiving visual attention. The AOI 2305 ranks: medium on optical centering (e.g., it is just above center line); medium on cognitive load (e.g., it has medium information content); high on emotional resonance (e.g., via emotion conveyed through faces); and low on intent (e.g., it has little relevant information).

Figure 24:
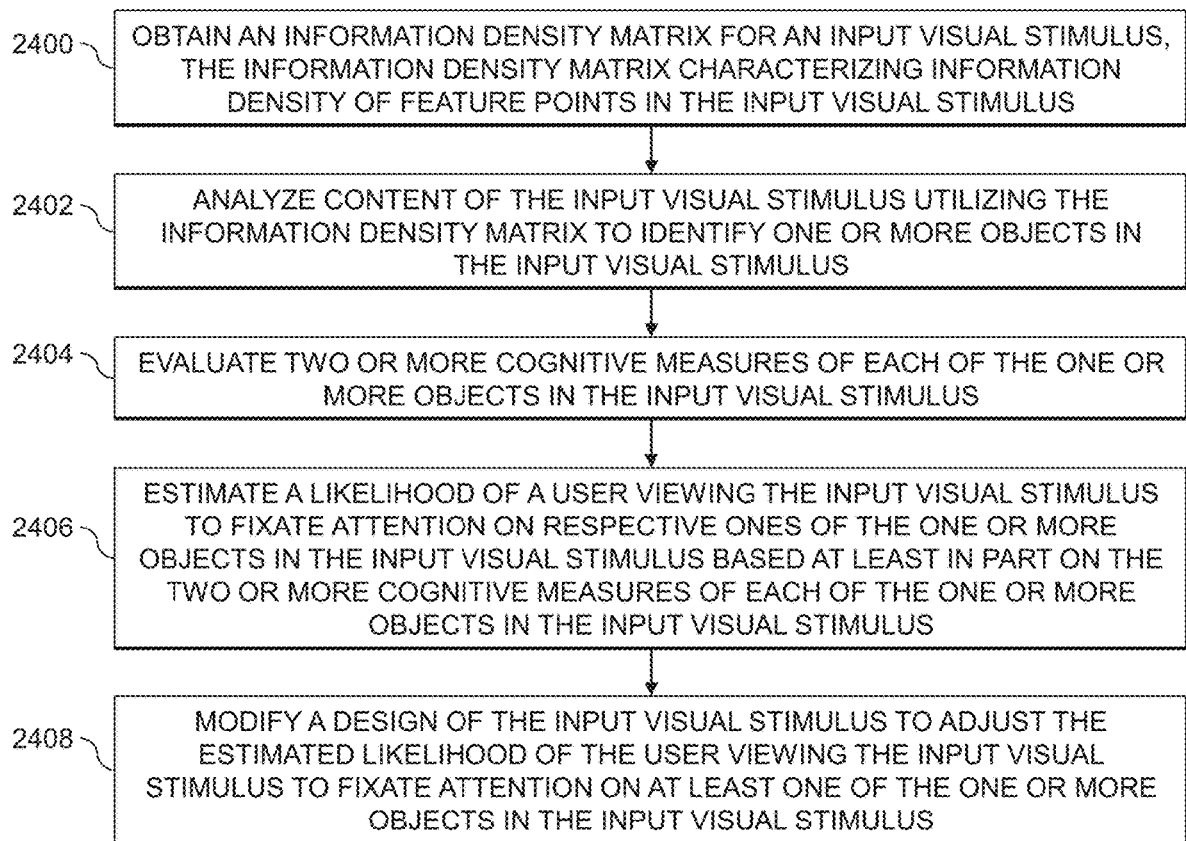
FIG. 24 is a flow diagram of an exemplary process for visual attention likelihood estimation of a visual stimulus in an illustrative embodiment.

An exemplary process for visual attention likelihood estimation for objects of a visual stimulus will now be described in more detail with reference to the flow diagram of FIG. 24. It is to be understood that this particular process is only an example, and that additional or alternative processes for visual attention likelihood estimation for objects of a visual stimulus may be used in other embodiments.

In this embodiment, the process includes steps 2400 through 2408. These steps are assumed to be performed by the information density toolkit system 110 utilizing the visual attention likelihood estimation tool 122 and the design personalization tool 124.

The process begins with step 2400, obtaining an information density matrix for an input visual stimulus, the information density matrix characterizing information density of feature points in the input visual stimulus. The input visual stimulus may comprise an image file. The image file may be of a product, an application screen or portions thereof, a website or webpage or portion thereof, a document, etc., that is to be analyzed for its associated visual attention likelihood estimations.

In step 2402, content of the input visual stimulus is analyzed utilizing the information density matrix to identify one or more objects in the input visual stimulus. The one or more objects may comprise areas of interest corresponding to clusters of feature points in the information density matrix. At least one of the one or more objects may comprise a user-specified area of interest.

Two or more cognitive measures are evaluated in step 2404 for each of the one or more objects in the input visual stimulus. The two or more cognitive measures for a given one of the one or more objects may comprise a cognitive load index measure, an optical centering measure, a behavioral intent estimation measure, an emotional resonance measure, and one or more user-input cognitive measures. The cognitive load index measure characterizes cognitive energy required to mentally process the given object in the input visual stimulus. The optical centering measure characterizes a visual attention bias of the given object based at least in part on its location within the input visual stimulus. The visual attention bias of the given object may be based at least in part on a distance of the given object from a diagonal extending from a top-left corner of the input visual stimulus to a bottom-right corner of the input visual stimulus. The visual attention bias of the given object may also or alternatively be based at least in part on a distance from a top of the input visual stimulus. The visual attention bias of the given object may further or alternatively be based at least in part on a distance from a left-hand side of the input visual stimulus. The behavioral intent estimation measure characterizes estimated probabilities of two or more different behavioral intents of the user viewing the given object in the input visual stimulus. The emotional resonance measure characterizes an intensity and an emotional valence of an emotional effect of the given object on the user viewing the input visual stimulus.

In step 2406, a likelihood of a user viewing the input visual stimulus to fixate attention on respective ones of the one or more objects in the input visual stimulus is estimated based at least in part on the two or more cognitive measures of each of the one or more objects in the input visual stimulus. Step 2406 may comprise, for a given one of the one or more objects, computing a weighted average of the two or more cognitive measures of the given object. The FIG. 24 process may continue with step 2408, modifying a design of the input visual stimulus to adjust the estimated likelihood of the user viewing the input visual stimulus to fixate attention on at least one of the one or more objects in the input visual stimulus. Step 2408 may comprise at least one of modifying information content of said at least one of the one or more objects in the input visual stimulus and adjusting a location of said at least one of the one or more objects in the input visual stimulus.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for information density processing and analysis will now be described in greater detail with reference to FIGS. 25 and 26. Although described in the context of system 100, these platforms may also be used to implement at least portions of other information processing systems in other embodiments.

Figure 25:
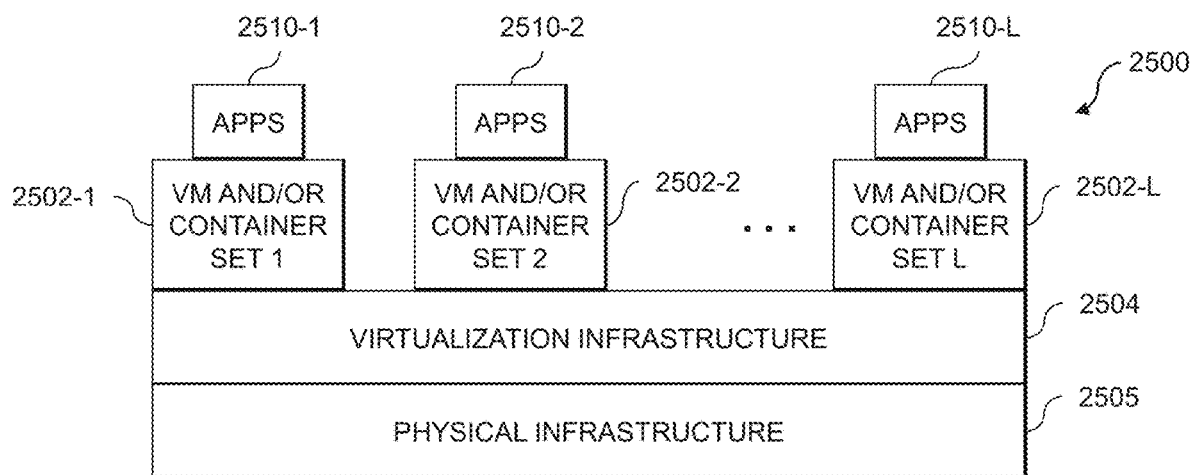
FIGS. 25 and 26 show examples of processing platforms that may be utilized to implement at least a portion of an information processing system in illustrative embodiments.
Figure 26:
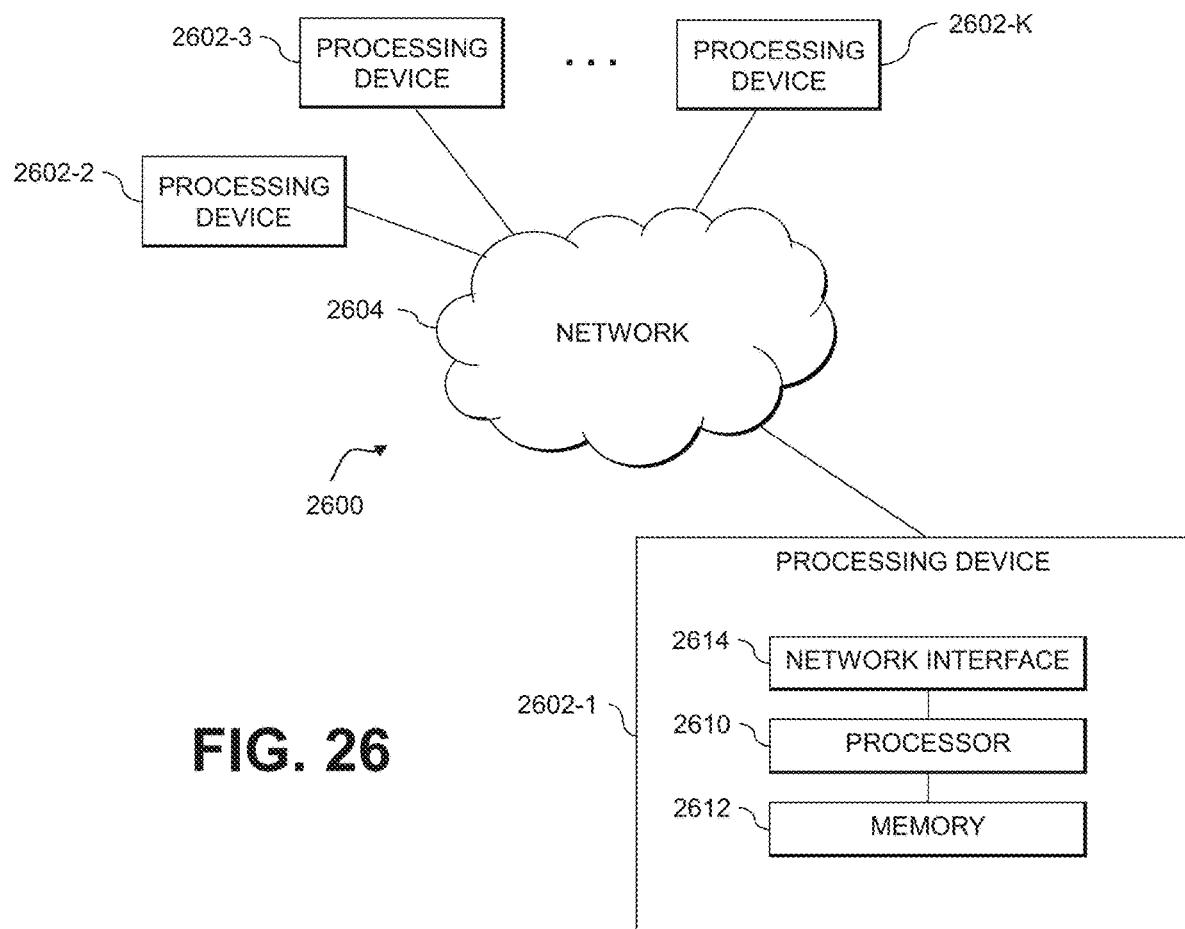

FIG. 25 shows an example processing platform comprising cloud infrastructure 2500. The cloud infrastructure 2500 comprises a combination of physical and virtual processing resources that may be utilized to implement at least a portion of the information processing system 100 in FIG. 1. The cloud infrastructure 2500 comprises multiple VMs and/or container sets 2502-1, 2502-2, . . . 2502-L implemented using virtualization infrastructure 2504. The virtualization infrastructure 2504 runs on physical infrastructure 2505, and illustratively comprises one or more hypervisors and/or operating system level virtualization infrastructure. The operating system level virtualization infrastructure illustratively comprises kernel control groups of a Linux operating system or other type of operating system.

The cloud infrastructure 2500 further comprises sets of applications 2510-1, 2510-2, . . . 2510-L running on respective ones of the VMs/container sets 2502-1, 2502-2, . . . 2502-L under the control of the virtualization infrastructure 2504. The VMs/container sets 2502 may comprise respective VMs, respective sets of one or more containers, or respective sets of one or more containers running in VMs.

In some implementations of the FIG. 25 embodiment, the VMs/container sets 2502 comprise respective VMs implemented using virtualization infrastructure 2504 that comprises at least one hypervisor. A hypervisor platform may be used to implement a hypervisor within the virtualization infrastructure 2504, where the hypervisor platform has an associated virtual infrastructure management system. The underlying physical machines may comprise one or more distributed processing platforms that include one or more storage systems.

In other implementations of the FIG. 25 embodiment, the VMs/container sets 2502 comprise respective containers implemented using virtualization infrastructure 2504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 2500 shown in FIG. 25 may represent at least a portion of one processing platform. Another example of such a processing platform is processing platform 2600 shown in FIG. 26.

The processing platform 2600 in this embodiment comprises a portion of system 100 and includes a plurality of processing devices, denoted 2602-1, 2602-2, 2602-3, . . . 2602-K, which communicate with one another over a network 2604.

The network 2604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 2602-1 in the processing platform 2600 comprises a processor 2610 coupled to a memory 2612.

The processor 2610 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 2612 may comprise random access memory (RAM), read-only memory (ROM), flash memory or other types of memory, in any combination. The memory 2612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 2602-1 is network interface circuitry 2614, which is used to interface the processing device with the network 2604 and other system components, and may comprise conventional transceivers.

The other processing devices 2602 of the processing platform 2600 are assumed to be configured in a manner similar to that shown for processing device 2602-1 in the figure.

Again, the particular processing platform 2600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for information density processing and analysis as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, designs, design personalization, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured to perform steps of:
obtaining an information density matrix for an input visual stimulus, the information density matrix characterizing information density of feature points in the input visual stimulus;
identifying one or more clusters of feature points in the input visual stimulus by performing spatial clustering of the feature points utilizing the information density matrix;
determining a cognitive load score for the input visual stimulus based at least in part on the identified one or more clusters of feature points, the cognitive load score characterizing cognitive energy required to mentally process the input visual stimulus; and
modifying a design of the input visual stimulus to adjust the cognitive load score of the input visual stimulus.

2. The apparatus of claim 1 wherein the input visual stimulus comprises an image file.

3. The apparatus of claim 1 wherein determining the cognitive load score for the input visual stimulus is based at least in part on a number of the identified one or more clusters of feature points, wherein the cognitive load score for the input visual stimulus increases with the number of the identified one or more clusters of feature points.

4. The apparatus of claim 3 wherein identifying the one or more clusters of feature points in the input visual stimulus comprises performing a density-based clustering algorithm on the information density matrix to generate a normalized number of the identified one or more clusters of feature points, the cognitive load score for the input visual stimulus being based at least in part on the normalized number of the identified one or more clusters of feature points.

5. The apparatus of claim 4 wherein the normalized number of the identified one or more clusters of feature points is generated utilizing a minimum-maximum scalar algorithm.

6. The apparatus of claim 1 wherein determining the cognitive load score comprises calculating distances between the identified one or more clusters, wherein the cognitive load score for the input visual stimulus increases as distances between the identified one or more clusters increases.

7. The apparatus of claim 6 wherein calculating the distances between the identified one or more clusters comprises calculating Euclidean distances between centroids of the identified one or more clusters, normalizing the calculated Euclidean distances, and determining an average of the normalized Euclidean distances.

8. The apparatus of claim 1 wherein determining the cognitive load score comprises calculating sizes of the identified one or more clusters, wherein the cognitive load score for the input visual stimulus increases as the sizes of the identified one or more clusters increases.

9. The apparatus of claim 8 wherein calculating the sizes of the identified one or more clusters comprises:
   for each of the identified one or more clusters, identifying a centroid of that cluster, drawing lines to form a polygon around border feature points of that cluster, and calculating an area within the polygon; and
   normalizing the areas of the polygons for the identified one or more clusters.

10. The apparatus of claim 1 wherein determining the cognitive load score comprises determining text complexity scores for one or more areas of the input visual stimulus.

11. The apparatus of claim 1 wherein determining the cognitive load score comprises determining a weighted average of two or more cognitive load score components, the two or more cognitive load score components comprising two or more of:
    a normalized number of the identified one or more clusters;
    an average normalized distance between the identified one or more clusters; and
    an average normalized size of the identified one or more clusters.

12. The apparatus of claim 11 wherein the two or more cognitive load score components further comprises an average normalized readability score of the input visual stimulus.

13. The apparatus of claim 1 wherein modifying the design of the input visual stimulus comprises modifying the identified one or more clusters of feature points to reach a target cognitive load score, the target cognitive load score being personalized for a given end-user viewing the input visual stimulus.

14. The apparatus of claim 1 wherein modifying the design of the input visual stimulus to adjust the cognitive load score of the input visual stimulus comprises at least one of:
    modifying a number of the identified one or more clusters;
    modifying a distance between a first one of the identified one or more clusters and a second one of the identified one or more clusters; and
    modifying a size of at least one of the identified one or more clusters.

15. A computer program product comprising a non-transitory processor-readable storage medium having stored therein program code of one or more software programs, wherein the program code when executed by at least one processing device causes the at least one processing device to perform steps of:
    obtaining an information density matrix for an input visual stimulus, the information density matrix characterizing information density of feature points in the input visual stimulus;
    identifying one or more clusters of feature points in the input visual stimulus by performing spatial clustering of the feature points utilizing the information density matrix;
    determining a cognitive load score for the input visual stimulus based at least in part on the identified one or more clusters of feature points, the cognitive load score characterizing cognitive energy required to mentally process the input visual stimulus; and
    modifying a design of the input visual stimulus to adjust the cognitive load score of the input visual stimulus.

16. The computer program product of claim 15 wherein determining the cognitive load score comprises determining a weighted average of two or more cognitive load score components, the two or more cognitive load score components comprising two or more of:
    a normalized number of the identified one or more clusters;
    an average normalized distance between the identified one or more clusters; and
    an average normalized size of the identified one or more clusters.

17. The computer program product of claim 15 wherein modifying the design of the input visual stimulus comprises modifying the identified one or more clusters of feature points to reach a target cognitive load score, the target cognitive load score being personalized for a given end-user viewing the input visual stimulus.

18. A method comprising steps of:
    obtaining an information density matrix for an input visual stimulus, the information density matrix characterizing information density of feature points in the input visual stimulus;
    identifying one or more clusters of feature points in the input visual stimulus by performing spatial clustering of the feature points utilizing the information density matrix;
    determining a cognitive load score for the input visual stimulus based at least in part on the identified one or more clusters of feature points, the cognitive load score characterizing cognitive energy required to mentally process the input visual stimulus; and
    modifying a design of the input visual stimulus to adjust the cognitive load score of the input visual stimulus;
    wherein the method is performed by at least one processing device comprising a processor coupled to a memory.

19. The method of claim 18 wherein determining the cognitive load score comprises determining a weighted average of two or more cognitive load score components, the two or more cognitive load score components comprising two or more of:
    a normalized number of the identified one or more clusters;
    an average normalized distance between the identified one or more clusters; and an average normalized size of the identified one or more clusters.

20. The method of claim 18 wherein modifying the design of the input visual stimulus comprises modifying the identified one or more clusters of feature points to reach a target cognitive load score, the target cognitive load score being personalized for a given end-user viewing the input visual stimulus.

* * * * *